(12) United States Patent
Kusama et al.

(10) Patent No.: US 9,866,135 B2
(45) Date of Patent: Jan. 9, 2018

(54) POWER CONVERSION DEVICE INCLUDING PRIMARY INVERTER, TRANSFORMER, SECONDARY CONVERTER

(71) Applicant: Panasonic Intellectual Property Management Co., Ltd., Osaka (JP)

(72) Inventors: Fumito Kusama, Osaka (JP); Takaaki Norisada, Osaka (JP); Go Yamada, Osaka (JP); Keiji Akamatsu, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/465,033

(22) Filed: Mar. 21, 2017

(65) Prior Publication Data

US 2017/0294845 A1 Oct. 12, 2017

(30) Foreign Application Priority Data

Apr. 8, 2016 (JP) .................................. 2016-077975

(51) Int. Cl.
| H02M 3/335 | (2006.01) |
| H02M 1/08 | (2006.01) |
| H02M 1/00 | (2006.01) |

(52) U.S. Cl.
CPC ......... H02M 3/33592 (2013.01); H02M 1/08 (2013.01); H02M 2001/0009 (2013.01); H02M 2001/0048 (2013.01)

(58) Field of Classification Search
CPC ............... H02M 3/33592; H02M 1/08; H02M 2001/0009; H02M 2001/0048; H02M 3/33523
See application file for complete search history.

(56) References Cited

U.S. PATENT DOCUMENTS

2005/0281059 A1* 12/2005 Yasumura ........... H02M 1/4241
363/16
2006/0209574 A1* 9/2006 Makino ............... H02M 3/3385
363/21.12
(Continued)

FOREIGN PATENT DOCUMENTS

| JP | 63-257471 | 10/1988 |
| JP | 2004-025447 | 1/2004 |
(Continued)

*Primary Examiner* — Jue Zhang
*Assistant Examiner* — Lakaisha Jackson
(74) *Attorney, Agent, or Firm* — McDermott Will & Emery LLP

(57) ABSTRACT

A power conversion device includes first and second terminals connected to a DC power source, third and fourth terminals connected to a commercial power system or a load, a transformer including a primary winding having seventh and eighth terminals and a secondary winding having fifth and sixth terminals, an inverter circuit connected between the first and second terminals and the seventh and eighth terminals, a converter circuit connected between the fifth and sixth terminals and the third and fourth terminals, a diode bridge including first and second AC input terminals connected to the fifth and sixth terminals, respectively, and first and second DC output terminals, a first capacitor connected between the first and second DC output terminals, and a first resistor connected in parallel with the first capacitor between the first and second DC output terminals.

12 Claims, 43 Drawing Sheets

(56) References Cited

U.S. PATENT DOCUMENTS

| | | | |
|---|---|---|---|
| 2007/0268641 A1* | 11/2007 | Kuo | H02H 7/1255 |
| | | | 361/90 |
| 2008/0055954 A1 | 3/2008 | Kajouke et al. | |
| 2016/0226239 A1* | 8/2016 | Yang | H02M 1/32 |
| 2016/0276923 A1* | 9/2016 | Hayakawa | H02M 1/34 |

FOREIGN PATENT DOCUMENTS

| | | |
|---|---|---|
| JP | 2004-135408 | 4/2004 |
| JP | 2007-215324 | 8/2007 |
| JP | 2008-061497 | 3/2008 |

\* cited by examiner

POWER CONVERSION DEVICE INCLUDING PRIMARY INVERTER, TRANSFORMER, SECONDARY CONVERTER

BACKGROUND

1. Technical Field

The present disclosure relates to a power conversion device that converts DC power into AC power.

2. Description of the Related Art

In recent years, the business by which a company or an individual sells electricity obtained from a distributed power source (for example, a solar cell, a fuel cell, or a storage battery) to a power company (electric power sales) has been expanding. Electric power sales are performed by using power system interconnection that connects a distributed power source to the commercial power system. In power system interconnection, the power from the distributed power source is converted into power adapted to the commercial power system by using a power conversion device called a power conditioner.

When the distributed power source is a direct current (DC) power source, a power conversion device that converts DC power to alternating current (AC) power is used in the power system interconnection. As such a power conversion device, for example, a power system interconnection inverter device has been proposed (refer to, for example, Japanese Patent No. 4100125). The power system interconnection inverter device includes a high-frequency transformer, a first inverter disposed on the primary side of the high-frequency transformer, a current-limiting reactor disposed on the secondary side of the high-frequency transformer, and a second inverter having a plurality of switching elements coupled in a full-bridge configuration. The first inverter converts DC power to high frequency power. The current-limiting reactor converts high frequency power to commercial power. The each of the switching elements of the second inverter is formed from a direction switch, which closes and off a bidirectional switch in accordance with the polarity of the system voltage. Thus, the second inverter converts the power of the high-frequency transformer to an alternating current.

SUMMARY

In power conversion devices including an inverter circuit on each of the primary side and the secondary side of a transformer as described in Japanese Patent No. 4100125, ringing of the voltage and the current may occur due to switching of each of the inverter circuits. In order to prevent distortion of the waveform of the output voltage and the output power, the ringing needs to be eliminated.

In one general aspect, the techniques disclosed here feature a power conversion device. The power conversion device includes first and second terminals connected to a DC power source, third and fourth terminals connected to a commercial power system or a load, a transformer including a primary winding having seventh and eighth terminals and a secondary winding having fifth and sixth terminals, an inverter circuit connected between the first and second terminals and the seventh and eighth terminals, a converter circuit connected between the fifth and sixth terminals and the third and fourth terminals, a diode bridge including first and second AC input terminals and first and second DC output terminals, where the first AC input terminal is connected to the fifth terminal and the second AC input terminal is connected to the sixth terminal, a first capacitor connected between the first and second DC output terminals, and a first resistor connected in parallel with the first capacitor between the first and second DC output terminals.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Exemplary embodiments of the present disclosure are described in detail below with reference to the accompanying drawings. It is noted that, in the present disclosure, the terms "first", "second", "third" and the like are used for distinguishing similar components or periods, not for describing temporal or spatial order. The terms "first", "second", "third" and the like are appropriately exchangeable. The present disclosure includes embodiments obtained by appropriately exchanging such ordinal numbers of element names in the following exemplary embodiments, and is not limited to the exemplary embodiments.

First Exemplary Embodiment

Figure 1:
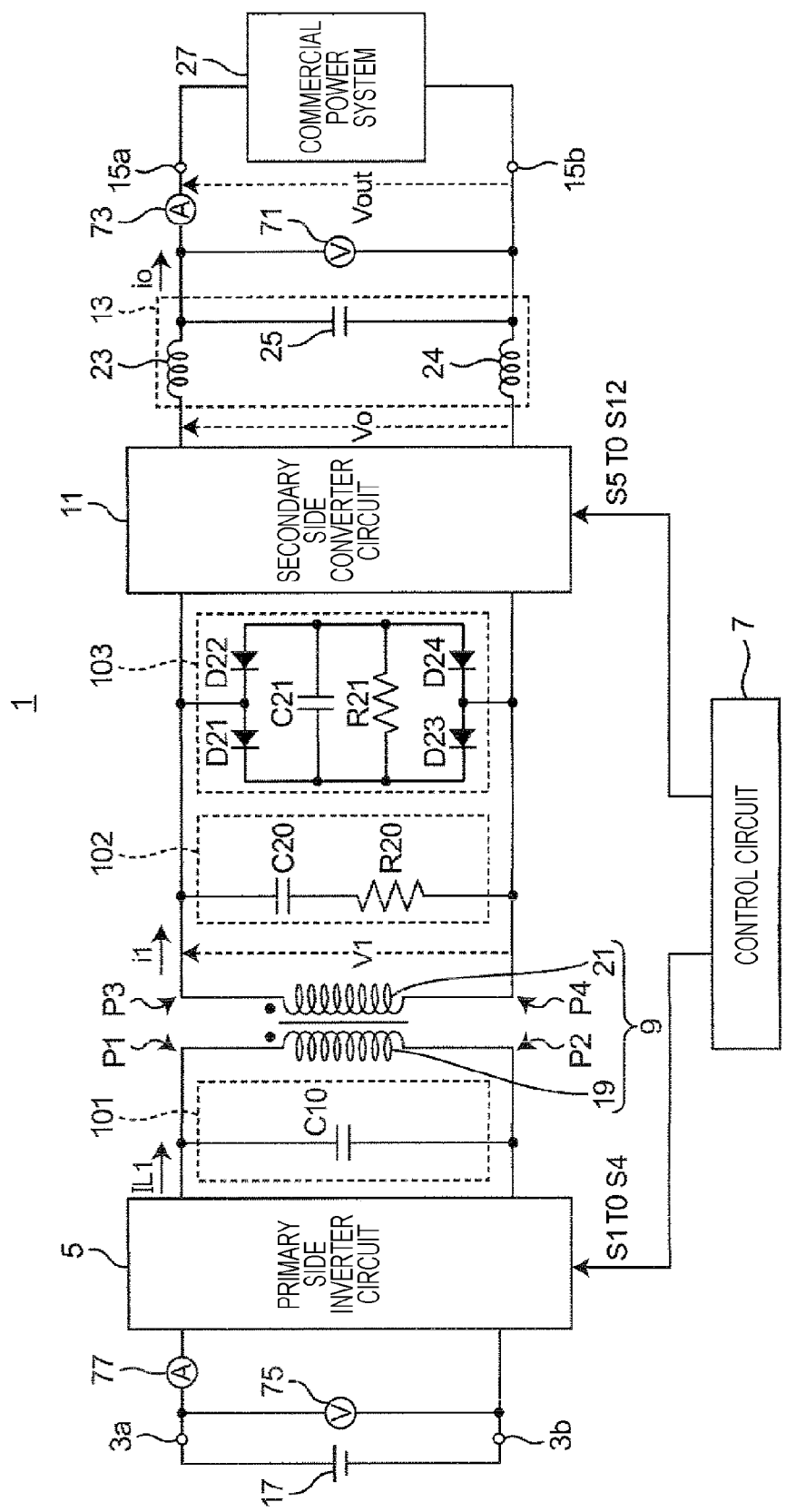
FIG. 1 is a block diagram illustrating the configuration of a power conversion device according to a first exemplary embodiment.

FIG. 1 is a block diagram illustrating the configuration of a power conversion device 1 according to the first exemplary embodiment. The power conversion device 1 includes terminals 3a and 3b, a primary side inverter circuit 5, a transformer 9, a secondary side converter circuit 11, a filter circuit 13, terminals 15a and 15b, voltmeters 71 and 75, ammeters 73 and 77, snubber circuits 101 to 103, and a control circuit 7. The power conversion device 1 is connected to a DC power source 17 via the terminals 3a and 3b and is connected to a commercial power system 27 via the terminals 15a and 15b. The power conversion device 1 is a power conditioner that bidirectionally converts power between the DC power source 17 and the commercial power system 27 and transmits the power.

The DC power source 17 is, for example, a storage battery, a solar cell, a fuel cell. A positive electrode of the DC power source 17 is electrically connected to the terminal 3a of the power conversion device 1, and a negative electrode of the DC power source 17 is electrically connected to the terminal 3b of the power conversion device 1. The power of the DC power source 17 is supplied to the primary side inverter circuit 5 via the terminals 3a and 3b. The transformer 9 is a high-frequency transformer including a primary winding 19 and a secondary winding 21 magnetically coupled to each other. Terminals P1 and P2 of the primary winding 19 are connected to the output terminals of the primary side inverter circuit 5. Terminals P3 and P4 of the secondary winding 21 are connected to the input terminals of the secondary side converter circuit 11. The transformer 9 insulates the primary side inverter circuit 5 from the secondary side converter circuit 11. When the power conversion device 1 operates in a power supply mode, the transformer 9 supplies the power from the primary side inverter circuit 5 to the secondary side converter circuit 11 therethrough. In contrast, when the power conversion device 1 operates in a power regeneration mode, the transformer 9 regenerates the power from the secondary side converter circuit 11 to the primary side inverter circuit 5 therethrough. These modes are described in more detail below.

Figure 2:
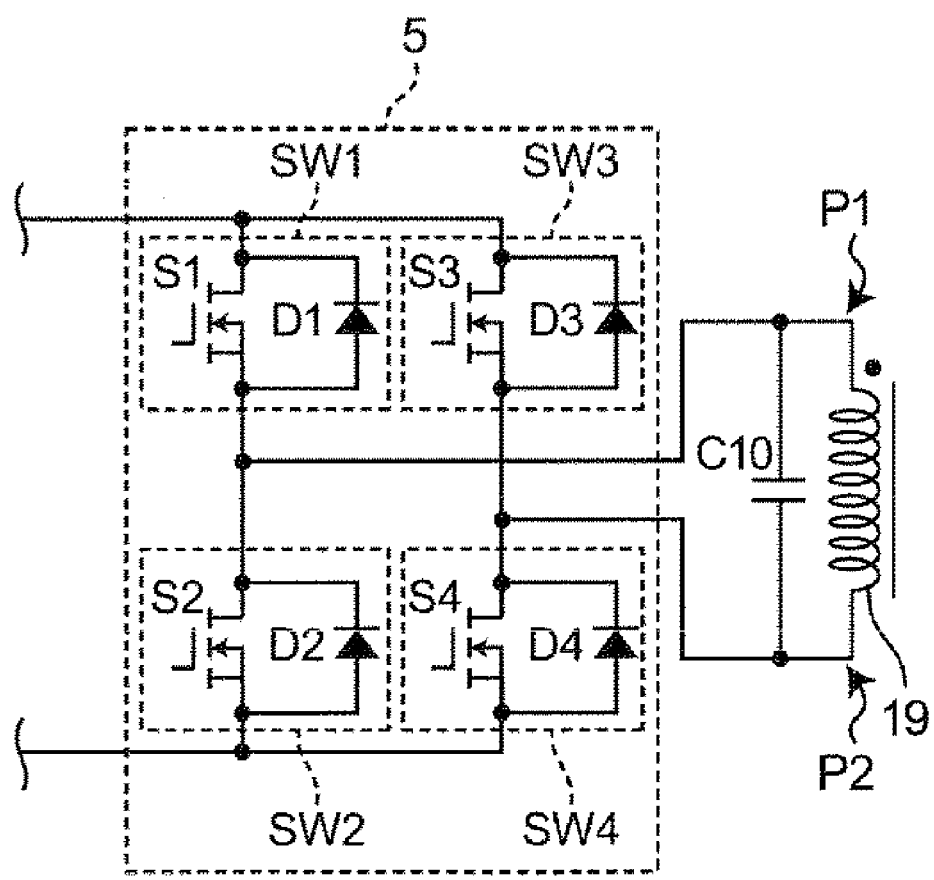
FIG. 2 is a circuit diagram illustrating a detailed configuration of a primary side inverter circuit illustrated in FIG. 1.

FIG. 2 is a circuit diagram illustrating the detailed configuration of the primary side inverter circuit 5 illustrated in FIG. 1. In FIG. 2, the circuits on the secondary side are not illustrated. The primary side inverter circuit 5 is connected between the terminals 3a and 3b and the primary winding 19 of the transformer 9. The primary side inverter circuit 5 is a high-frequency inverter that converts a DC voltage supplied from the DC power source 17 into a high-frequency voltage (an AC voltage) of, for example, 20 kHz. The primary side inverter circuit 5 includes four switching elements SW1 to SW4. The switching elements SW1 to SW4 are bridge-connected to form a full-bridge circuit. Each of the switching elements SW1 to SW4 includes one of switches S1 to S4 and one of diodes D1 to D4. The switches S1 to S4 are field effect transistors, for example. Each of the diodes D1 to D4 is connected between the source and the drain of a corresponding one of the switches S1 to S4. That is, each of the diodes D1 to D4 is connected in parallel with the corresponding one of the switches S1 to S4. Each of the diodes D1 to D4 may be a body diode of the corresponding one of the switch S1 to S4 or may be externally connected to the corresponding one of the switches S1 to S4.

The switches S1 to S4 may be, for example, npn insulated gate bipolar transistors instead of the field effect transistors. In this case, the diodes D1, D2, D3, and D4 are provided as freewheeling diodes. The diode D1 is connected between the emitter and the collector of the switch S1 so that a current flows through the diode D1 in a direction opposite to the direction in which a current flows in the switch S1 when the switch S1 is closed. That is, the anode of the diode D1 is connected to the emitter of the switch S1, and the cathode of the diode D1 is connected to the collector of the switch S1. The diodes D2 to D4 are connected to the switches S2 to S4, respectively, in the same manner.

The control circuit 7 opens the switches S2 and S3 when the switches S1 and S4 are closed and closes the switches S2 and S3 when the switches S1 and S4 are open.

Figure 3:
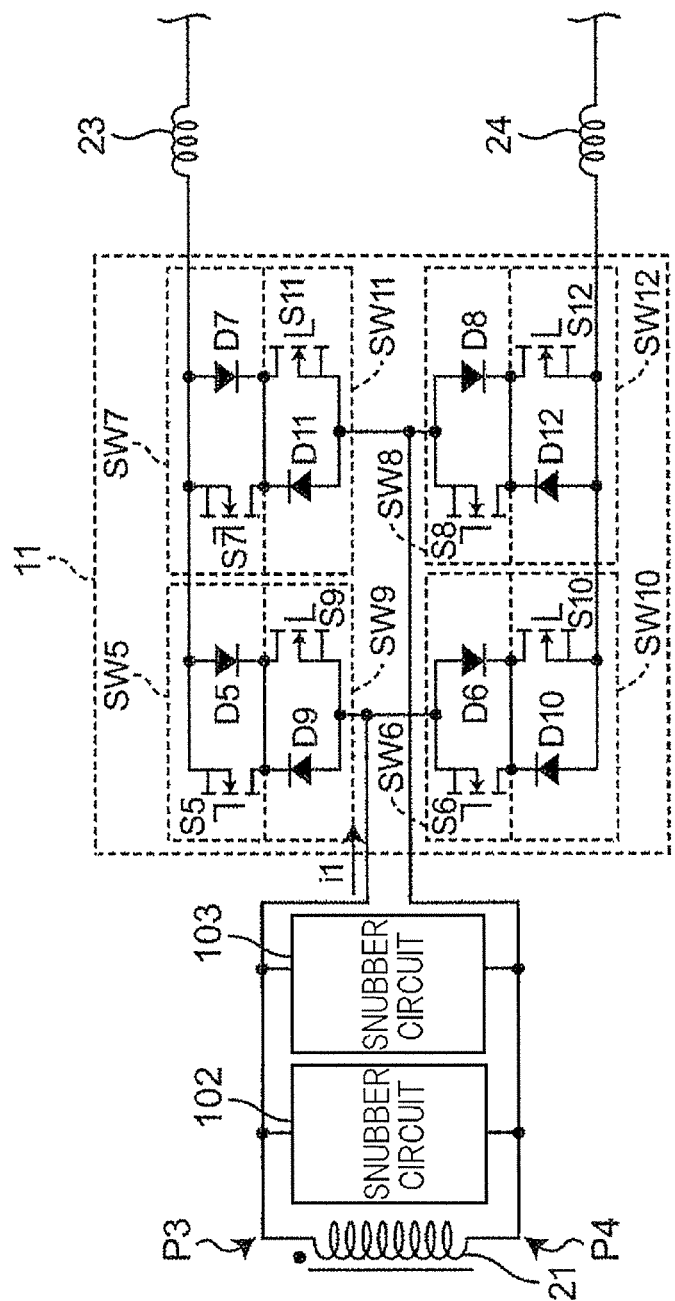
FIG. 3 is a circuit diagram illustrating a detailed configuration of a secondary side converter circuit illustrated in FIG. 1.

FIG. 3 is a circuit diagram illustrating the detailed configuration of the secondary side converter circuit 11 illustrated in FIG. 1. In FIG. 3, the circuits on the primary side are not illustrated. The secondary side converter circuit 11 is connected between the secondary winding 21 and the terminals 15a and 15b (refer to FIG. 1). The secondary side converter circuit 11 is a direct AC converter that directly converts the high-frequency voltage supplied from the transformer 9 into a commercial AC voltage of 50 Hz or 60 Hz. The secondary side converter circuit 11 includes eight switching elements SW5 to SW12. Each of the switching elements SW5 to SW12 includes one of switches S5 to S12 and one of diodes D5 to D12. The switches S5 to S12 are, for example, MOSFETs. Each of the diodes D5 to D12 is connected between the source and the drain of a corresponding one of the switches S5 to S12. That is, each of the diodes D5 to D12 is connected in parallel with the corresponding one of the switches S5 to S12. Each of the diodes D5 to D12 may be a body diode of the corresponding one of the switch S5 to S12 or may be externally connected to the corresponding one of the switches S5 to S12. By combining the switches S5 to S12 each formed from a MOSFET with the diodes D5 to D12, respectively, the switching elements SW5 to SW12 pass a current in one direction when being open and pass a current bidirectionally when being closed.

As used herein, the switching elements SW5 to SW12 may be referred to as "a first switching element SW5 to an eighth switching element SW12", and the switches S5 to S12 may be referred to as "a first switch S5 to an eighth switch S12. The switching elements SW5 to SW12 are examples of "first to eighth switch circuits" in the present disclosure, and the switches S5 to S12 are examples of "first to eighth switch" in the present disclosure.

The first switching element SW5 and the fifth switching element SW9 are connected in series between the terminal 15a and the terminal P3 so that the direction in which a current flows in the first switching element SW5 and the direction in which a current flows in the fifth switching element SW9 are opposite to each other when being open (that is, the forward directions of the diodes D5 and D9 are opposite to each other). The drains of the first switch S5 and the fifth switch S9 are connected to each other, or the sources thereof are connected to each other. Either the first switching element SW5 or the fifth switching element SW9 may be disposed close to the terminal P3.

The second switching element SW6 and the sixth switching element SW10 are connected in series between the terminal 15b and the terminal P3 so that the direction in which a current flows in the second switching element SW6 and the direction in which a current flows in the sixth switching element SW10 are opposite to each other when being open (that is, the forward directions of the diodes D6 and D10 are opposite to each other). The drains of the second switch S6 and the sixth switch S10 are connected to each other, or the sources thereof are connected to each other. Either the second switching element SW6 or the sixth switching element SW10 may be disposed close to the terminal P3.

The third switching element SW7 and the seventh switching element SW11 are connected in series between the terminal 15a and the terminal P4 so that the direction in which a current flows in the third switching element SW7 and the direction in which a current flows in the seventh switching element SW11 are opposite to each other when being open (that is, the forward directions of the diodes D7 and D11 are opposite to each other). The drains of the third switch S7 and the seventh switch S11 are connected to each other, or the sources thereof are connected to each other. Either the third switching element SW7 or the seventh switching element SW11 may be disposed close to the terminal P4.

The fourth switching element SW8 and the eighth switching element SW12 are connected in series between the terminal 15b and the terminal P4 so that the direction in which a current flows in the fourth switching element SW8 and the direction in which a current flows in the eighth switching element SW12 are opposite to each other when being open (that is, the forward directions of the diodes D8 and D12 are opposite to each other). The drains of the fourth switch S8 and the eighth switch S12 are connected to each other, or the sources thereof are connected to each other. Either the fourth switching element SW8 or the eighth switching element SW12 may be disposed close to the terminal P4.

The first switching element SW5 and the second switching element SW6 are disposed so that the currents flow in the same direction in a path that extends from the terminal 15a to the terminal 15b and that includes the first switching element SW5, the second switching element SW6, the fifth switching element SW9, and the sixth switching element SW10 (that is, the forward directions of the diodes D5 and D6 are the same) when being open.

The third switching element SW7 and the fourth switching element SW8 are disposed so that the currents flow in the same direction in a path that extends from the terminal 15a to the terminal 15b and that includes the third switching element SW7, the fourth switching element SW8, the seventh switching element SW11, and the eighth switching element SW12 (that is, the forward directions of the diodes D7 and D8 are the same) when being open.

The first switching element SW5 and the third switching element SW7 are disposed so that the currents flow in the opposite directions in a path that extends from the terminal P3 to the terminal P4 and that includes the first switching element SW5, the third switching element SW7, the fifth switching element SW9, and the seventh switching element SW11 (that is, the forward directions of the diodes D5 and D7 are opposite to each other) when being open.

The control circuit 7 controls the amplitude of at least one of the output voltage and the output current at the terminals 15a and 15b by switching on/off the first switch S5 to the eighth switch S12. The control is described in more detail below.

Referring back to FIG. 1, the configuration of the power conversion device 1 is described below. The filter circuit 13 includes coils 23 and 24 and a capacitor 25.

The coil 23 is disposed between one of the two output terminals of the secondary side converter circuit 11 and the terminal 15a. The coil 24 is disposed between the other output terminal of the secondary side converter circuit 11 and the terminal 15b. The capacitor 25 is connected between the two output terminals of the secondary side converter circuit 11. The coils 23 and 24 and the capacitor 25 constitute a filter circuit that smoothes an AC signal output from the secondary side converter circuit 11. In this manner, the pulse wave AC signal output from the secondary side converter circuit 11 is converted into a sine wave AC signal having an amplitude in accordance with the pulse width.

The voltmeter 75 measures the input voltage of the primary side inverter circuit 5 (the voltage between the terminals 3a and 3b) and notifies the control circuit 7 of the value of the input voltage. The ammeter 77 measures the input current of the primary side inverter circuit 5 and notifies the control circuit 7 of the value of the input current.

The voltmeter 71 measures the output voltage (the voltage between the terminals 15a and 15b) of the power conversion device 1 and notifies the control circuit 7 of the value of the output voltage. The ammeter 73 measures the output current of the power conversion device 1 and notifies the control circuit 7 of the value of the output current.

The control circuit 7 controls the primary side inverter circuit 5 and the secondary side converter circuit 11.

When electric power is supplied from the DC power source 17 to the commercial power system 27 (electric power sale) or when the DC power source 17 is charged by the power supplied from the commercial power system 27, the terminals 15a and 15b are connected to the commercial power system 27.

Ringing of the voltage and current may occur due to switching of the primary side inverter circuit 5 and the secondary side converter circuit 11. To prevent the occurrence of ringing, snubber circuits 101 to 103 are provided.

The snubber circuit 101 includes a capacitor C10 connected between both ends of the primary winding 19.

The snubber circuit 102 includes a capacitor C20 and a resistor R20 connected in series with each other between both ends of the secondary winding 21.

The snubber circuit 103 is a clamping circuit including a diode bridge formed from diodes D21 to D24, a capacitor C21, and a resistor R21. The diode bridge includes a node between the diodes D21 and D22 and a node between the diodes D23 and D24 as AC input terminals. The diode bridge further includes a node between the diodes D21 and D23 and a node between the diodes D22 and D24 as DC output terminals. The AC input terminals of the diode bridge are connected to both ends of the secondary winding 21. The capacitor C21 and the resistor R21 are connected in parallel between the DC output terminals of the diode bridge.

The operation performed by the power conversion device 1 illustrated in FIG. 1 is described below.

Figure 4:
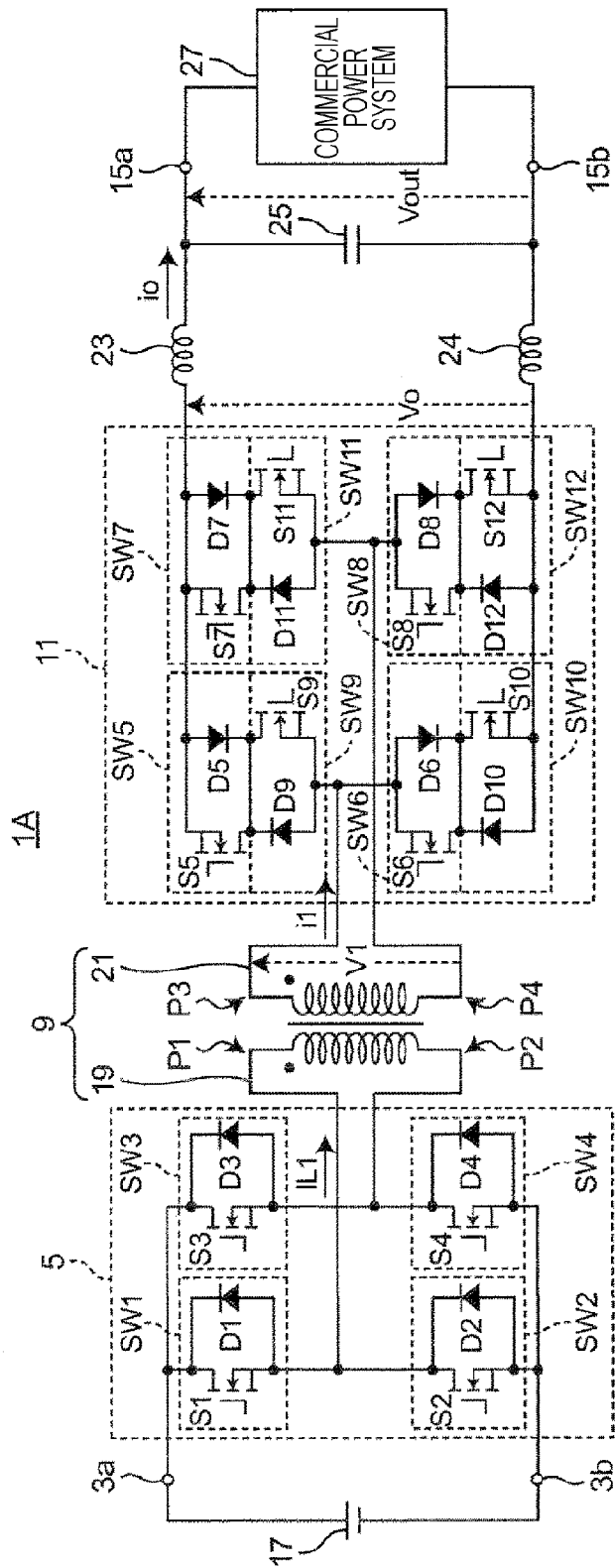
FIG. 4 is a circuit diagram of a power conversion device of a comparative example for describing the operation performed by the power conversion device illustrated in FIG. 1.

FIG. 4 is a circuit diagram of a power conversion device 1A of a comparative example for describing the operation performed by the power conversion device 1 illustrated in FIG. 1. The power conversion device 1A illustrated in FIG. 4 has a configuration obtained by removing the snubber circuits 101 to 103 from the power conversion device 1 illustrated in FIG. 1. A voltage V1 is generated between the terminals P3 and P4 of the secondary winding 21. The primary side inverter circuit 5 generates an output current ID. The secondary side converter circuit 11 generates an output voltage Vo and generates an output current io. By smoothing the output voltage Vo of the secondary side converter circuit 11 by the filter circuit 13, the output voltage Vout of the power conversion device 1 is generated at the terminals 15a and 15b.

Figure 5:
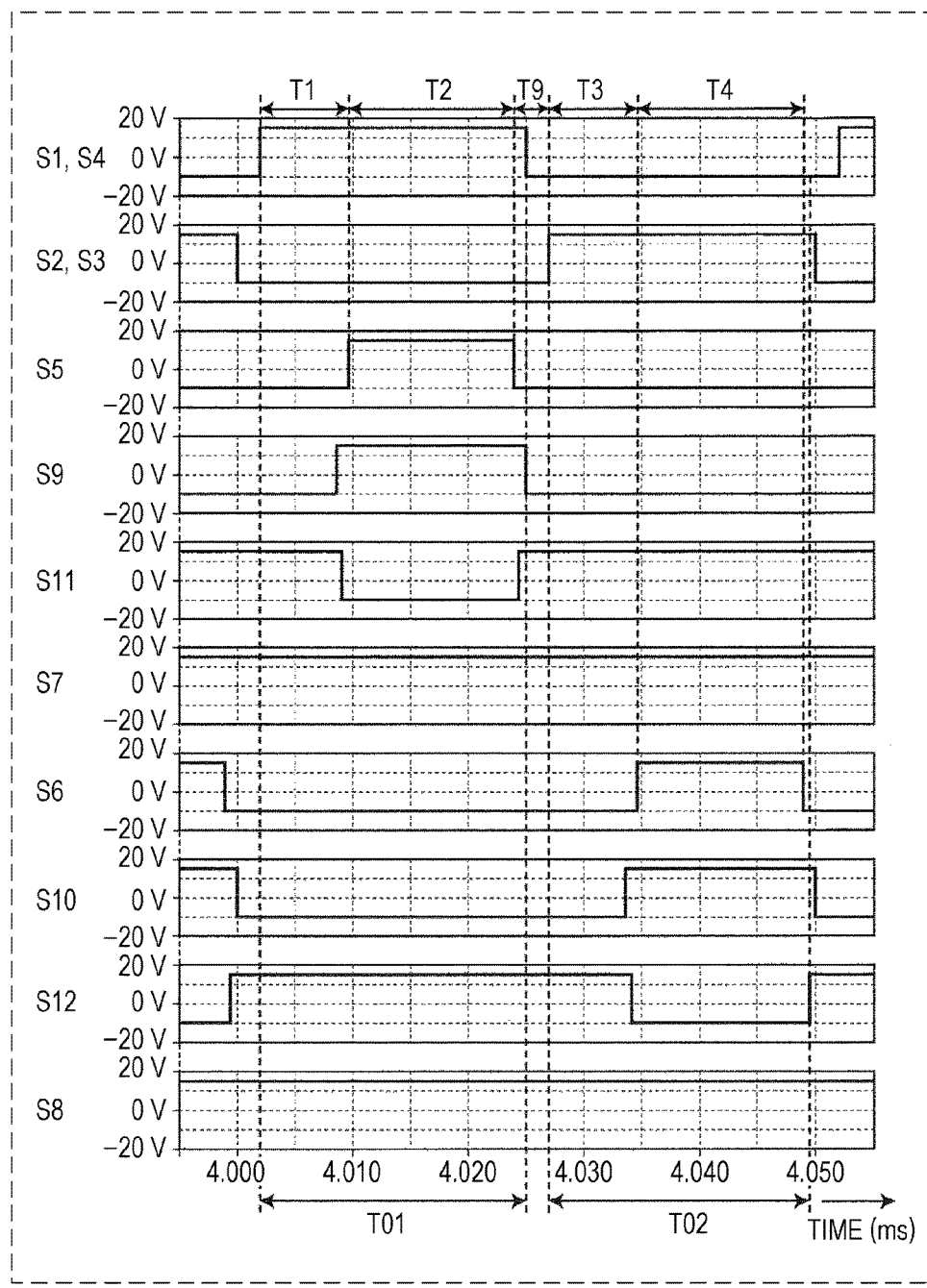
FIG. 5 is a timing diagram illustrating the operation performed by the power conversion device illustrated in FIG. 4.

FIG. 5 is a timing diagram illustrating the operation performed by the power conversion device 1A illustrated in FIG. 4. In FIG. 5, the abscissa represents the time, and the ordinate represents the voltage applied to the control terminals of the switches S1 to S12. In this description, it is assumed that the switches S1 to S12 are closed when a positive voltage is applied to the control terminal.

The DC power source 17 produces a DC voltage VE.

According to the operation illustrated in FIG. 5, the control circuit 7 applies a drive signal having a duty ratio of about 50% to the switches S1 to S4 of the primary side inverter circuit 5 while taking into account the dead time. As a result, a pulse wave AC signal is generated. The pulse wave AC signal is +VE during period T01, is −VE during period T02, and changes from +VE to −VE or from −VE to +VE during the remaining period. The generated pulse wave AC signal is applied to the primary winding 19 of the transformer 9. Subsequently, in the secondary winding 21 of the transformer 9, a pulse wave AC signal is also generated. The pulse wave AC signal is +VE during the period T01, is −VE during the period T02, and changes from +VE to −VE or from −VE to +VE during the remaining period. The voltage on the primary side of the transformer 9 and the voltage on the secondary side depend on the ratio of the number of turns of the primary winding 19 to the number of turns of the secondary winding 21. In this example, it is assumed that the turn ratio is 1:1.

PWM control is performed on the switching elements SW5 to SW12 (that is, the switches S5 to S12) of the secondary side converter circuit 11 in each of the period T01 and the period T02. In this manner, an AC voltage of a desired frequency is output to the terminals 15a and 15b. The voltage between the terminals P3 and P4 of the secondary winding 21 varies from +VE to −VE. Accordingly, when the switching elements SW5 to SW12 are MOSFETs having a body diode, the switching elements SW5 to SW12 are connected so that a current does not flow through the body diode. More specifically, the switching elements SW5 and SW9 are connected in series between the terminal P3 and the terminal 15a so that the forward directions of the diodes are opposite to each other. The switching elements SW6 and SW10 are connected in series between the terminal P3 and the terminal 15b so that the forward directions of the diodes are opposite to each other. The switching elements SW7 and SW11 are connected in series between the terminal P4 and the terminal 15a so that the forward directions of the diodes are opposite to each other. The switching elements SW8 and SW12 are connected in series between the terminal P4 and the terminal 15b so that the forward directions of the diodes are opposite to each other. That is, the switching elements SW5 and SW9 are regarded as one switching element, the switching elements SW6 and SW10 are regarded as one switching element, the switching elements SW7 and SW11 are regarded as one switching element, and the switching elements SW8 and SW12 are regarded as one switching element. In such a case, the secondary side converter circuit 11 is equivalent to an existing inverter circuit.

Figure 6:
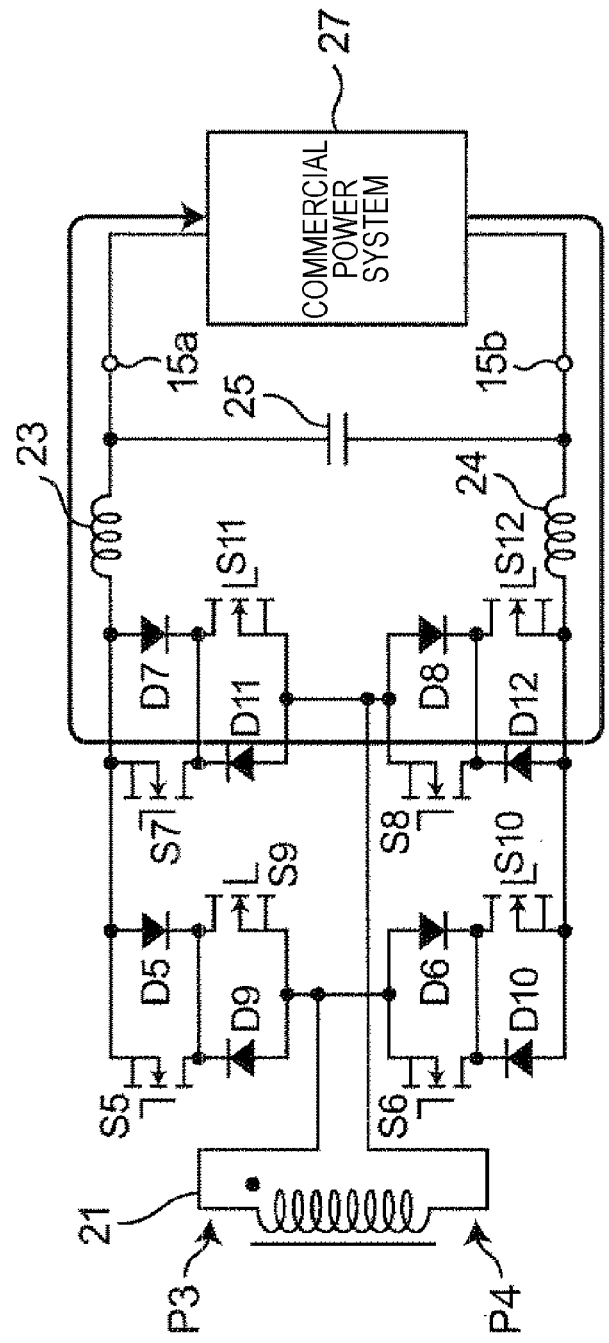
FIG. 6 illustrates a first current path in the secondary side converter circuit illustrated in FIG. 4.
Figure 9:
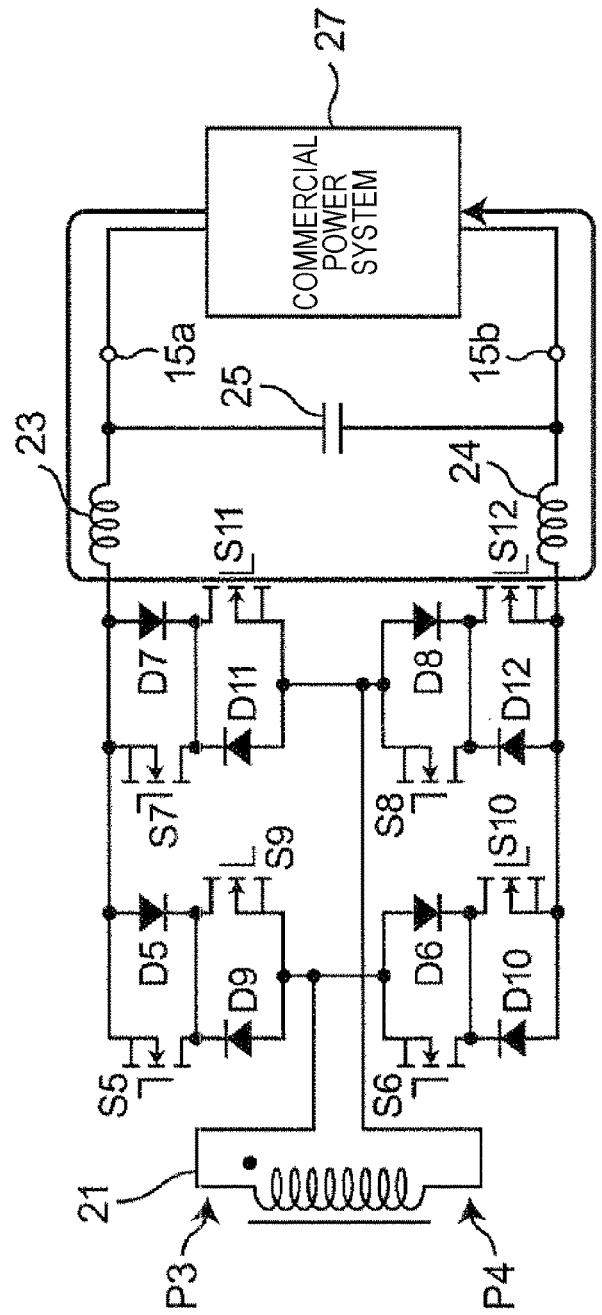
FIG. 9 illustrates a fourth current path in the secondary side converter circuit illustrated in FIG. 4.

The operation performed during the period T1 in FIG. 5 is described below. At this time, the pulse wave AC signal output from the primary side inverter circuit 5 is positive. The switch S5 may be opened, and the switch S9 may be opened or closed, the switch S7 is closed, the switch S11 is closed, the switch S6 may be opened or closed, the switch S10 is open, the switch S8 is closed, and the switch S12 is closed. Thus, a current flows through a path illustrated in FIG. 6 or 9. At this time, the output voltage Vo of the secondary side converter circuit 11 becomes 0 V, which is lower than the voltage Vout at the terminals 15a and 15b. Accordingly, the current gradually decreases.

Figure 7:
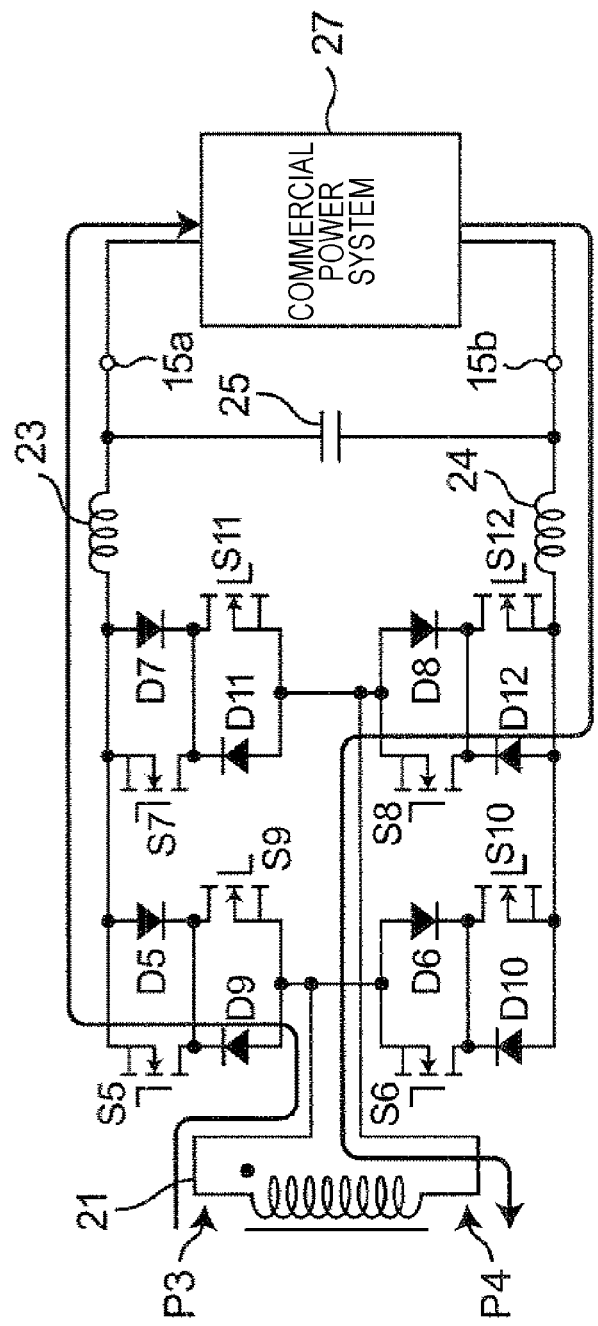
FIG. 7 illustrates a second current path in the secondary side converter circuit illustrated in FIG. 4.
Figure 10:
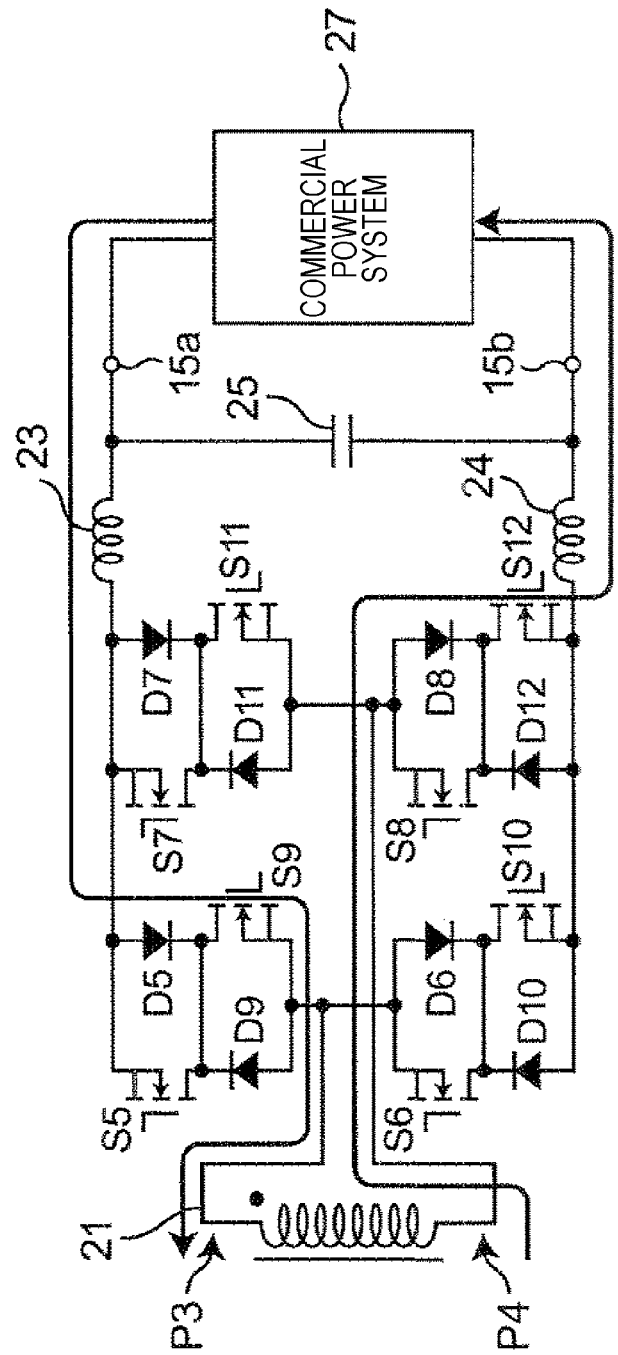
FIG. 10 illustrates a fifth current path in the secondary side converter circuit illustrated in FIG. 4.

The operation performed during the period T2 illustrated in FIG. 5 is described below. At this time, the pulse wave AC signal output from the primary side inverter circuit 5 is positive. The switch S5 is closed, the switch S9 is closed, the switch S7 may be either on or off, the switch S11 is open, the switch S6 may be either on or off, the switch S10 is open, the switch S8 is closed, and the switch S12 is closed. Thus, a current flows through the path illustrated in FIG. 7 or 10. At this time, the output voltage Vo of the secondary side converter circuit 11 is equal to the voltage +VE between the terminals P3 and P4 of the secondary winding 21, which is higher than the voltage Vout at the terminals 15a and 15b. Accordingly, the current gradually increases.

The operation performed during the period T9 illustrated in FIG. 5 is described below. The period T9 is a period in which the polarity of the voltage between the terminals P3 and P4 of the secondary winding 21 is reversed. The switch S5 is open, the switch S9 is open, the switch S7 is closed, the switch S11 is closed, the switch S6 is open, the switch S10 is open, the switch S8 is closed, and the switch S12 is closed. Thus, a current flows through a path illustrated in FIG. 6 or 9. If, at this time, all of the switches S1 to S4 are open, the voltage output from the primary side inverter circuit 5 is inverted from positive to negative. If the voltage between the terminals P1 and P2 of the primary winding 19 is inverted, the voltage between the terminals P3 and P4 of the secondary winding 21 is also inverted. At this time, since the current flows through the path illustrated in FIG. 6 or 9, the primary side of the transformer 9 is not affected and, thus, the inverting operation can be stably performed.

The operation performed during the period T3 illustrated in FIG. 5 is described below. At this time, the pulse wave AC signal output from the primary side inverter circuit 5 is negative. The switch S9 is open, the switch S5 may be either on or off, the switch S7 is closed, the switch S11 is closed, the switch S10 may be either on or off, the switch S6 is open, the switch S8 is closed, and the switch S12 is closed. Thus, a current flows through the path illustrated in FIG. 6 or 9. At this time, the output voltage Vo of the secondary side converter circuit 11 becomes 0 V, which is lower than the voltage Vout at the terminals 15a and 15b. Accordingly, the current gradually decreases.

Figure 8:
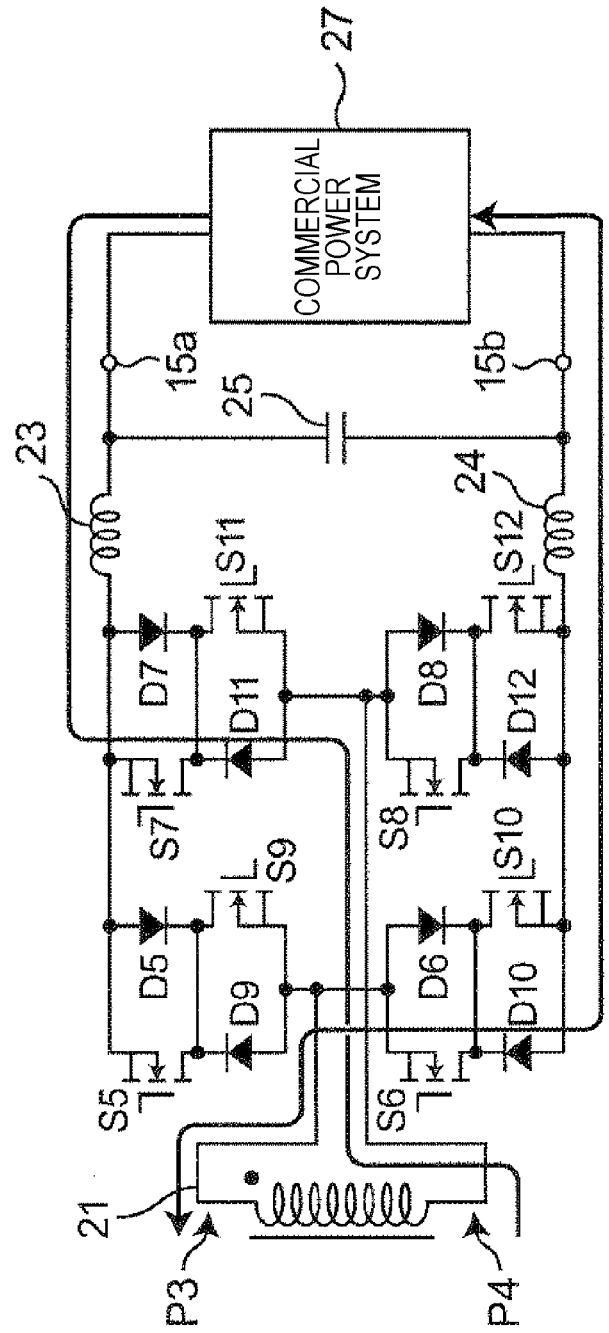
FIG. 8 illustrates a third current path in the secondary side converter circuit illustrated in FIG. 4.
Figure 11:
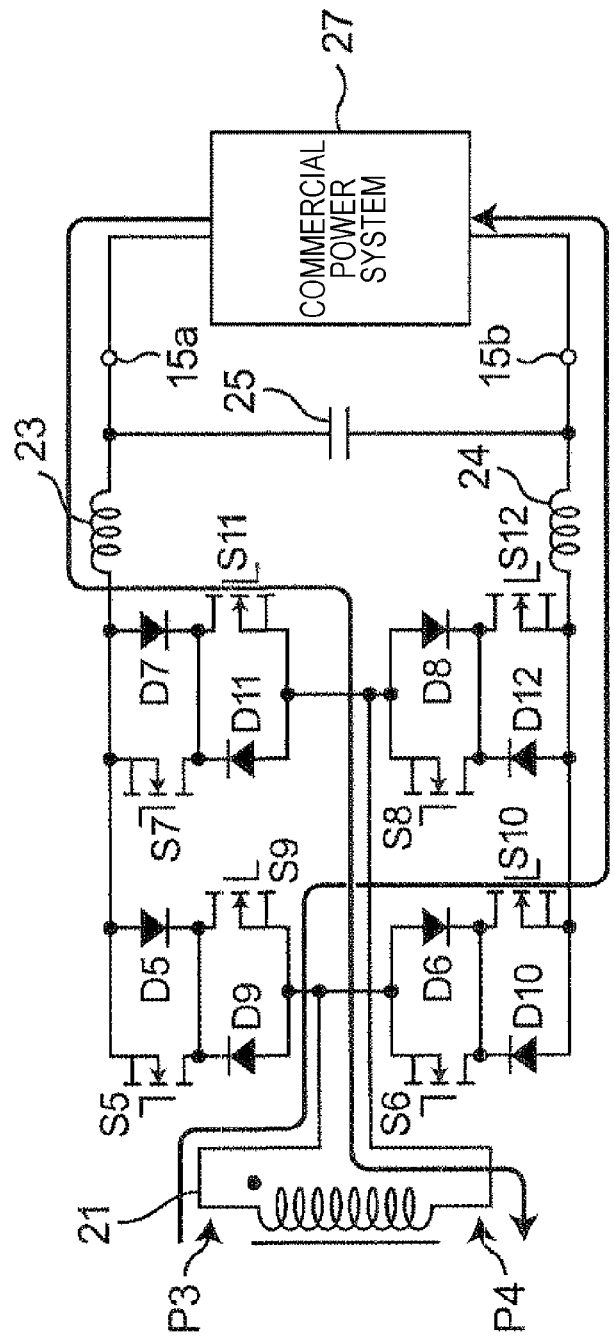
FIG. 11 illustrates a sixth current path in the secondary side converter circuit illustrated in FIG. 4.
Figure 12:
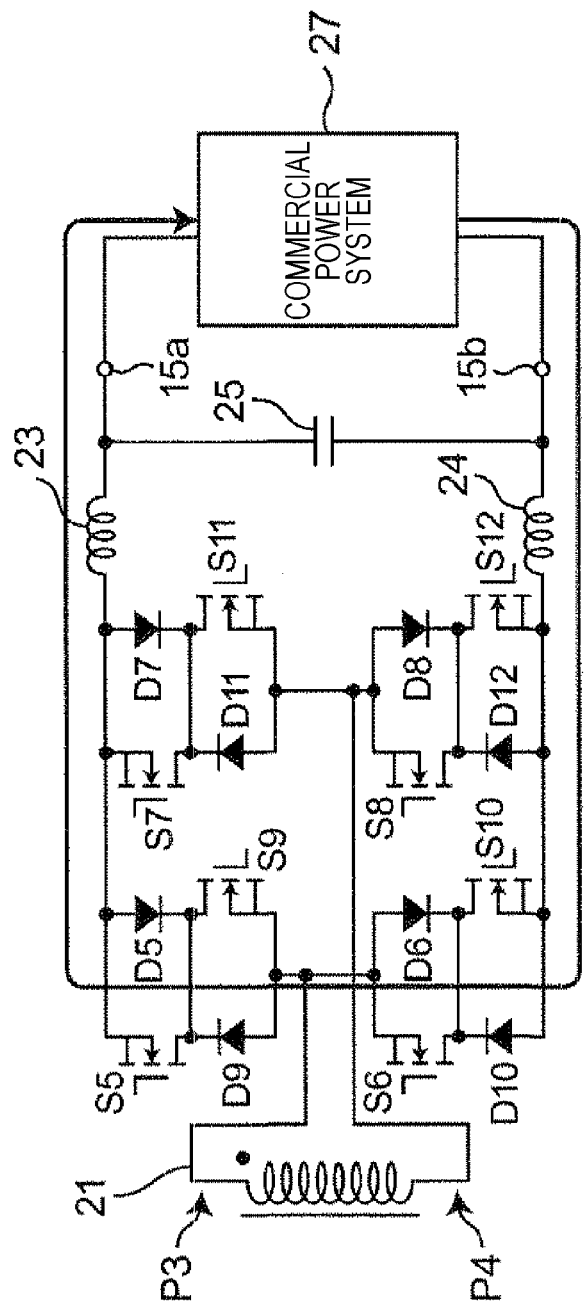
FIG. 12 illustrates a seventh current path in the secondary side converter circuit illustrated in FIG. 4.
Figure 13:
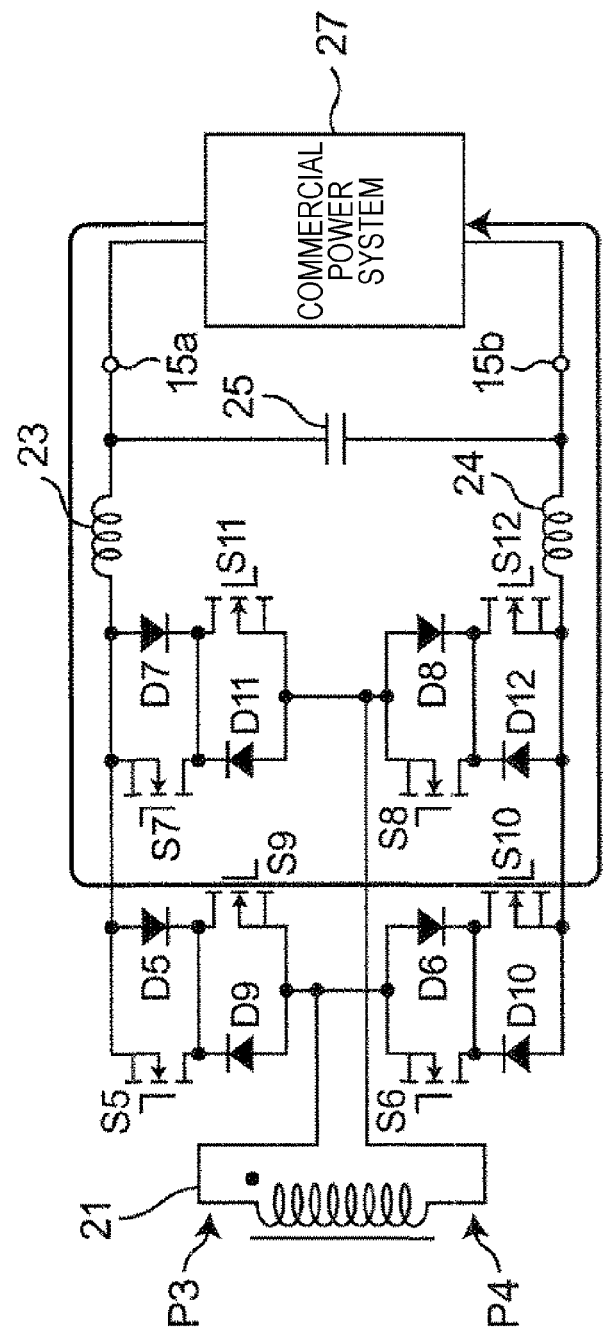
FIG. 13 illustrates an eighth current path in the secondary side converter circuit illustrated in FIG. 4.

The operation performed during the period T4 illustrated in FIG. 5 is described below. At this time, the pulse wave AC signal output from the primary side inverter circuit 5 is negative. The switch S5 may be opened or closed, the switch S9 is open, the switch S7 is closed, the switch S11 is closed, the switch S6 is closed, the switch S10 is closed, and the switch S8 is turned either on or off, and the switch S12 is open. Thus, a current flows through the path illustrated in FIG. 8 or 11. At this time, the output voltage Vo of the secondary side converter circuit 11 is equal to the voltage −VE between the terminals P3 and P4 of the secondary winding 21, which is higher than the voltage Vout at the terminals 15a and 15b. Accordingly, the current gradually increases.

As described above, during the period in which the voltage V1 between the terminals P3 and P4 of the secondary winding 21 is +VE, the period in which the voltage V1 is −VE, and the period in which the polarity of the voltage V1 is reversed, the switches to be conducted are changed to apply a voltage.

Note that during the above-described periods T1 to T4 and T9, no current flows in the switch that is either on or off even if the switch is closed.

Let T be the length of period T01, let Ton be the length of period T2, and let Toff (=T−Ton) be the length of period T1. In addition, let L be the inductance of the coil 23. Then, during the period T2, the voltage +VE is applied to the coil 23. An increment $\Delta ioa$ of the current io of the coil 23 during the period T2 is given as follows:

$$\Delta ioa = (VE - Vout)/L \times Ton$$

During the period T2, a voltage of 0 V is applied to the coil 23. A decrement $\Delta iob$ of the current io of the coil 23 during the period T2 is given as follows:

$$\Delta iob = Vout/L \times (T - Ton)$$

As in the periods T1 and T2, even in the periods T3 and T4, the current io of the coil 23 increases or decreases.

During the period T2, ripple occurs in the current io of the coil 23 in accordance with the voltage applied to the coil 23.

In the stable state, $\Delta ioa$ and $\Delta iob$ are the same, so that the following equation holds:

$$Vout = Ton/T \times VE = D \times VE$$

where D is the duty ratio of the switches S1 to S4.

By changing the duty ratio D through PWM control, AC output is available.

Since, during the Ton period, the power is supplied from the power conversion device 1 to the commercial power system 27, the Ton period is referred to as a "power supply period". In addition, since, during the Toff period, the current circulates in a loop including the terminals 15a and 15b which are short-circuited without passing through the secondary winding 21, the Toff period is referred to as a "circulation period".

FIGS. 14A to 14H are diagrams for describing the synchronous rectification sequence performed by the secondary side converter circuit 11 when the voltage V1 between the terminals P3 and P4 of the secondary winding 21 illustrated in FIG. 4 is inverted.

Figure 14A:
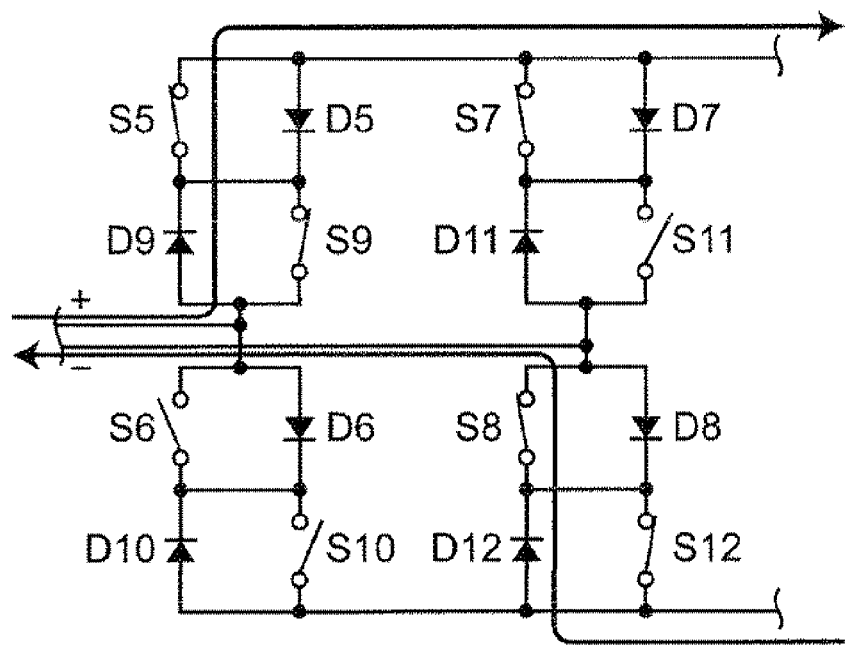
FIG. 14A is a first diagram describing a synchronous rectification sequence performed by the secondary side converter circuit when a voltage between terminals of a secondary winding illustrated in FIG. 4 is inverted.
Figure 14B:
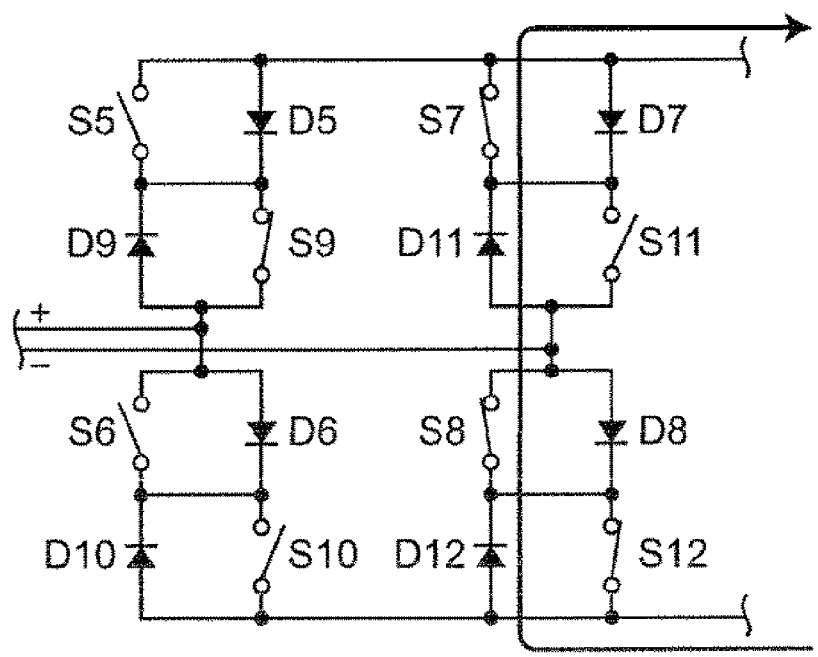
FIG. 14B is a second diagram describing the synchronous rectification sequence performed by the secondary side converter circuit when the voltage between the terminals of the secondary winding illustrated in FIG. 4 is inverted.
Figure 14C:
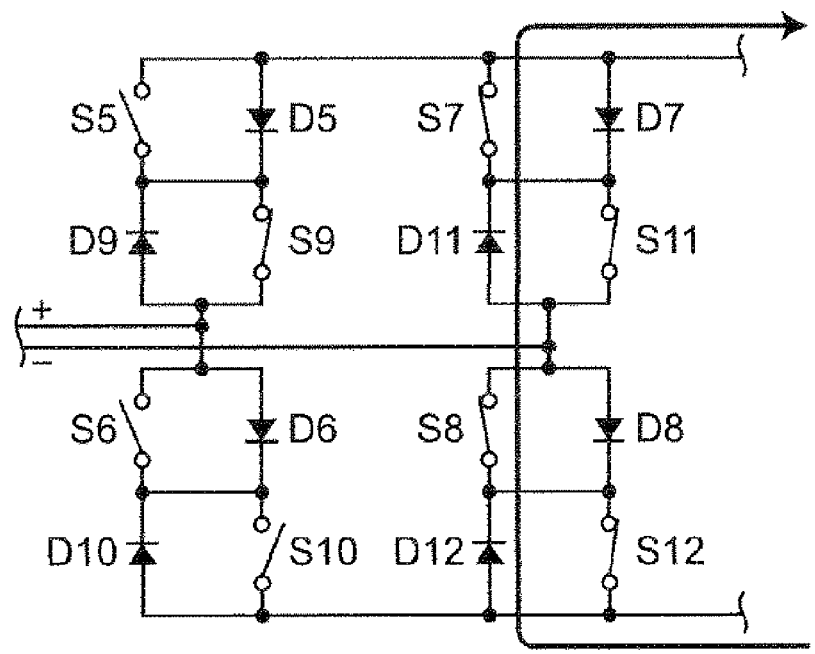
FIG. 14C is a third diagram describing the synchronous rectification sequence performed by the secondary side converter circuit when the voltage between the terminals of the secondary winding illustrated in FIG. 4 is inverted.

FIG. 14A illustrates a state in which a positive voltage V1 is applied between the terminals P3 and P4 of the secondary winding 21 illustrated in FIG. 4 and a positive current flows through the commercial power system 27. FIG. 14H illustrates a state in which a negative voltage V1 is applied between the terminals P3 and P4 of the secondary winding 21 illustrated in FIG. 4 and a positive current flows through the commercial power system 27. When the voltage V1 between the terminals P3 and P4 of the secondary winding 21 illustrated in FIG. 4 is inverted and transition from the state illustrated in FIG. 14A to the state illustrated in FIG. 14H occurs, the states illustrated in FIGS. 14B to 14G sequentially appear. In the states illustrated in FIGS. 14B to 14G, only the circulating current that does not pass through the secondary winding 21 flows through the secondary side converter circuit 11 and, thus, the voltage between the terminals 15a and 15b in FIG. 4 becomes zero. In this way, by providing the circulation period before the voltage V1 between the terminals P3 and P4 of the secondary winding 21 is inverted, only an excitation current flows in the primary side. In this manner, the loss caused by switching off the switches S1 to S4 of the primary side inverter circuit 5 can be reduced.

Figure 14D:
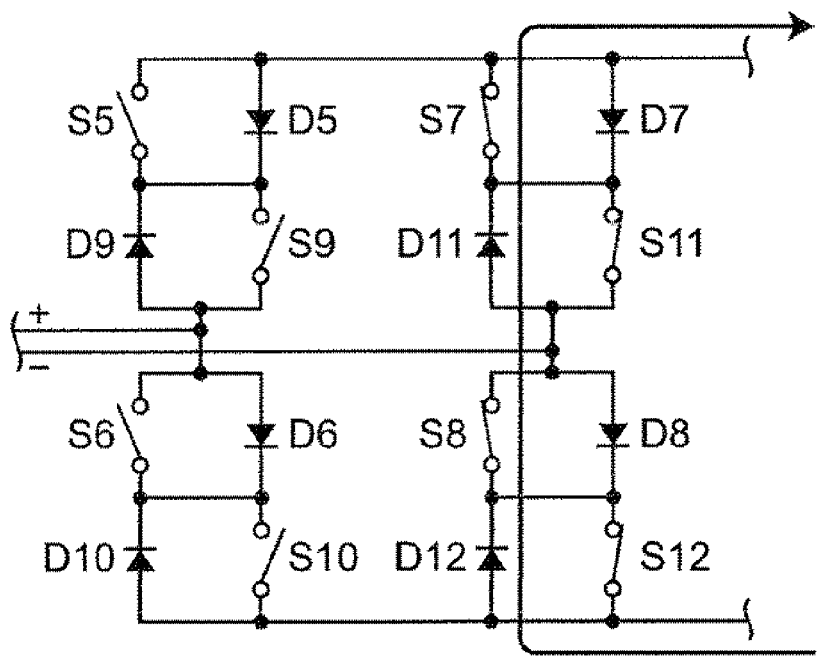
FIG. 14D is a fourth diagram describing the synchronous rectification sequence performed by the secondary side converter circuit when the voltage between the terminals of the secondary winding illustrated in FIG. 4 is inverted.
Figure 14E:
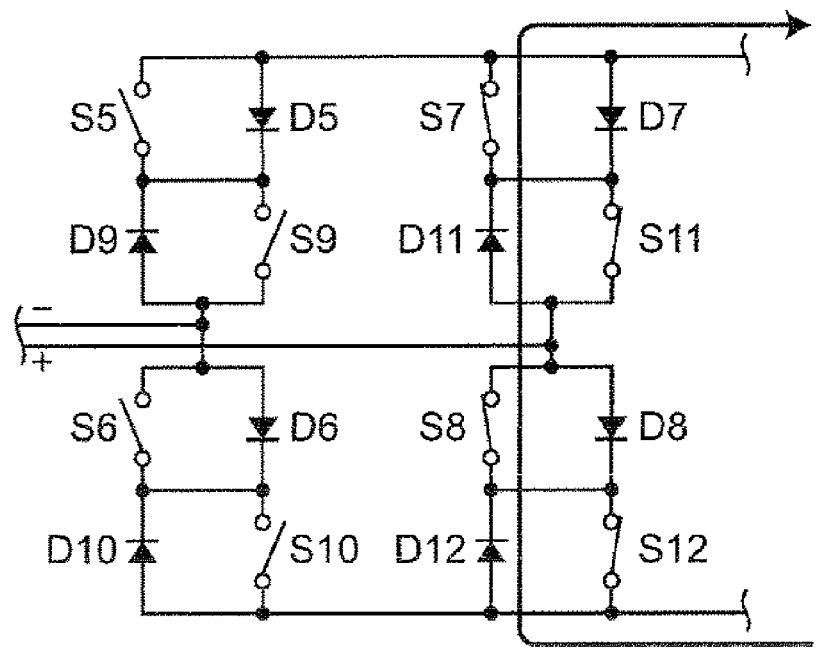
FIG. 14E is a fifth diagram describing the synchronous rectification sequence performed by the secondary side converter circuit when the voltage between the terminals of the secondary winding illustrated in FIG. 4 is inverted.
Figure 14F:
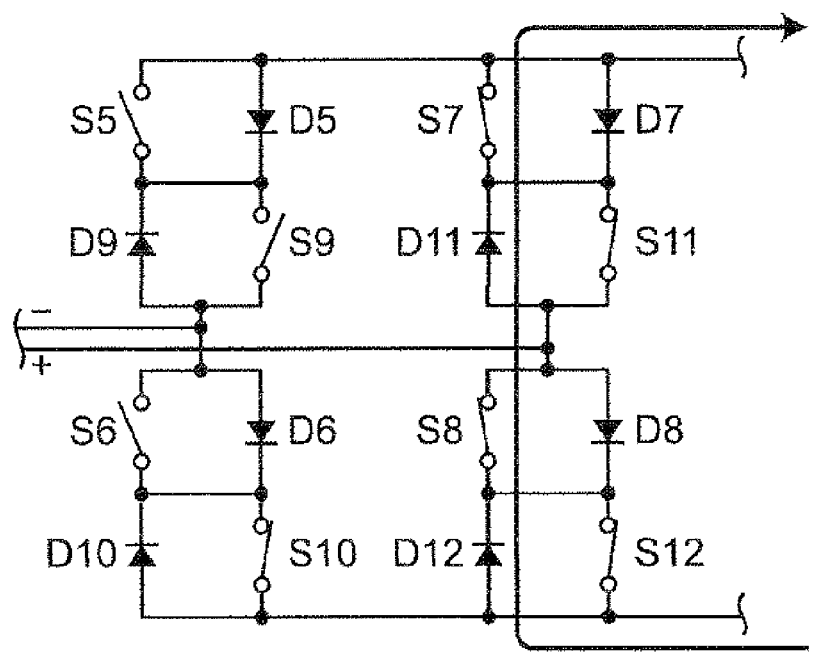
FIG. 14F is a sixth diagram describing the synchronous rectification sequence performed by the secondary side converter circuit when the voltage between the terminals of the secondary winding illustrated in FIG. 4 is inverted.
Figure 14G:
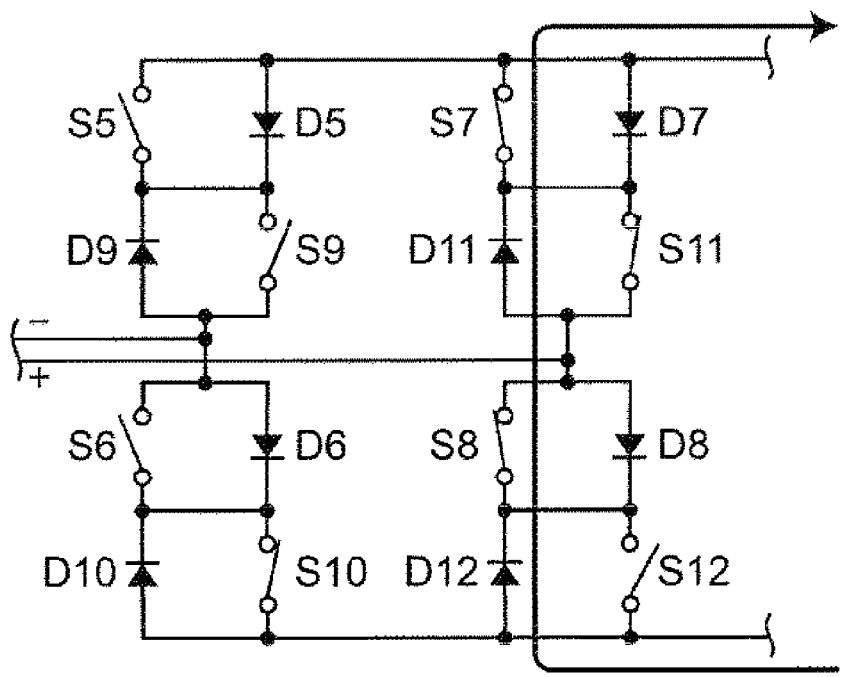
FIG. 14G is a seventh diagram describing the synchronous rectification sequence performed by the secondary side converter circuit when the voltage between the terminals of the secondary winding illustrated in FIG. 4 is inverted.
Figure 14H:
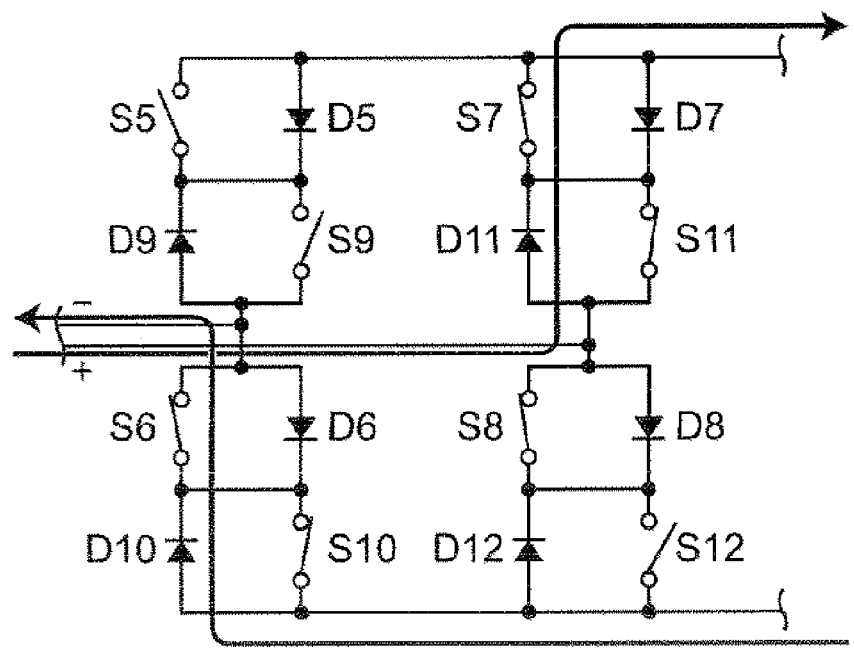
FIG. 14H is an eighth diagram describing the synchronous rectification sequence performed by the secondary side converter circuit when the voltage between the terminals of the secondary winding illustrated in FIG. 4 is inverted.

In addition, by controlling the switches S7, S8, S11 and S12 as illustrated in FIGS. 14B to 14G (synchronous rectification), the current flows through the switches S11 and S12 in FIGS. 14C to 14F instead of through the diodes D11 and D12. As a result, the loss is reduced more than in the case where the current flows through the diodes D11 and D12. Furthermore, by controlling the switches S6 and S10 as illustrated in FIGS. 14E to 14H (synchronous rectification), the current flows through the switch S10 instead of through the diode D10 in FIG. 14H, resulting in a decrease in the loss more than in the case in which the current flows through the diode D10. Similarly, when transition from the state illustrated in FIG. 14H to the state illustrated in FIG. 14A occurs, the current flows through the switch S9 instead of through the diode D9 in FIG. 14A by controlling the switches S5 and S9 (synchronous rectification) as illustrated in FIGS. 14D to 14A. As a result, the loss is reduced more than in the case in which the current flows through the diode D9.

The occurrence of ringing in the power conversion device 1A illustrated in FIG. 4 is described below.

Figure 15:
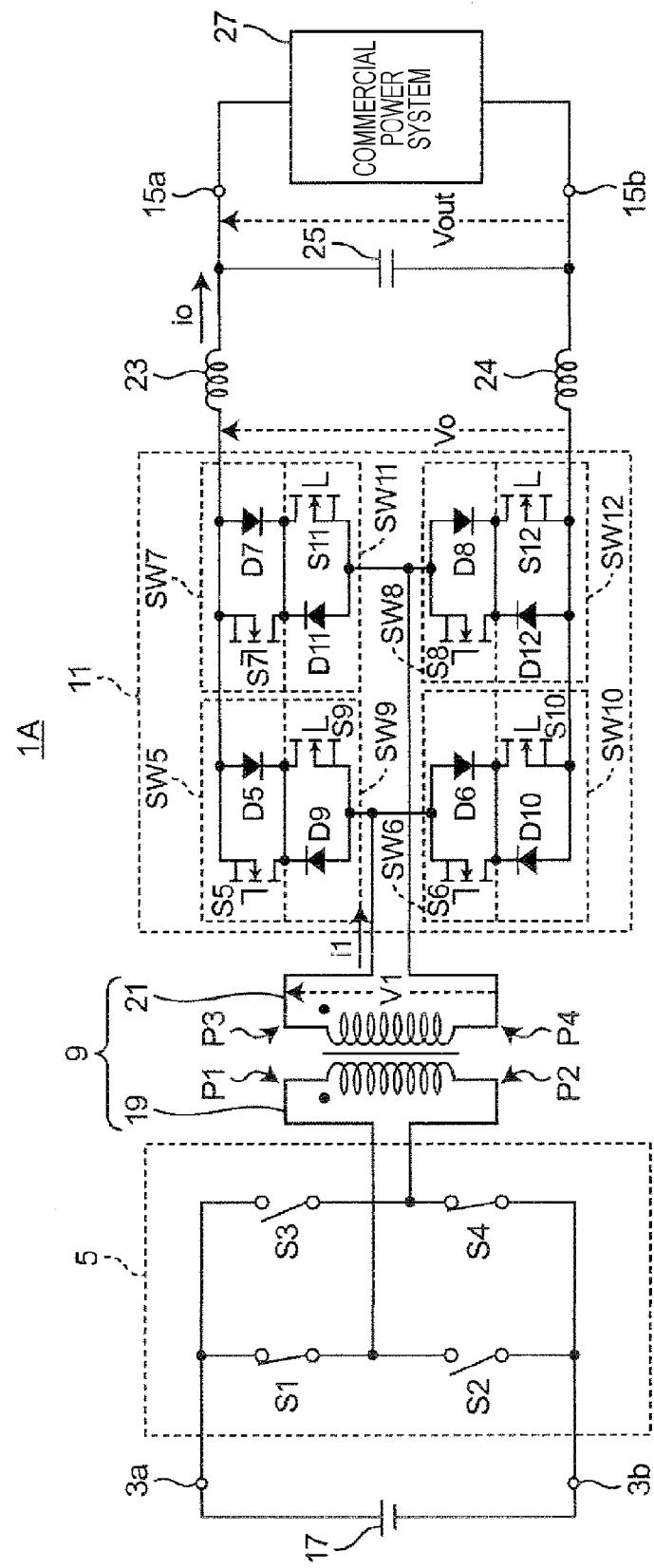
FIG. 15 is a circuit diagram illustrating the state of the primary side inverter circuit of the power conversion device illustrated in FIG. 4 during a period illustrated in FIG. 5.
Figure 16:
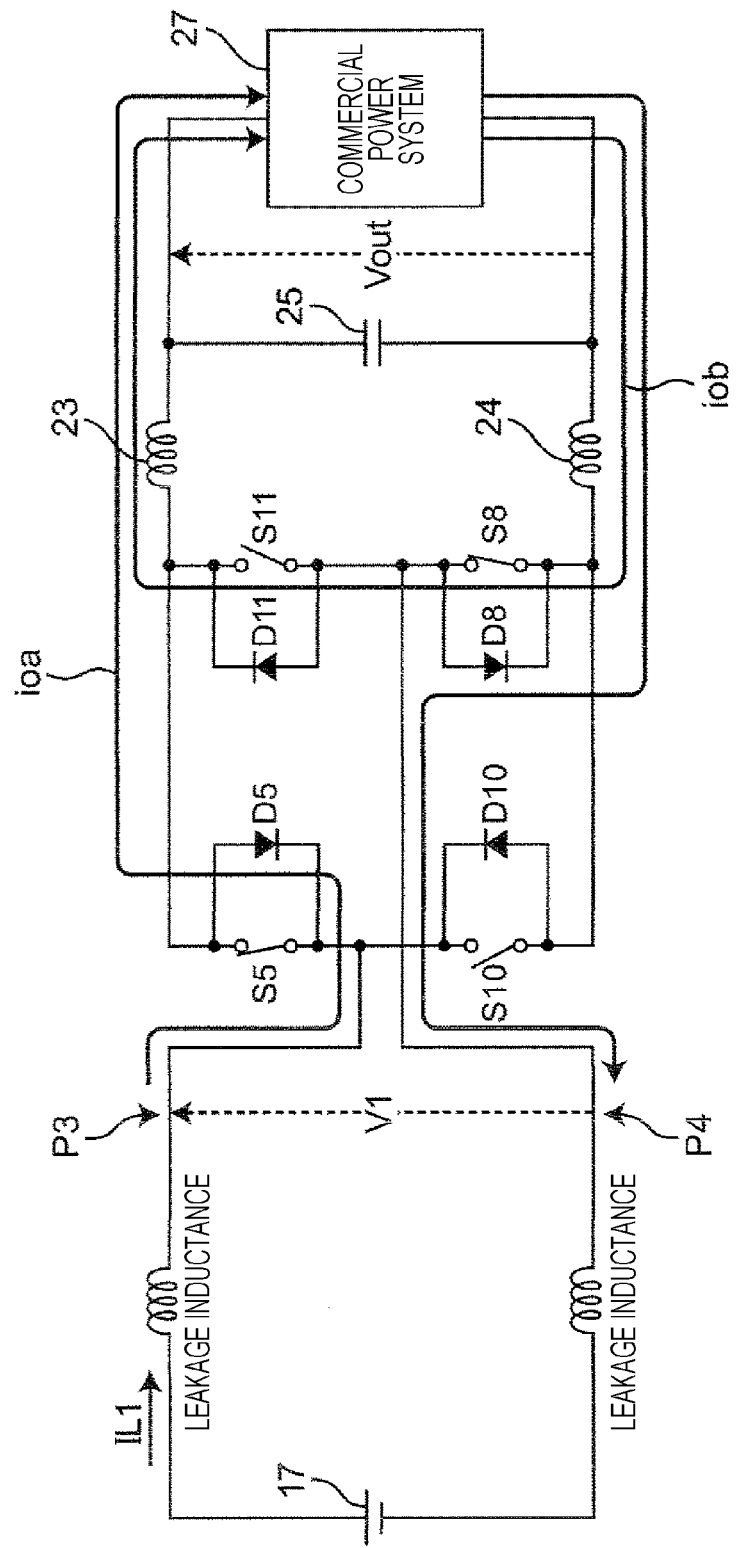
FIG. 16 is an equivalent circuit diagram of the power conversion device illustrated in FIG. 4 during the period illustrated in FIG. 5.
Figure 17:
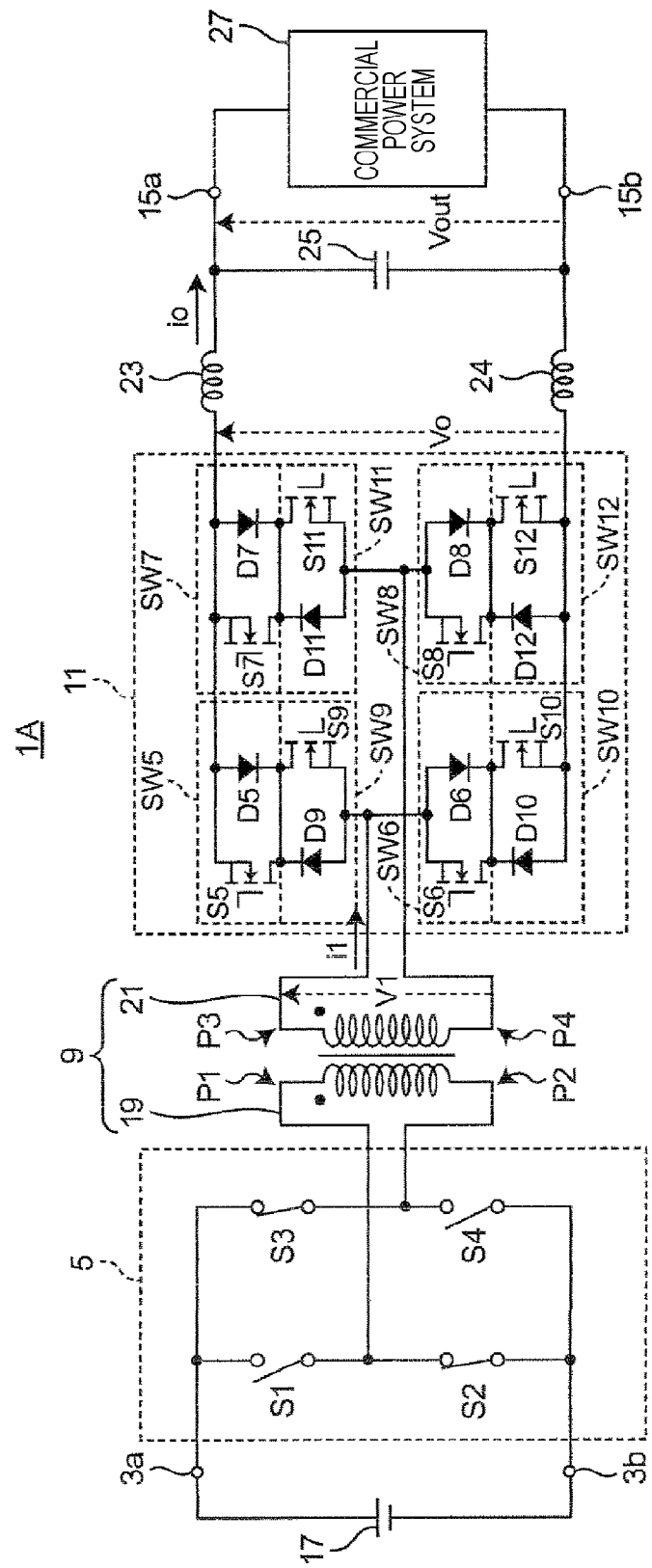
FIG. 17 is a circuit diagram illustrating the state of the primary side inverter circuit of the power conversion device illustrated in FIG. 4 during a period illustrated in FIG. 5.
Figure 18:
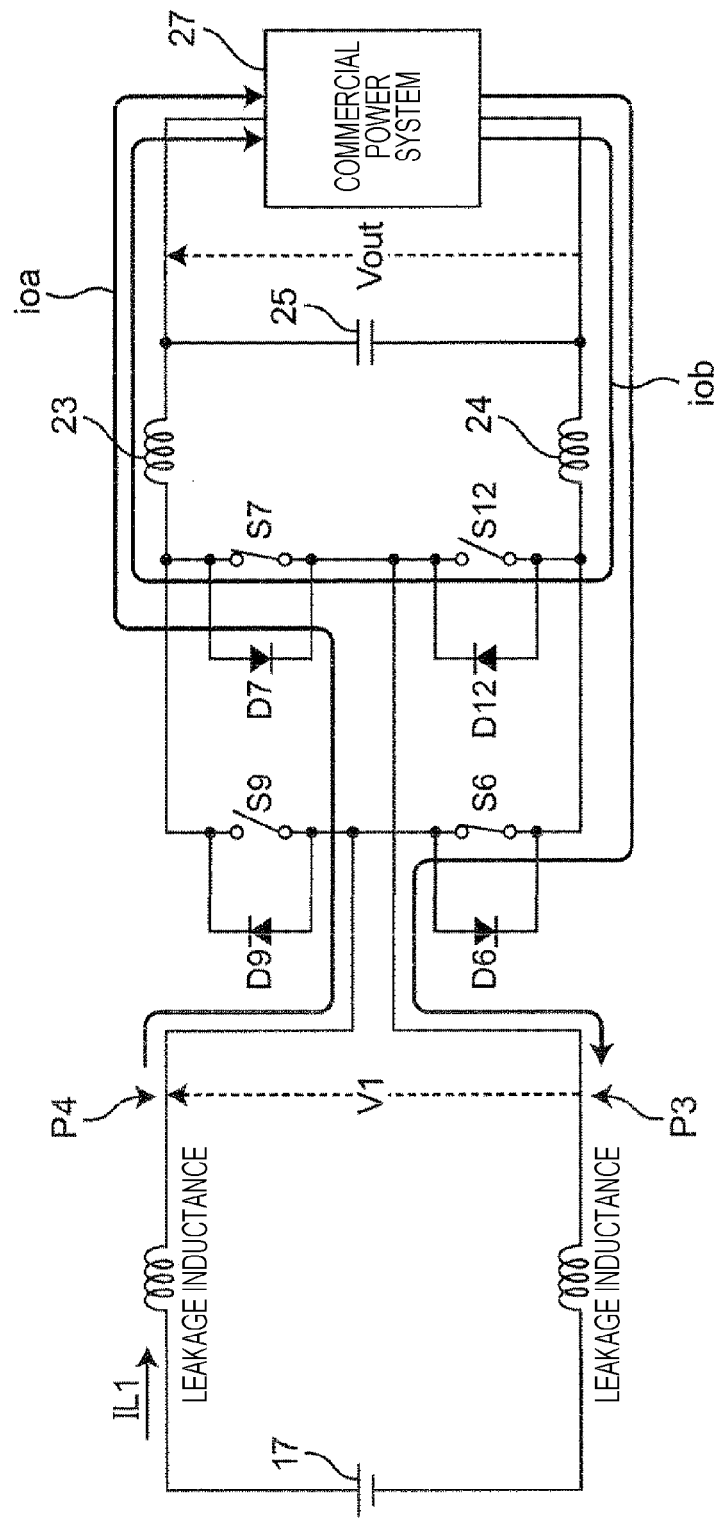
FIG. 18 is an equivalent circuit diagram of a power conversion device illustrated in FIG. 4 during a period illustrated in FIG. 5.

FIG. 15 is a circuit diagram illustrating the state of the primary side inverter circuit 5 of the power conversion device 1A illustrated in FIG. 4 during the period T01 illustrated in FIG. 5. FIG. 16 is an equivalent circuit diagram of the power conversion device 1A illustrated in FIG. 4 during the period T01 illustrated in FIG. 5. FIG. 17 is a circuit diagram illustrating the state of the primary side inverter circuit 5 of the power conversion device 1A illustrated in FIG. 4 during the period T02 illustrated in FIG. 5. FIG. 18 is an equivalent circuit diagram of the power conversion device 1A illustrated in FIG. 4 during the period T02 illustrated in FIG. 5. Note that the secondary side converter circuit 11 during the period T01 and the secondary side converter circuit 11 during the period T02 are equivalent to the circuits illustrated in FIGS. 16 and 18, respectively. The transformer 9 is equivalently represented by a wire connection between the primary side inverter circuit 5 and the secondary side converter circuit 11 and a leakage inductance connected in series with the power source line. In this description, since only the path of a current flowing to the commercial power system 27 is discussed, the excitation inductance of a path through which the current does not flow is not illustrated. When the period T01 and the period T02 are individually discussed in this way, the power conversion device 1 is considered as being the same as an existing inverter circuit. However, since the leakage inductance of the transformer 9 is in series to the power source line, the ringing caused by switching may increase more than in the conventional inverter circuit. When a load is applied to the power conversion device 1A, a ripple component similar to that in the case of no load is present in the current io, and an increment of the current due to the load is overlaid on the current io. Only in the power supply period, an increment of the current due to the load is overlaid on the current IL1 of the transformer 9.

Ringing due to the leakage inductance occurs because a change in the current over time (di/dt) occurs. Accordingly, ringing occurs when the path of the current flowing through the leakage inductance changes.

Figure 19:
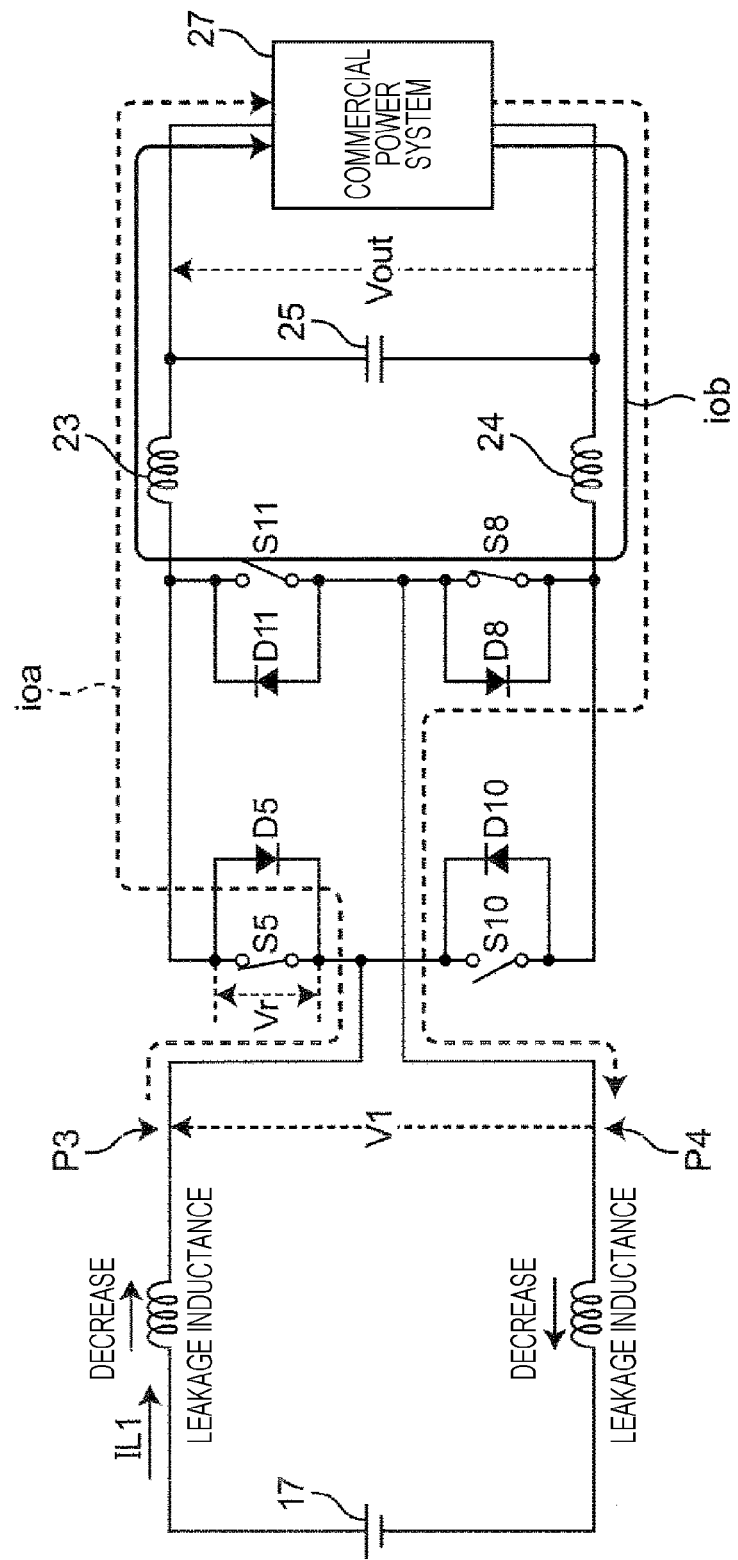
FIG. 19 is a diagram illustrating a first case in which ringing occurs in the power conversion device illustrated in FIG. 4.

FIG. 19 is a diagram illustrating a first case in which ringing occurs in the power conversion device 1A illustrated in FIG. 4. When the switch S5 is opened, the current path changes from the path indicated by a thick dotted line to the path indicated by a bold solid line. The current of the leakage inductance decreases (di/dt<0). In addition, a voltage Ldi/dt is generated between the leakage inductances. As a result, ringing occurs so as to be overlaid on the power source voltage VE.

Figure 20:
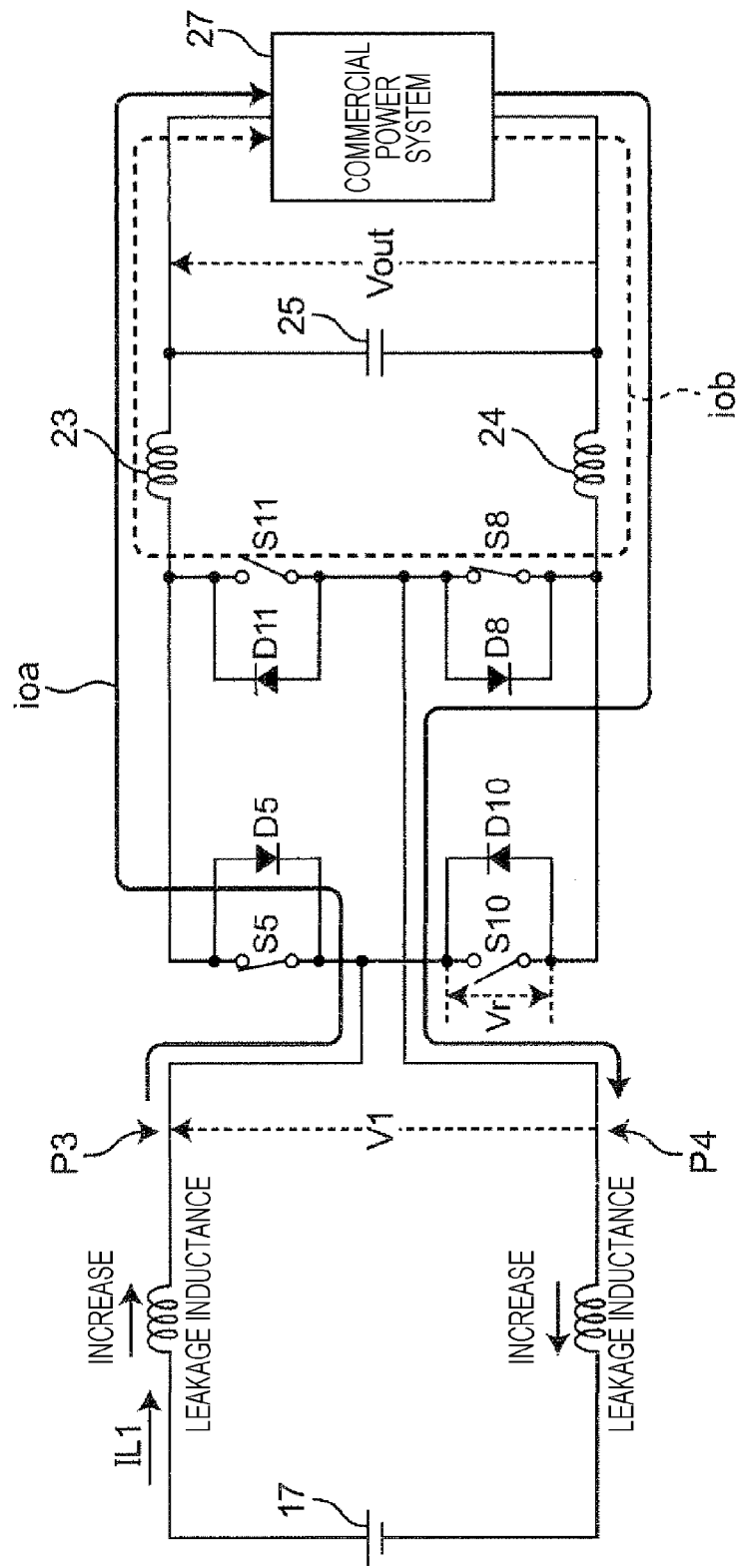
FIG. 20 is a diagram illustrating a second case in which ringing occurs in the power conversion device illustrated in FIG. 4.

FIG. 20 is a diagram illustrating a second case in which ringing occurs in the power conversion device 1A illustrated in FIG. 4. When the switch S5 is closed, the current path changes from a path indicated by a thick dotted line to a path indicated by a bold solid line. The current enters the leakage inductance (di/dt>0). In addition, a voltage Ldi/dt is generated between the leakage inductances. As a result, ringing occurs so as to be overlaid on the power source voltage VE.

Figure 21:
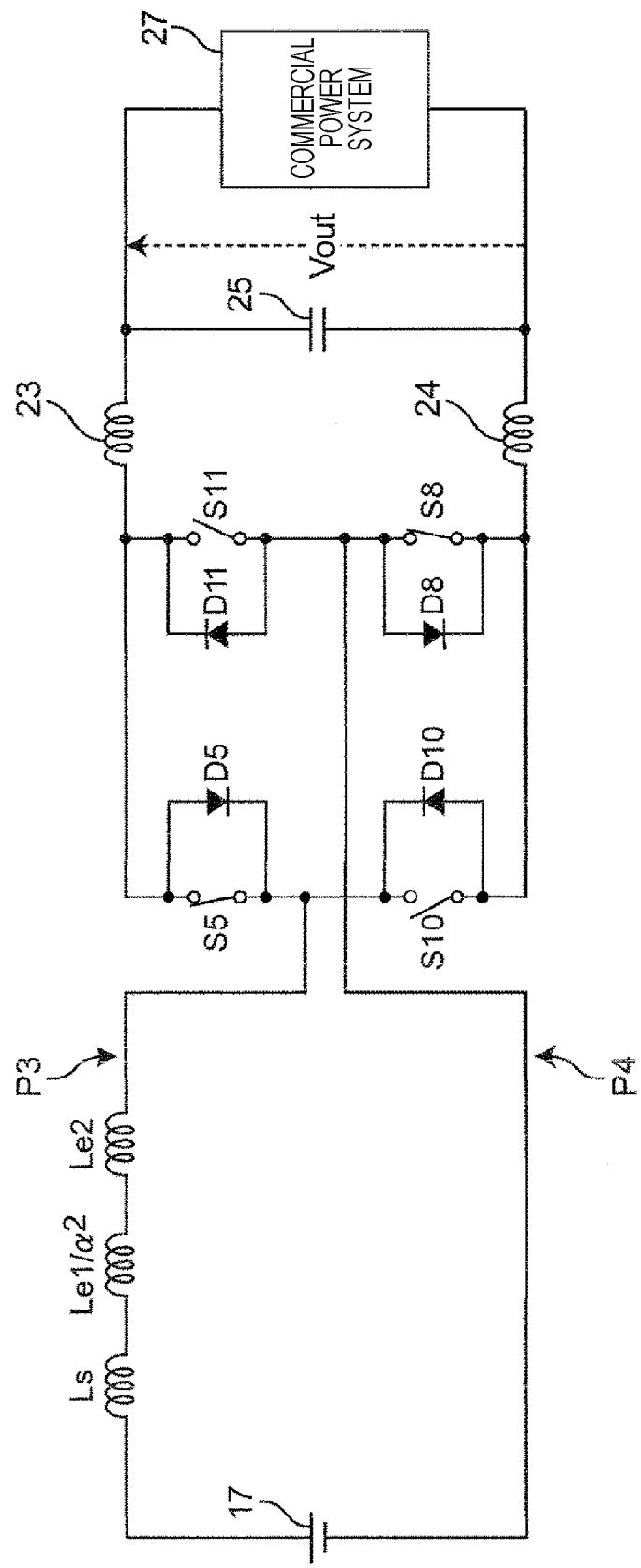
FIG. 21 is an equivalent circuit diagram of the power conversion device illustrated in FIG. 4.

FIG. 21 is an equivalent circuit diagram of the power conversion device 1A illustrated in FIG. 4. Only the period T01 illustrated in FIG. 5 is discussed. The switches S1 and S4 are closed, the switches S2 and S3 are open, and the switches S7 and S12 are closed. The switches S6 and S9 may be either ON or OFF. This is because since the voltage between the terminals P3 and P4 of the secondary winding 21 is +VE, a current flows through the diodes D6 and D9 even when the switches S6 and S9 are open. It is assumed that only the switches S5, S10, S11, and S8 are controlled. FIG. 21 illustrates an equivalent circuit in the case where the turn ratio of the transformer 9 is α:1 and the primary side circuit of the transformer 9 represents the view from the secondary side. Since the excitation current is significantly smaller than the load current, the excitation admittance is negligible. Note that in FIG. 21, only the inductance components are illustrated, and the resistance component is ignored. Ls represents a parasitic inductance of the primary side circuit (for example, the internal inductances of the wiring in a path that starts from the DC power source 17 and returns to the DC power source 17 via the switch S1, the primary winding 19, and the switch S4, the switches S1 and S4 themselves, and the DC power source 17). Le1 represents the leakage inductance of the primary winding 19 of the transformer 9. Le2 represents the leakage inductance of the secondary winding 21 of the transformer 9.

Figure 22:
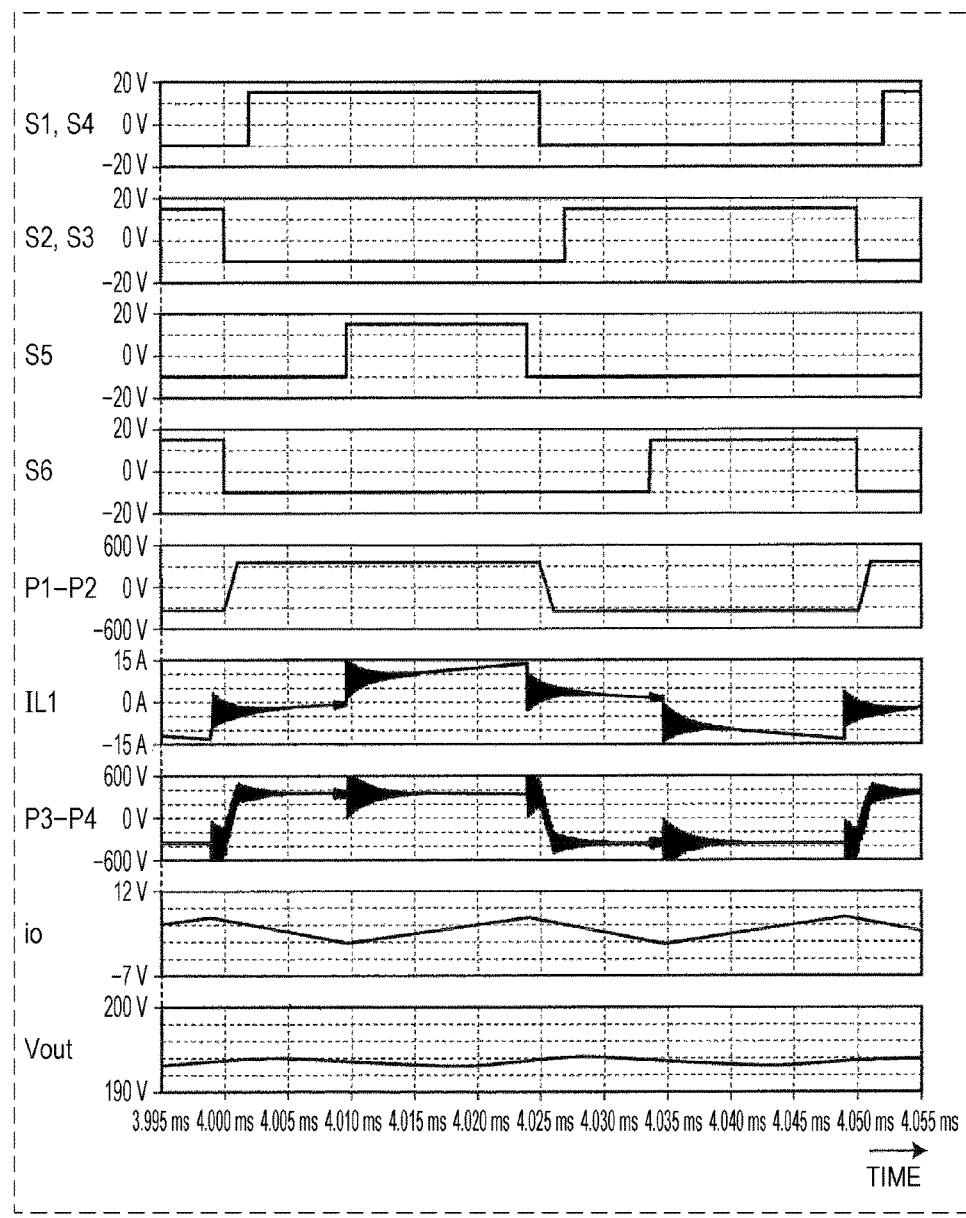
FIG. 22 is a waveform diagram illustrating the ringing occurring in the power conversion device illustrated in FIG. 1.

FIG. 22 is a waveform diagram illustrating the ringing occurring in the power conversion device 1A illustrated in FIG. 4. It can be seen from FIG. 22 that ringing occurs in the output current IL1 of the primary side inverter circuit 5, and ringing occurs in the voltage V1 between the terminals P3 and P4 of the secondary winding 21.

Figure 23:
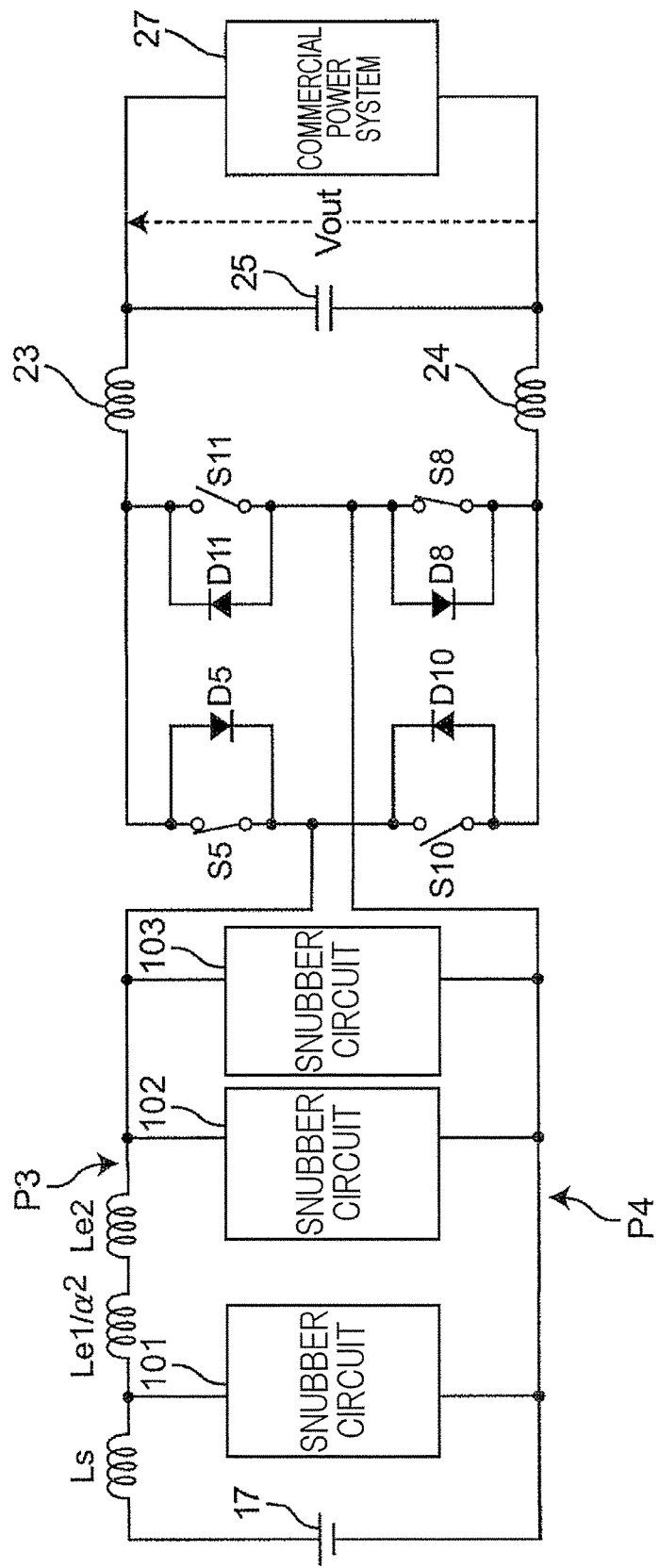
FIG. 23 is an equivalent circuit diagram of the power conversion device illustrated in FIG. 1.

FIG. 23 is an equivalent circuit diagram of the power conversion device 1 illustrated in FIG. 1. To reduce ringing, it is effective to reduce the inductance. The inductance of the power conversion device 1 mainly include the parasitic inductance Ls in the path and the leakage inductances Le1 and Le2 of the transformer 9. The power conversion device 1 includes the snubber circuits 101 to 103 to reduce ringing.

The snubber circuit 101 includes a capacitor C10 disposed in the immediate vicinity of the primary winding 19 across the terminals P1 and P2 of the primary winding 19. The parasitic inductance Ls of the primary side inverter circuit 5 can be bypassed by the capacitor C10. Thus, the effect of reducing the ringing of the current IL1 can be provided.

The snubber circuit 102 includes the capacitor C10 and a resistor R10 connected in series across the terminals P3 and P4 of the secondary winding 21. A ringing component of the voltage V1 passes through the capacitor C10 and the resistor R10 and gradually attenuates.

The snubber circuit 103 is provided across the terminals P3 and P4 of the secondary winding 21. A square wave alternating current signal having positive and negative voltages is applied between the terminals P3 and P4 of the secondary winding 21, so that rectification is performed by the diode bridge, smoothing is performed by the capacitor C21, and a desired amount of energy is discharged by the resistor R21. That is, a voltage of a value that provides a balance between the charging energy discharged due to ringing and the discharging energy by the resistor R21 is applied to the capacitor C21. The voltage is set as the clamping voltage of the snubber circuit 103.

The power conversion device 1 may include only one or two of the snubber circuits 101 to 103. For example, convergence of ringing may be insufficient by providing only the snubber circuit 103 in the secondary winding 21. In such a case, the snubber circuits 102 and 103 may be combined and provided.

The result of simulation for the power conversion device 1 illustrated in FIG. 1 is described below with reference to FIGS. 24 to 30.

The simulation conditions are as follows. That is, the self-inductance of the transformer 9 is 1200 µH, the turn ratio is 1:1, the coupling ratio is 0.9997, and the leakage inductance (the total value of Le1 and Le2 in the equivalent circuit of transformer referred to secondary) is 720 nH. As a parasitic inductance of a semiconductor, a capacitor, and a pattern, an inductance of 20 nH is inserted at a plurality of points of the power conversion device 1. The capacitance of the capacitor C10 of the snubber circuit 101 is 5 nF. The capacitance of the capacitor C20 of the snubber circuit 102 is 1000 pF, and the resistance value of the resistor R20 is 45Ω. The capacitance of the capacitor C21 of the snubber circuit 103 is 2 µF, and the resistance value of the resistor R21 is 37.5 kΩ. The DC power source 17 generates a DC voltage of 350 V, the output voltage of the power conversion device 1 is an AC voltage of 200 V, and the output power is 2 kW.

Figure 24:
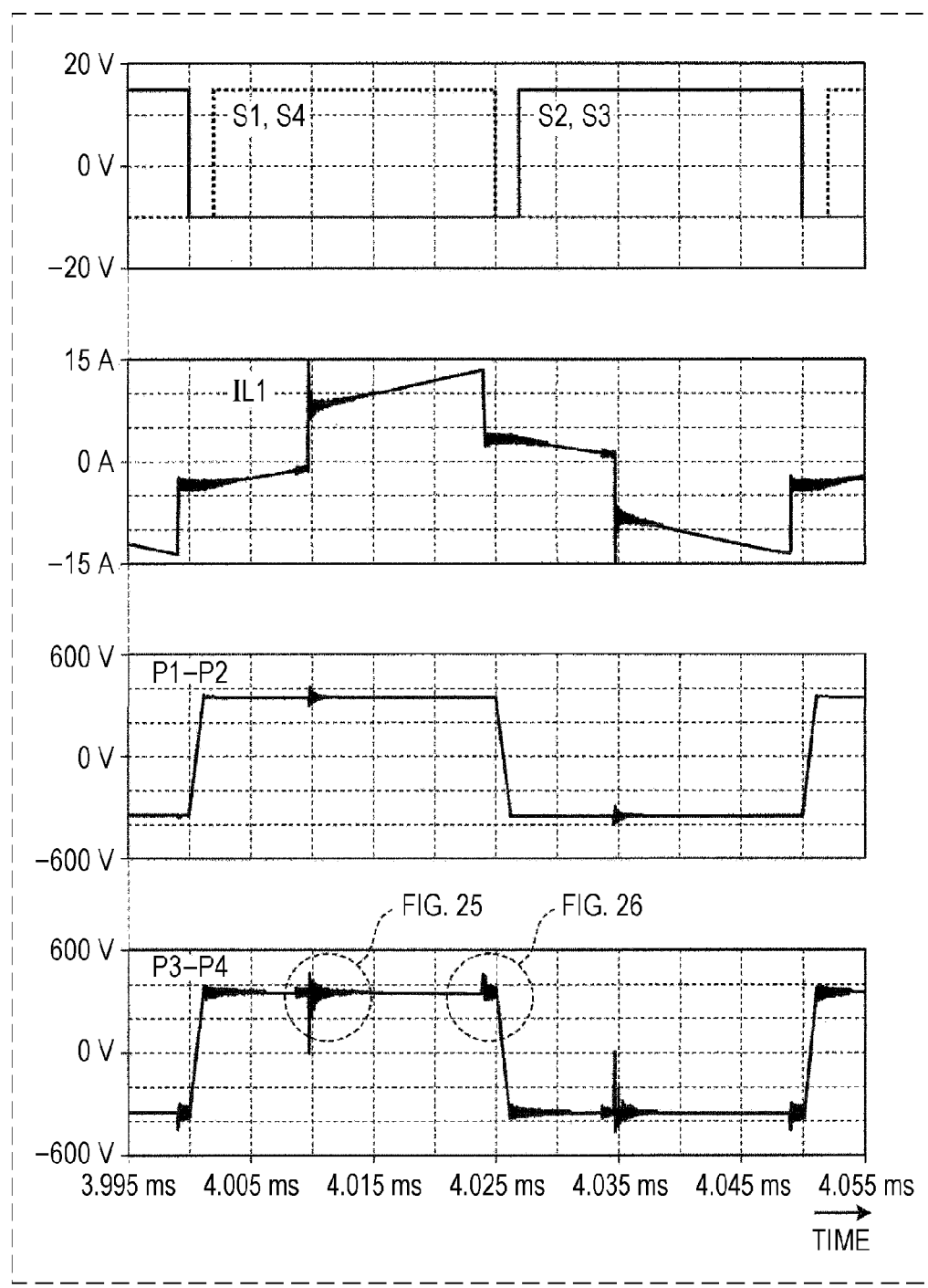
FIG. 24 is a graph illustrating prevention of ringing in the power conversion device including two snubber circuits illustrated in FIG. 1.
Figure 25:
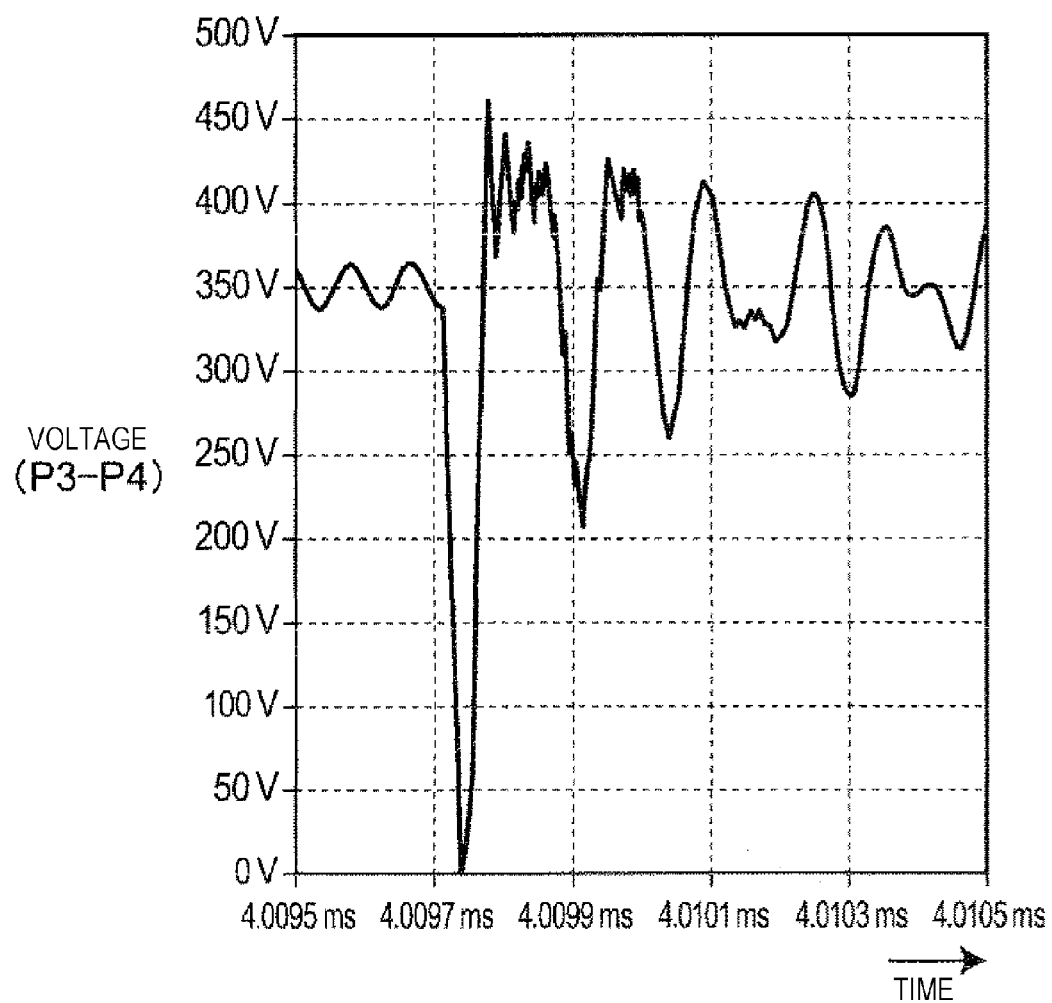
FIG. 25 is a partially enlarged view of FIG. 24.
Figure 26:
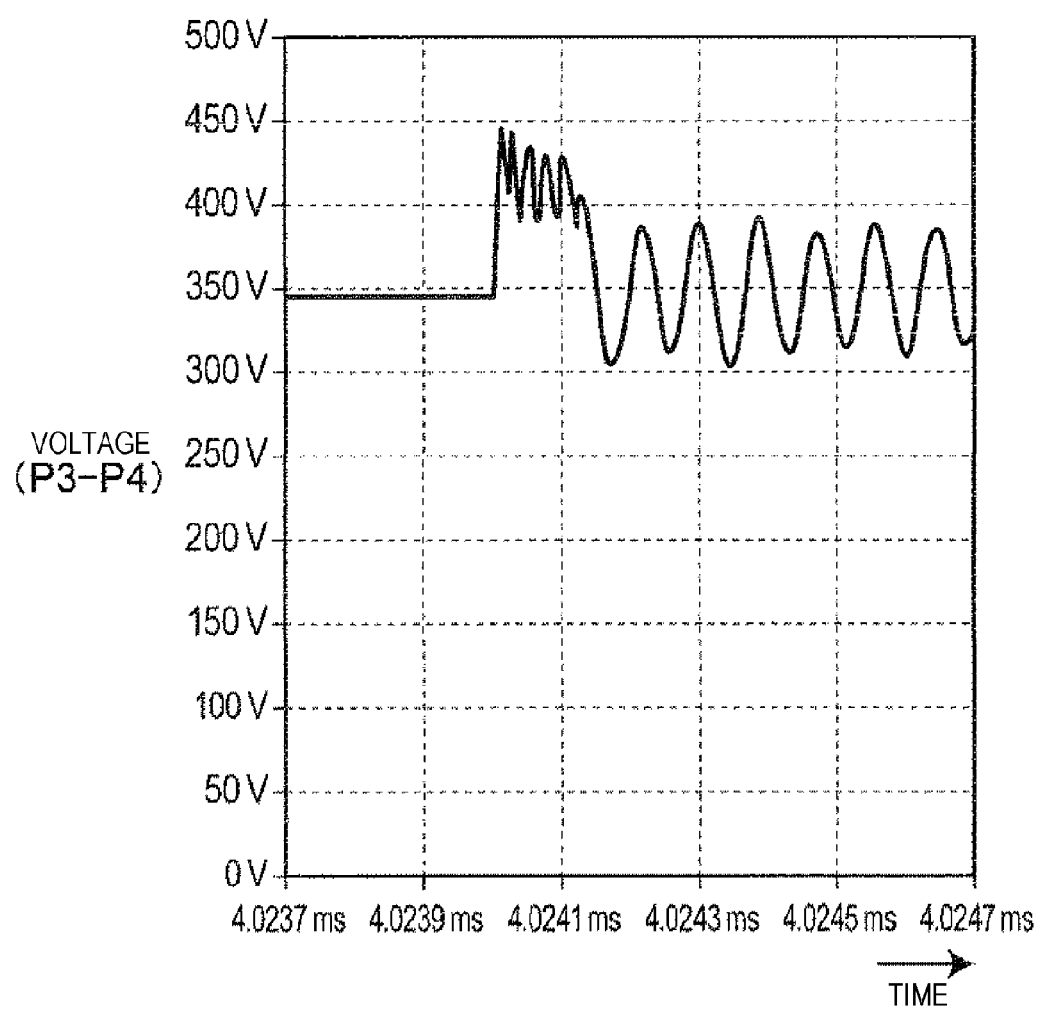
FIG. 26 is a partially enlarged view of FIG. 24.

FIG. 24 is a graph illustrating prevention of ringing in the power conversion device 1 including the snubber circuits 101 and 103 illustrated in FIG. 1. FIG. 25 is a partially enlarged view of FIG. 24. FIG. 26 is a partially enlarged view of FIG. 24. In the case illustrated in FIG. 24, the clamping voltage of the snubber circuit 103 is set to 411 V. At this time, a peak voltage of 460 V is generated at a point in FIG. 25, and a peak voltage of 446 V is generated at a point in FIG. 26.

Figure 27:
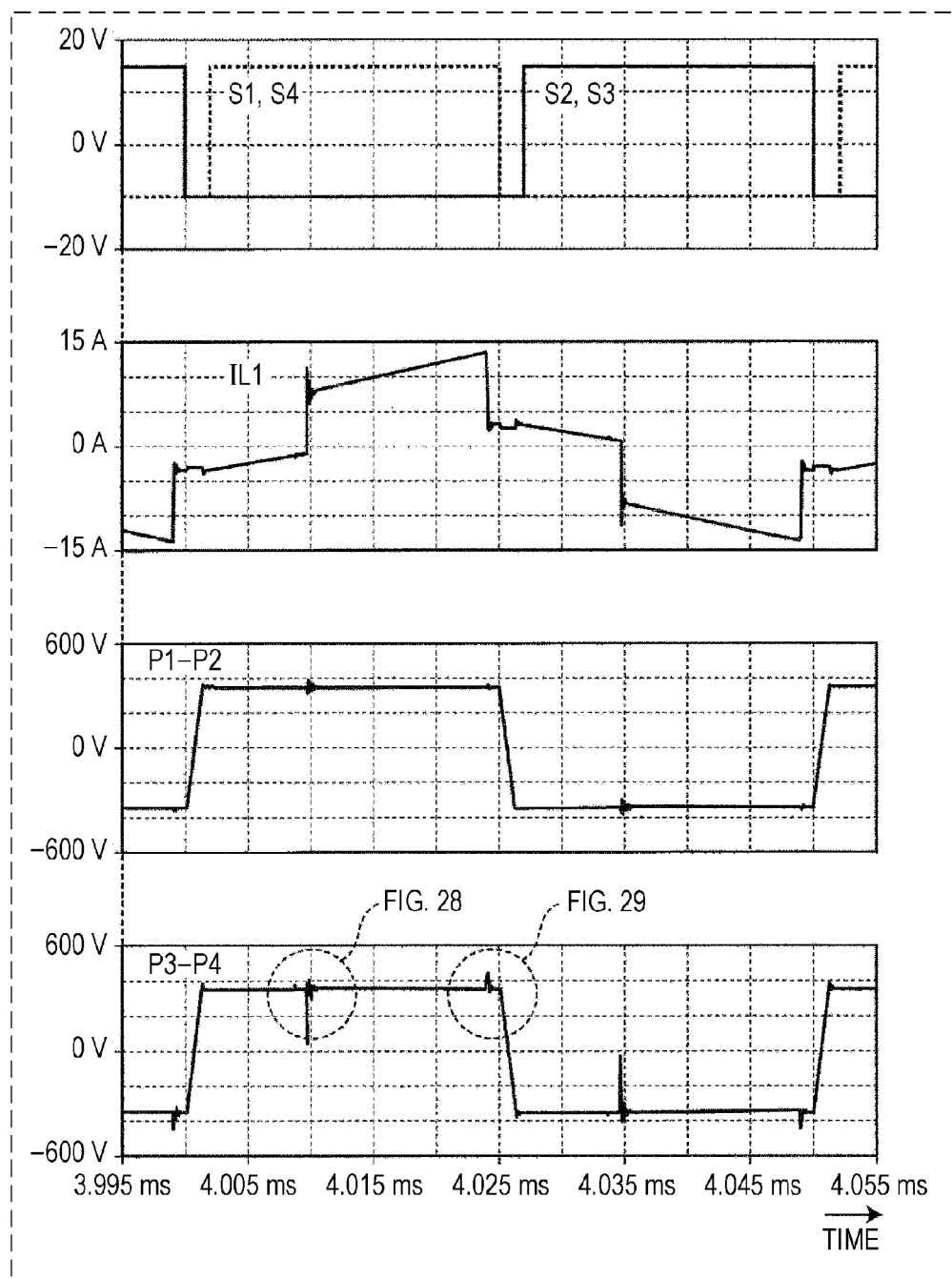
FIG. 27 is a graph illustrating prevention of ringing in the power conversion device including the three snubber circuits illustrated in FIG. 1.
Figure 28:
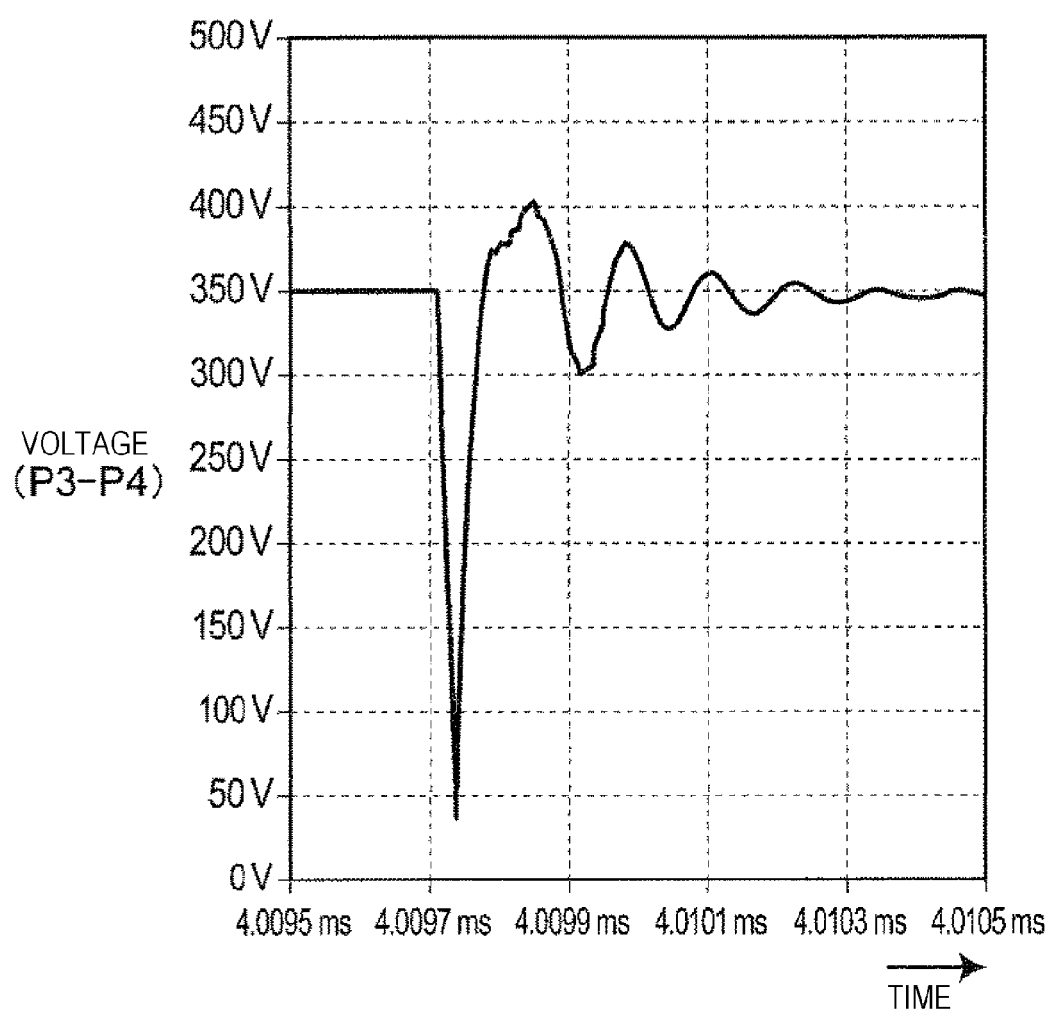
FIG. 28 is a partially enlarged view of FIG. 27.
Figure 29:
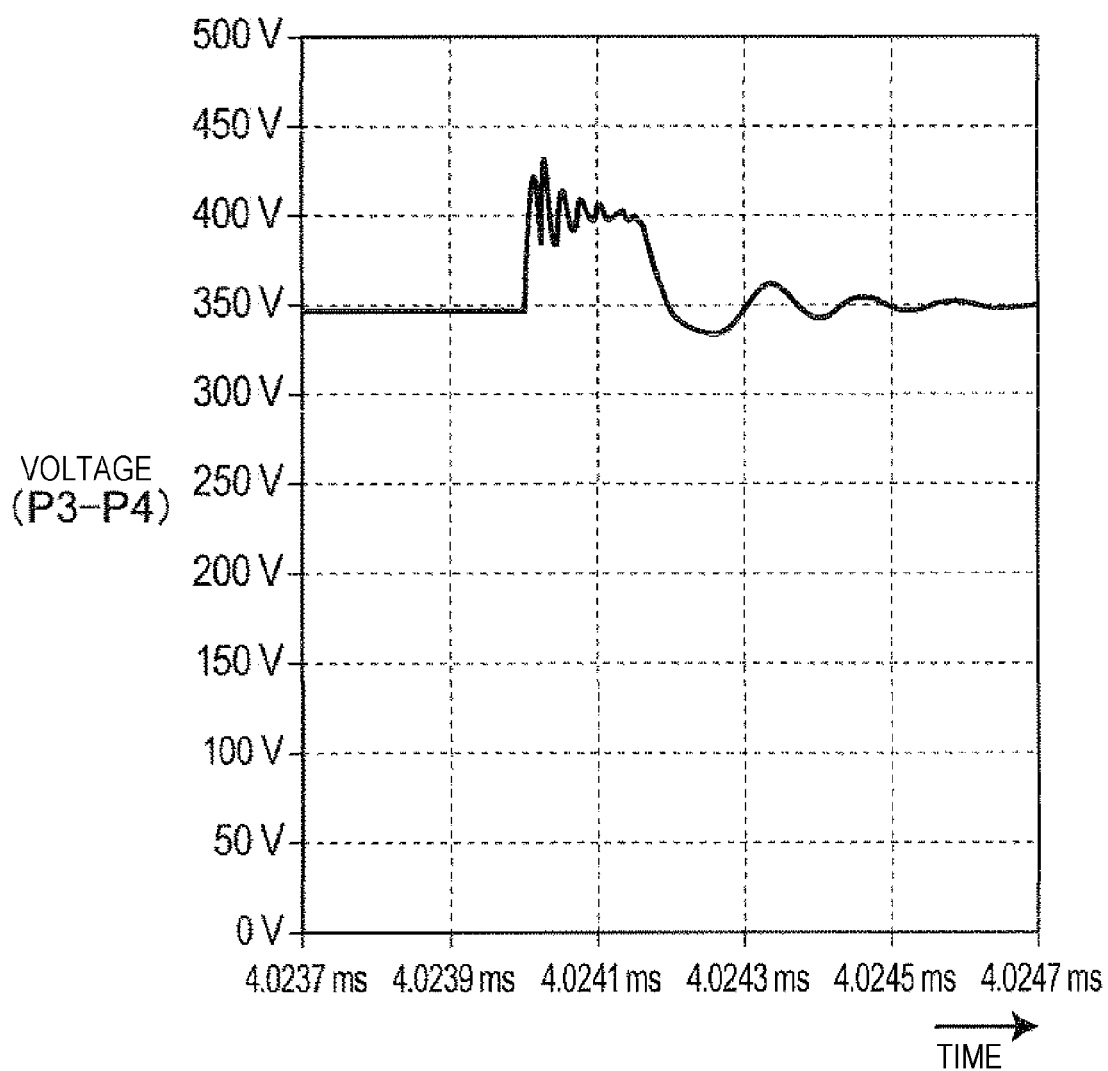
FIG. 29 is a partially enlarged view of FIG. 27.

FIG. 27 is a graph illustrating prevention of ringing in the power conversion device 1 including the snubber circuits 101 to 103 illustrated in FIG. 1. FIG. 28 is a partially enlarged view of FIG. 27. FIG. 29 is a partially enlarged view of FIG. 27. In the case illustrated in FIG. 27, the clamping voltage of the snubber circuit 103 is set to 397 V. However, a peak voltage of 402 V is generated at a point illustrated in FIG. 28, and a peak voltage of 430 V is generated at a point illustrated in FIG. 29. Accordingly, it can be seen that ringing is prevented more effectively than in the case illustrated in FIG. 24.

Figure 30:
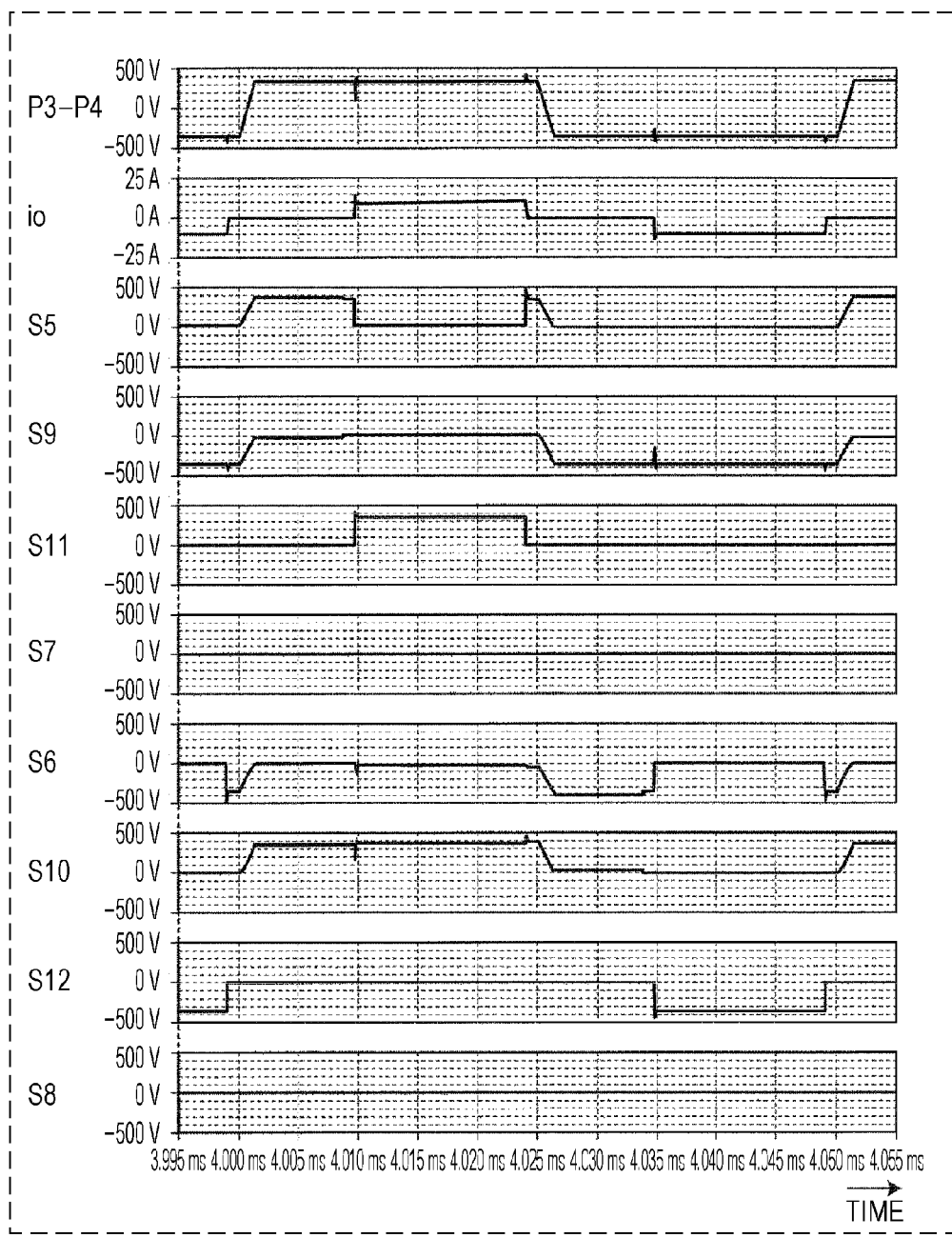
FIG. 30 is a graph illustrating the voltages applied to switching elements in the secondary side converter circuit of the power conversion device illustrated in FIG. 4.

FIG. 30 is a graph illustrating the voltages applied to the switching elements in the secondary side converter circuit 11 of the power conversion device 1 illustrated in FIG. 1. If ringing occurs, a high voltage may be temporarily applied to each of the switches S5 to S12. However, as can be seen from FIG. 30, since the ringing is reduced, the voltages applied to the switches S5 to S12 are also reduced.

Provision of soft switching by using the snubber circuit 101 is described below.

Figure 31:
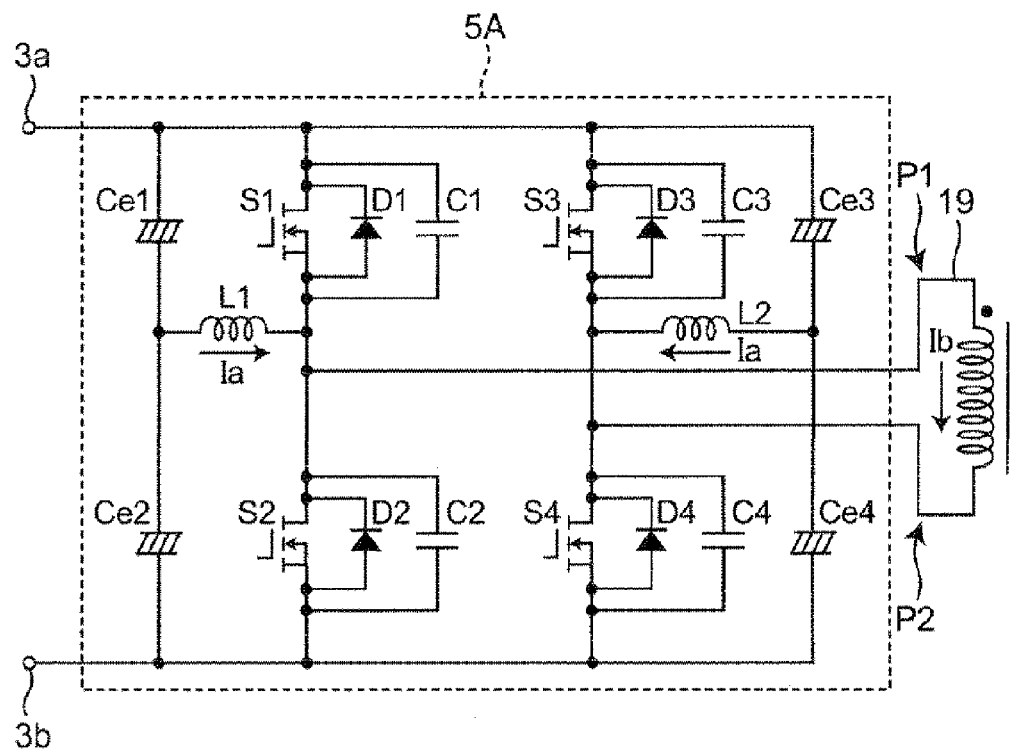
FIG. 31 is a circuit diagram illustrating the detailed configuration of a primary side inverter circuit of a power conversion device according to a comparative example.

FIG. 31 is a circuit diagram illustrating the detailed configuration of a primary side inverter circuit 5A of a power conversion device according to a comparative example. As illustrated in FIG. 31, the primary side inverter circuit 5A includes capacitors C1 to C4, exciting inductors L1 and L2, and electrolytic capacitors Ce1 to Ce4. The capacitors C1 to C4 are lossless snubber capacitors. Each of the capacitors C1 to C4 is connected between the source and the drain of one of the switches S1 to S4. The electrolytic capacitors Ce1 and Ce2 are connected in series between the terminals 3a and 3b. A node between the electrolytic capacitors Ce1 and Ce2 and a node between the switches S1 and S2 are connected to each other via the exciting inductor L1. The electrolytic capacitors Ce3 and Ce4 are connected in series between the terminals 3a and 3b. A node between the electrolytic capacitors Ce3 and Ce4 and a node between the switches S3 and S4 are connected to each other via the exciting inductor L2.

By switching on the switches S1 and S4, a voltage +VE is applied between the terminals P1 and P2 of the primary winding 19. By switching on the switches S2 and S3, a voltage −VE is applied between the terminals P1 and P2 of the primary winding 19. In this manner, the energy of a current is accumulated in the primary winding 19 and the exciting inductors L1 and L2. The current is given as follows:

$$\Delta I = VE/L \times Ton.$$

After the load current is circulated in the secondary side converter circuit 11, the primary side inverter circuit 5 reverses the current flowing through the transformer 9. When the switches S1 to S4 are open, a resonance is caused by the primary winding 19, the exciting inductors L1 and L2, and the capacitors C1 to C4. Note that since the load current circulates on the secondary side, only the excitation current flows on the primary side, and the switches S1 to S4 are opened by the soft switching operation. The voltage between the terminals P1 and P2 of the primary winding 19 is inverted between +VE and −VE. After the voltage between the terminals P1 and P2 of the primary winding 19 reaches a voltage value of +VE or −VE, the voltage is fixed to the voltage value by the diodes D1 to D4. Thereafter, soft switching (zero volt switching) can be performed by switching on the switches S1 and S4 or the switches S2 and S3.

Figure 32:
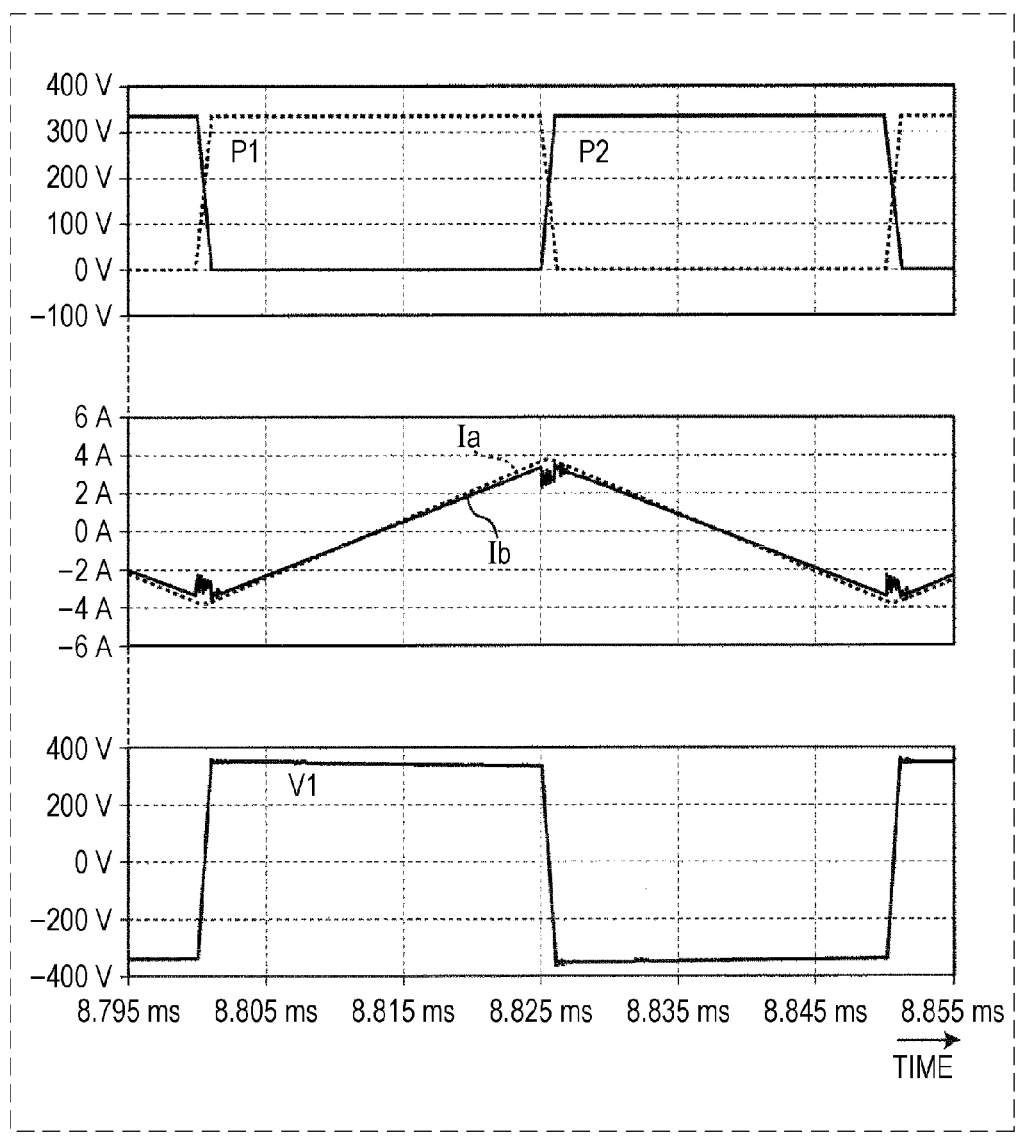
FIG. 32 is a graph illustrating the current during commutation in the primary side inverter circuit illustrated in FIG. 31.

FIG. 32 is a graph illustrating the current during commutation in the primary side inverter circuit 5A illustrated in FIG. 31. In the primary side inverter circuit 5A, soft switching is achieved by the capacitors C1 to C4, the exciting inductors L1 and L2, and the electrolytic capacitors Ce1 to Ce4. Thus, the switches S1 to S4 are protected.

In contrast, as illustrated in FIG. 1, the primary side inverter circuit 5 includes only the capacitor C10 instead of the capacitors C1 to C4, the exciting inductors L1 and L2, and the electrolytic capacitors Ce1 to Ce4 illustrated in FIG. 31. In the primary side inverter circuit 5 illustrated in FIG. 1, when the switches S1 to S4 are open, resonance occurs between the primary winding 19 and the capacitor C10.

Figure 33:
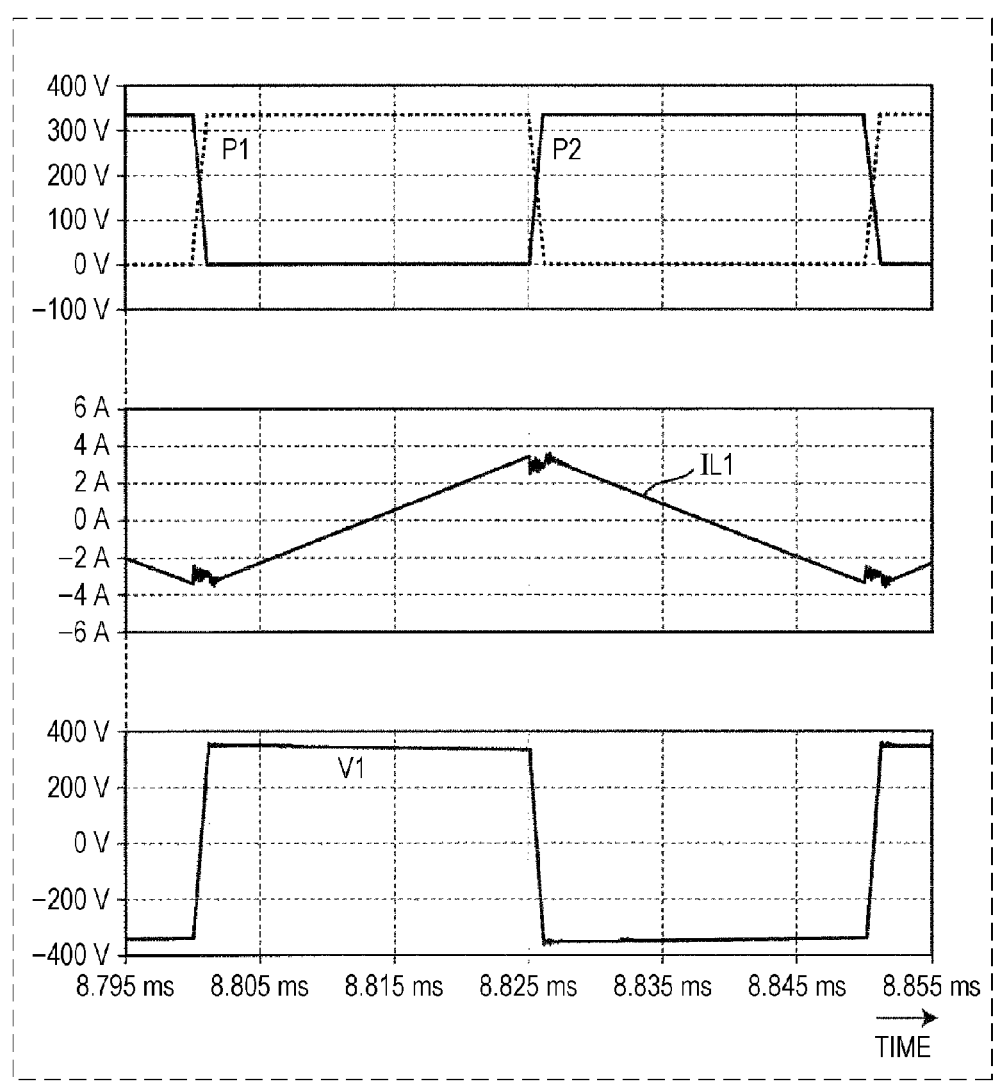
FIG. 33 is a graph illustrating the current during commutation in the primary side inverter circuit illustrated in FIG. 1.

FIG. 33 is a graph illustrating the current during commutation in the primary side inverter circuit 5 illustrated in FIG. 1. As can be seen from FIG. 33, although the primary side inverter circuit 5 in FIG. 1 is simplified more than the primary side inverter circuit 5A in FIG. 31, soft switching can be achieved in the same manner as in the primary side inverter circuit 5A illustrated in FIG. 31.

As described above, according to the power conversion device 1 of the first exemplary embodiment, the occurrence of ringing of the voltage and the current can be made negligibly small.

By providing the snubber circuit 101, ringing of a current flowing in the primary winding 19 can be prevented. In addition, soft switching can be achieved.

By providing the snubber circuit 102, the peak value of the ringing can be decreased. In addition, the convergence time can be improved.

By providing the snubber circuit 103, the peak value of the ringing can be decreased.

According to the power conversion device 1 of the first exemplary embodiment, the ringing voltage applied to the switching elements SW5 to SW12 of the secondary side converter circuit 11 can be prevented. Since the source of the ringing is the leakage inductance of the transformer 9, insertion of the snubber circuits 102 and 103 between the terminals P3 and P4 of the secondary winding 21 has the effect of preventing the ringing. A snubber circuit need not be provided between the drain and the source of each of the switches S5 to S12.

Second Exemplary Embodiment

The power conversion device 1 illustrated in FIG. 1 operates in either a power supply mode (an inverter mode) for supplying power from the DC power source 17 to the commercial power system 27 or a power regeneration mode for regenerating power from the commercial power system 27 to the DC power source 17 (a converter mode).

Figure 34:
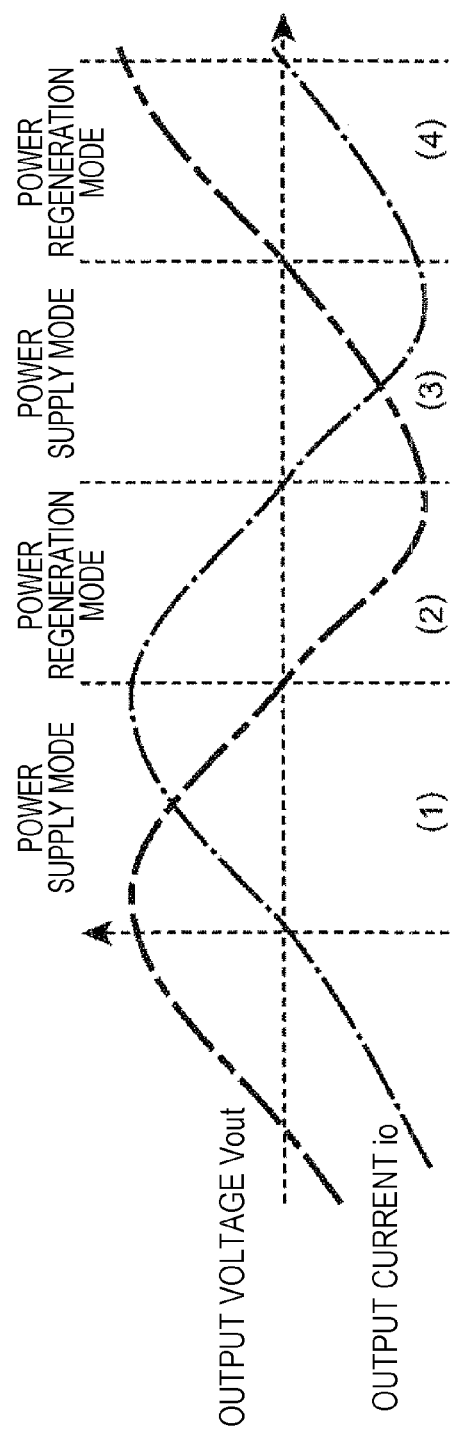
FIG. 34 illustrates a first operation performed by a power conversion device according to a second exemplary embodiment and is a waveform diagram illustrating the waveforms of an output voltage and an output current when the output voltage and the output current have a phase difference of 90 degrees.

FIG. 34 illustrates a first operation performed by a power conversion device according to the second exemplary embodiment. More specifically, FIG. 34 is a waveform diagram illustrating the waveforms of the output voltage and the output current in the case where the output voltage and the output current have a phase difference of 90 degrees. That is, FIG. 34 illustrates an example of the waveforms of the output voltage Vout and the output current io output from the terminals 15a and 15b.

When a voltage drop occurs between the terminals 15a and 15b in a direction the same as the direction in which the current flows through the commercial power system 27, that is, when the polarities of the output voltage Vout and the output current io are the same, the power conversion device 1 operates in the power supply mode. There are two types of power supply modes, one mode indicated by "(1)" in which the output voltage Vout and the output current io are positive and the other mode indicated by "(3)" in which the output voltage Vout and the output current io are negative.

When a voltage drop occurs between the terminals 15a and 15b in a direction opposite to the direction in which the current flows through the commercial power system 27, that is, when the polarities of the output voltage Vout and the output current io differ from each other, the power conversion device 1 operates in the power regeneration mode. There are two types of power regeneration modes, one mode indicated by "(2)" in which the output voltage Vout is negative and the output current io is positive and the other mode indicated by "(4)" in which the output voltage Vout is positive and the output current io is negative.

Figure 35:
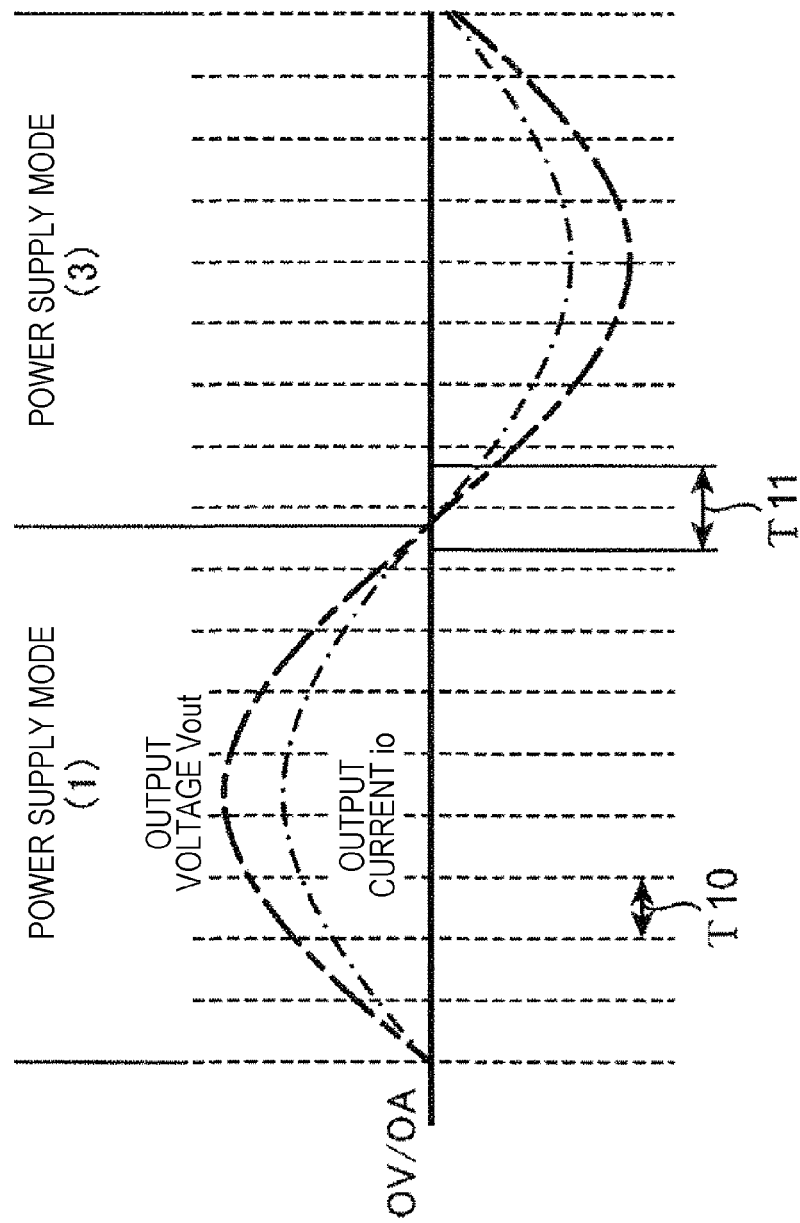
FIG. 35 illustrates a second operation performed by the power conversion device according to the second exemplary embodiment and is a waveform diagram illustrating the waveforms of an output voltage and an output current when the output voltage and the output current have a phase difference of 0 degrees.
Figure 36:
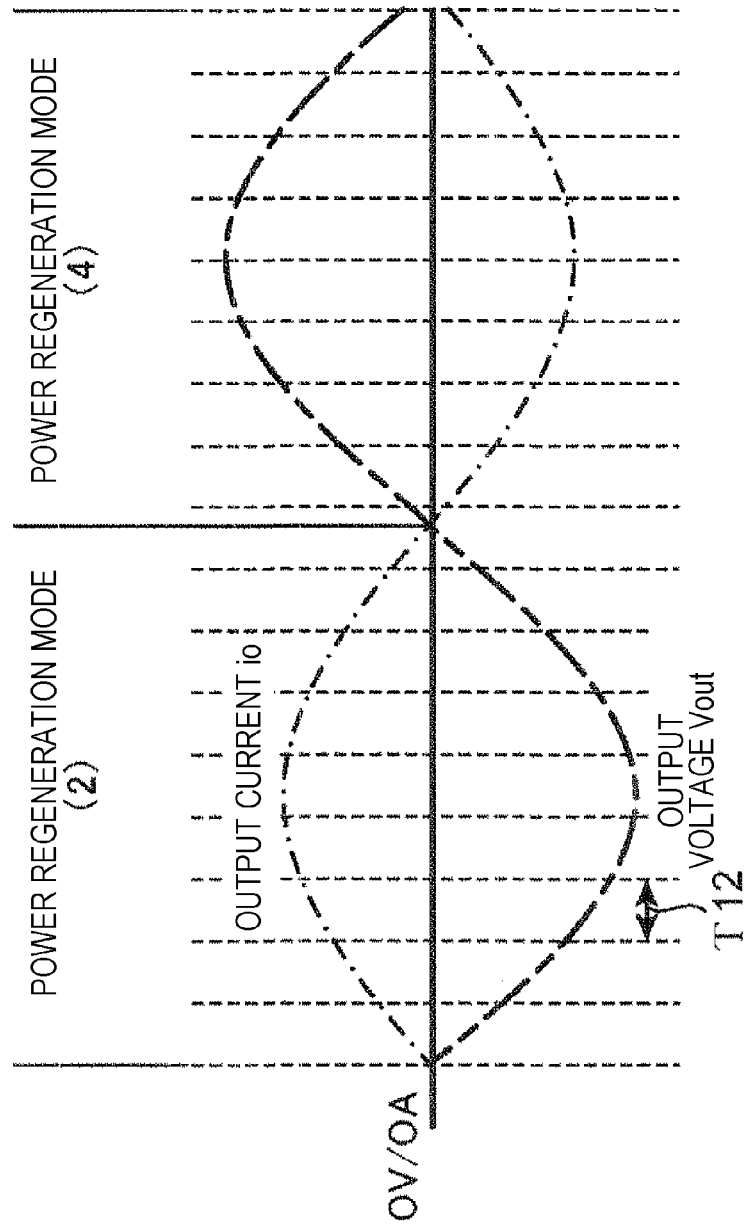
FIG. 36 illustrates a third operation performed by the power conversion device according to the second exemplary embodiment and is a waveform diagram illustrating the waveforms of an output voltage and an output current when the output voltage and the output current have a phase difference of 180 degrees.

FIG. 35 illustrates a second operation performed by the power conversion device according to the second exemplary embodiment. More specifically, FIG. 35 is a waveform diagram illustrating the waveforms of the output voltage and the output current in the case where the output voltage and the output current have a phase difference of 0 degrees. FIG. 36 illustrates a third operation performed by the power conversion device according to the second exemplary embodiment. More specifically, FIG. 36 is a waveform diagram illustrating the waveforms of the output voltage and the output current in the case where the output voltage and the output current have a phase difference of 180 degrees. When, as illustrated in FIG. 34, the output voltage Vout and the output current io have a phase difference of 90 degrees, the power supply mode and the power regeneration mode alternately occur. In contrast, when, as illustrated in FIG. 35, the output voltage Vout and the output current io have a phase difference of 0 degrees (that is, when the power factor is 1), the power regeneration mode does not occur, and only the power supply mode occurs. In addition, when, as illustrated in FIG. 36, the output voltage Vout and the output current io have a phase difference of 180 degrees (that is, when the power factor is 0), the power supply mode does not occur, and only the power regeneration mode occurs.

Note that although FIG. 34 illustrates the case of the lagging power factor, the power supply mode and the power regeneration mode similarly occur in the case of the leading power factor.

Also, note that the following description is given with reference to the output voltage Vout of the power conversion device 1 and the output voltage Vo of the secondary side converter circuit 11.

Figure 37:
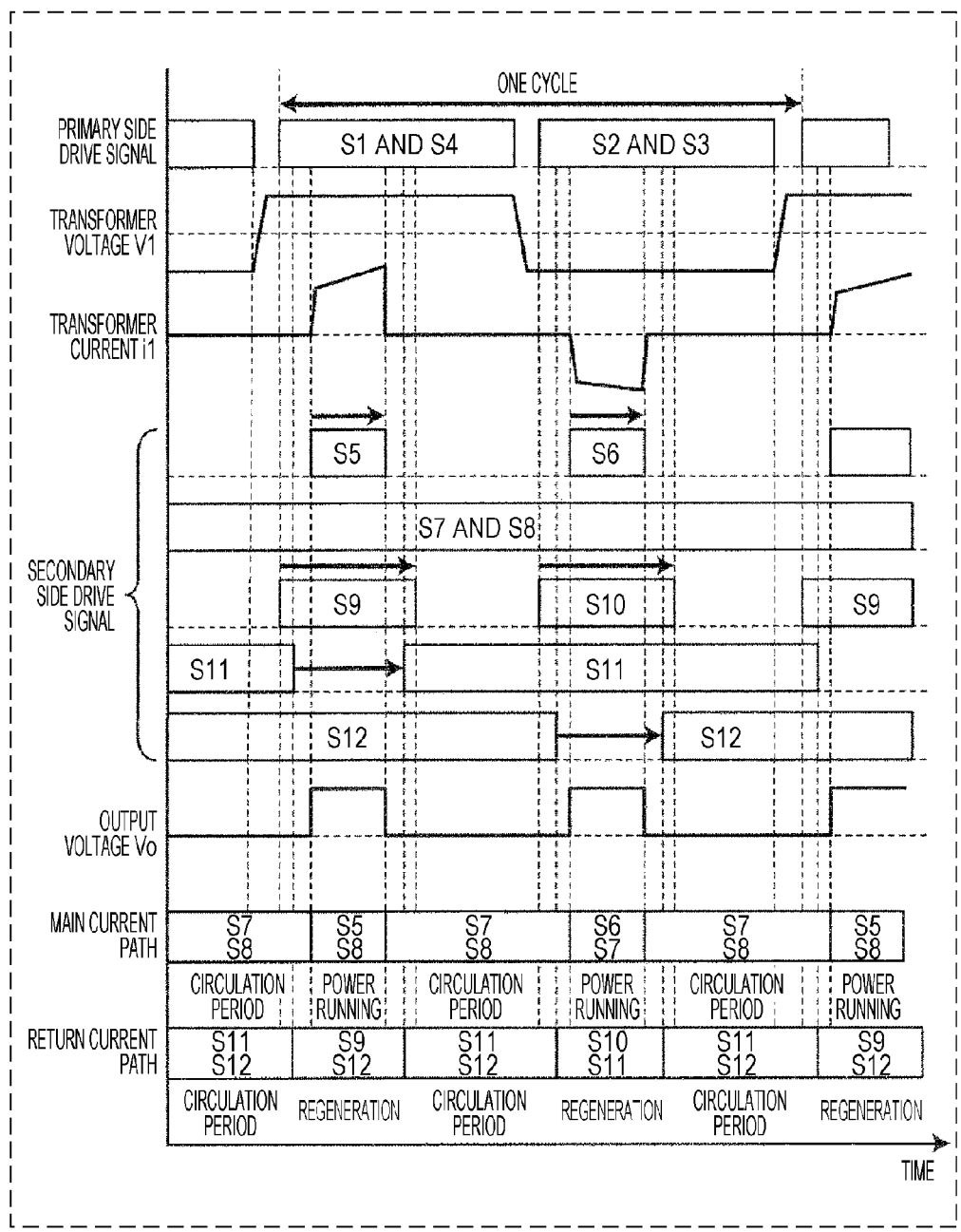
FIG. 37 is a timing diagram illustrating the operation performed by the power conversion device in the power supply mode (1) illustrated in FIG. 34.

FIG. 37 is a timing diagram illustrating the operation performed by the power conversion device 1 in the power supply mode (1) illustrated in FIG. 34. In FIG. 37, the output voltage Vout and the output current io are positive, and the power conversion device 1 operates in the power supply mode.

The primary side drive signal is a control signal applied from the control circuit 7 to the switches S1 to S4 of the primary side inverter circuit 5. The switches S1 to S4 are closed when the primary side drive signal is at a high level and are open when the primary side drive signal is at a low level. In the following description, it is assumed that the duty ratio of the primary side drive signal is fixed. However, the duty ratio may be variable. The transformer voltage V1 is a voltage between the terminals P3 and P4 of the secondary winding 21. Since the waveform of the voltage between the terminals P1 and P2 of the primary winding 19 is similar to the waveform of the voltage between the terminals P3 and P4 of the secondary winding 21, the waveform of the voltage between the terminals P1 and P2 of the primary winding 19 is not illustrated. The transformer current i1 is a current flowing through the secondary winding 21. Since the waveform of the current flowing through the primary winding 19 is the same as the waveform of the current flowing through the secondary winding 21, the waveform of the current flowing through the primary winding 19 is not illustrated. The secondary side drive signals are control signals applied from the control circuit 7 to the first switches S5 to the eighth switch S12 of the secondary side converter circuit 11. Each of the first switch S5 to the eighth switch S12 is closed when the secondary side drive signal is at a high level and is open when the secondary side drive signal is at a low level. The output voltage Vo is the output voltage of the secondary side converter circuit 11.

In the power supply mode and the power regeneration mode, the control circuit 7 opens and closes the switches S1 to S4 of the primary side inverter circuit 5 at a duty ratio of about 50 percent. In this manner, the primary side inverter circuit 5 generates a pulse wave AC signal including a positive voltage period and a negative voltage period having substantially the same time lengths and substantially the same amplitudes at all times. The control circuit 7 controls the secondary side converter circuit 11 in synchronization with the operation of the primary side inverter circuit 5 so as to control the amplitude of the output voltage Vout (that is, to shape the waveform of the output voltage Vo).

In FIG. 37, the transformer current i1 is a current for supplying power from the DC power source 17 to the commercial power system 27.

Referring to FIG. 37, the control circuit 7 closes the first switch S5 for a variable time within a period during which the transformer voltage V1 is positive. In addition, the control circuit 7 closes the fifth switch S9 for at least the period during which the first switch S5 is closed. Furthermore, the control circuit 7 increases or decreases the period of time during which the fifth switch S9 is closed in accordance with an increase or a decrease in the period of time during which the first switch S5 is closed. By closing the fifth switch S9 for at least the period of time during which the first switch S5 is closed, the current flowing from the terminal P3 to the terminal 15a passes through the fifth switch S9 instead of through the diode D9. As a result, the loss is reduced more than in the case where the current flows through the diode D9.

Referring to FIG. 37, during the period in which the transformer voltage V1 is positive, the control circuit 7 closes only one of the first switch S5 and the seventh switch S11 so as to increase or decrease the period of time during which the seventh switch S11 is open in accordance with an increase or a decrease in the period of time during which the first switch S5 is closed. In this manner, the terminals P3 and P4 can be prevented from being short-circuited via the seventh switch S11.

According to the operation illustrated in FIG. 37, during the period in which the voltage V1 is positive, when the third switch S7, the fourth switch S8, the fifth switch S9, and the eighth switch S12 are closed and if the second switch S6, the sixth switch S10, and the seventh switch S11 are open, the first switch S5 is closed. At this time, the transformer current i1 flows from the terminal P3 to the terminal P4 via the fifth switch S9, the first switch S5, the commercial power system 27, the eighth switch S12, and the fourth switch S8. Accordingly, the transformer current i1 flows in the path illustrated in FIG. 7.

Referring to FIG. 37, the control circuit 7 closes the second switch S6 for a variable time within a period during which the transformer voltage V1 is negative. In addition, the control circuit 7 closes the sixth switch S10 for at least the period during which the second switch S6 is closed. Furthermore, the control circuit 7 increases or decreases the period of time during which the sixth switch S10 is closed in accordance with an increase or a decrease in the period of time during which the second switch S6 is closed. By closing the sixth switch S10 for at least the period during which the second switch S6 is closed, the current flowing from the terminal 15b to the terminal P3 passes through the sixth switch S10 instead of through the diode D10. As a result, the loss is reduced more than in the case where the current flows through the diode D10.

Referring to FIG. 37, during the period in which the transformer voltage V1 is negative, the control circuit 7 closes only one of the second switch S6 and the eighth switch S12 so as to increase or decrease the period of time during which the eighth switch S12 is open in accordance with an increase or a decrease in the period of time during which the second switch S6 is closed. In this manner, the terminals P4 and P3 can be prevented from being short-circuited via the eighth switch S12.

According to the operation illustrated in FIG. 37, during the period in which the voltage V1 is negative, when the third switch S7, the fourth switch S8, the sixth switch S10, and the seventh switch S11 are closed and if the first switch S5, the fifth switch S9, and the eighth switch S12 are open, the second switch S6 is closed. At this time, the transformer current i1 flows from the terminal P4 to the terminal P3 via the seventh switch S11, the third switch S7, the commercial power system 27, the sixth switch S10, and the second switch S6. Accordingly, the transformer current i1 flows in the path illustrated in FIG. 8.

Referring to FIG. 37, the control circuit 7 closes the third switch S7 and the fourth switch S8 over the entire cycle of the transformer voltage V1 at all times. Thus, when both the first switch S5 and the second switch S6 are open, a circulating current that flows from the terminal 15b to the terminal 15a via the fourth switch S8 and the third switch S7 can be generated.

According to the operation illustrated in FIG. 37, the third switch S7 and the fourth switch S8 are closed at all times. Therefore, when both the first switch S5 and the second switch S6 are open, a circulating current that flows from the commercial power system 27 and returns to the commercial power system 27 via the diode D12, the fourth switch S8, the diode D11, and the third switch S7 is generated. When the seventh switch S11 is closed, the circulating current flows through the seventh switch S11 instead of through the diode D11. When the eighth switch S12 is closed, the circulating current flows through the eighth switch S12 instead of through the diode D12. Accordingly, the loss is reduced more than in the case where the current flows through the diodes D11 and D12. As a result, the transformer current i1 flows in the path illustrated in FIG. 6.

Referring to FIG. 37, the control circuit 7 closes at least one of the fifth switch S9 and the seventh switch S11 and closes at least one of the sixth switch S10 and the eighth switch S12 over the entire cycle of the transformer voltage V1. A return current that flows in a direction opposite to the direction of the output current io may be generated due to an unexpected failure of the commercial power system 27 or the like. According to the above-described switching operation, the return current that flows from the terminal 15a toward the secondary side converter circuit 11 can be processed as a regenerative current that flows to the terminal 15b via the secondary winding 21 or as a circulating current that flows toward the terminal 15b without passing through the secondary winding 21.

According to the operation illustrated in FIG. 37, during the period in which the transformer voltage V1 is positive, when the fifth switch S9 and the eighth switch S12 are closed and if the sixth switch S10 and the seventh switch S11 are open, the return current flows as a regenerative current. That is, the return current flows from the terminal 15a to the terminal 15b via the diode D5, the fifth switch S9, the secondary winding 21, the diode D8, and the eighth switch S12. The return current is regenerated to the DC power source 17 via the transformer 9 and the primary side inverter circuit 5. The open/close operation of the second switch S6 and the third switch S7 has no impact on the return current. When the first switch S5 is closed, the return current flows through the first switch S5 instead of through the diode D5. When the fourth switch S8 is closed, the return current flows through the fourth switch S8 instead of through the diode D8. As a result, the loss is reduced more than in the case where the current flows through the diodes D5 or D8. Accordingly, the transformer current i1 flows in the path illustrated in FIG. 10.

According to the operation illustrated in FIG. 37, during the period in which the transformer voltage V1 is negative, when the sixth switch S10 and the seventh switch S11 are closed and if the fifth switch S9 and the eighth switch S12 are open, the return current flows as a regenerative current. That is, the return current flows from the terminal 15a to the terminal 15b via the diode D7, the seventh switch S11, the secondary winding 21, the diode D6, and the sixth switch S10. The return current is regenerated to the DC power source 17 via the transformer 9 and the primary side inverter circuit 5. The open/close operation of the first switch S5 and the fourth switch S8 has no impact on the return current. When the second switch S6 is closed, the return current flows through the second switch S6 instead of through the diode D6. When the third switch S7 is closed, the return current flows through the third switch S7 instead of through the diode D7. As a result, the loss is reduced more than in the case where the current flows through the diodes D6 or D7. Accordingly, the transformer current i1 flows in the path illustrated in FIG. 11.

According to the operation illustrated in FIG. 37, when at least one of the fifth switch S9 and the sixth switch S10 is open and if both the seventh switch S11 and the eighth switch S12 are closed, the return current flows as a circulating current. That is, the return current flows from the commercial power system 27 and returns to the commercial power system 27 via the diode D7, the seventh switch S11, the diode D8, and the eighth switch S12. When the third switch S7 is closed, the circulating current flows through the third switch S7 instead of through the diode D7. When the fourth switch S8 is closed, the circulating current flows through the fourth switch S8 instead of through the diode D8. As a result, the loss is reduced more than in the case where the current flows through the diodes D7 or D8. Accordingly, the transformer current i1 flows in the path illustrated in FIG. 9.

Figure 38:
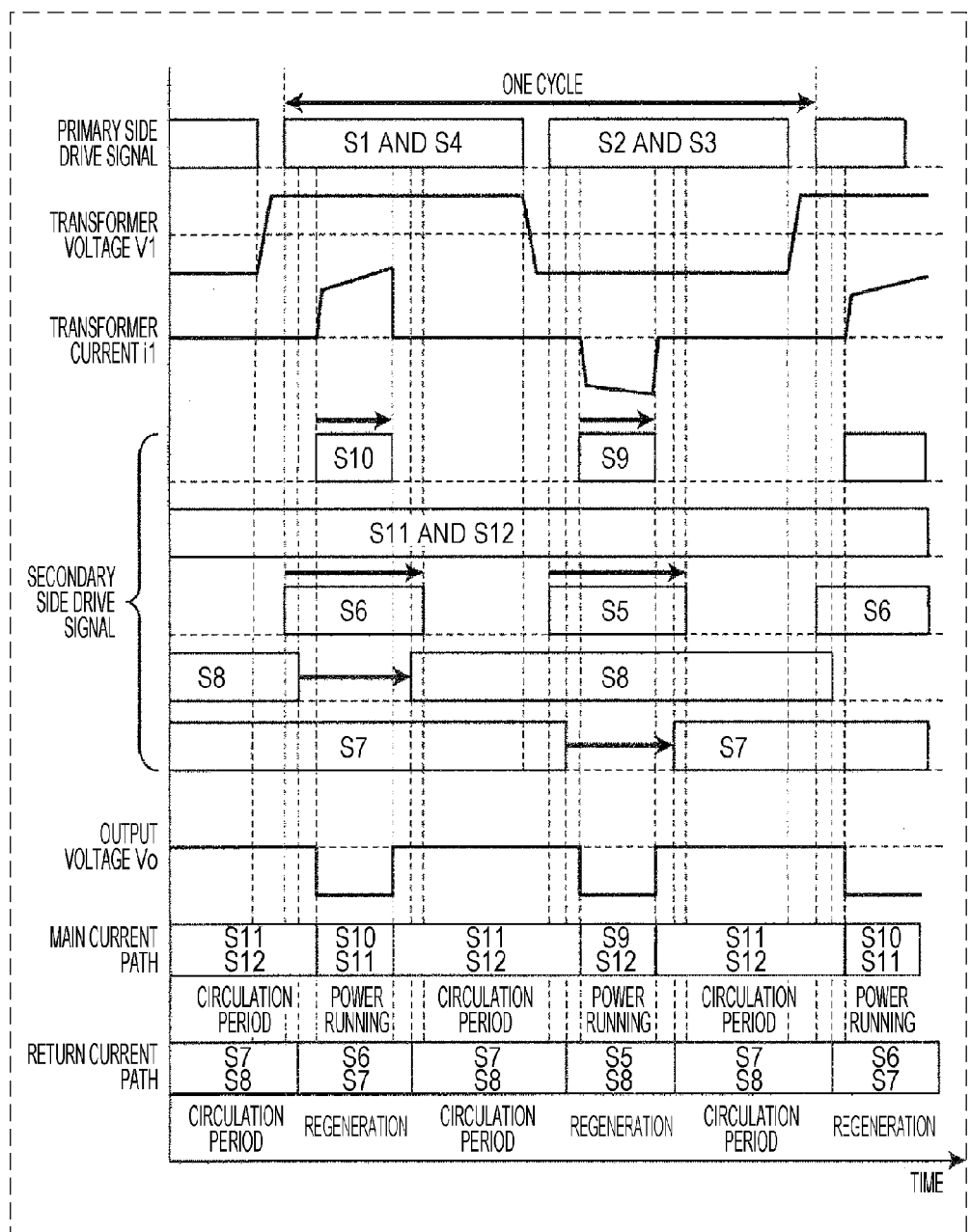
FIG. 38 is a timing diagram illustrating the operation performed by the power conversion device in the power supply mode (3) illustrated in FIG. 34.

FIG. 38 is a timing diagram illustrating the operation performed by the power conversion device 1 in the power supply mode (3) illustrated in FIG. 34. In FIG. 38, the output voltage Vout and the output current io are negative, and the power conversion device 1 operates in the power supply mode.

In FIG. 38, the transformer current i1 is a current for supplying power from the DC power source 17 to the commercial power system 27.

Referring to FIG. 38, during the first period in which the transformer voltage V1 is positive, the control circuit 7 closes the sixth switch S10 for a variable time and closes the second switch S6 for at least a period during which the sixth switch S10 is closed. In addition, the control circuit 7 increases or decreases the period of time during which the second switch S6 is closed in accordance with an increase or a decrease in the period of time during which the sixth switch S10 is closed. By closing the second switch S6 for at least the period during which the sixth switch S10 is closed, the current flowing from the terminal P3 to the terminal 15b passes through the second switch S6 instead of through the diode D6. As a result, the loss is reduced more than in the case where the current flows through the diode D6.

Referring to FIG. 38, during the period in which the transformer voltage V1 is positive, the control circuit 7 closes only one of the fourth switch S8 and the sixth switch S10 so as to increase or decrease the period of time during which the fourth switch S8 is open in accordance with an increase or a decrease in the period of time during which the sixth switch S10 is closed. In this manner, the terminals P3 and P4 can be prevented from being short-circuited via the fourth switch S8.

According to the operation illustrated in FIG. 38, during the period in which the transformer voltage V1 is positive, when the second switch S6, the third switch S7, the seventh switch S11, and the eighth switch S12 are closed and if the first switch S5, the fourth switch S8, and the fifth switch S9 are open, the sixth switch S10 is closed. At this time, the transformer current i1 flows from the terminal P3 to the terminal P4 via the second switch S6, the sixth switch S10, the commercial power system 27, the third switch S7, and the seventh switch S11. Accordingly, the transformer current i1 flows in the path illustrated in FIG. 11.

Referring to FIG. 38, during the second period in which the transformer voltage V1 is negative, the control circuit 7 closes the fifth switch S9 for a variable time, closes the first switch S5 at least during a period in which the fifth switch S9 is closed, and increases or decreases the period of time during which the first switch S5 is closed in accordance with an increase or a decrease in the period of time during which the fifth switch S9 is closed. By closing the first switch S5 for at least the period during which the fifth switch S9 is closed, the current from the terminal 15b to the terminal P3 flows through the first switch S5 instead of through the diode D5. As a result, the loss is reduced more than in the case where the current flows through the diode D5.

Referring to FIG. 38, the control circuit 7 closes only one of the third switch S7 and the fifth switch S9 so as to increase or decrease the period of time during which the third switch S7 is open in accordance with an increase or a decrease in the period of time during which the fifth switch S9 is closed over the entire cycle of the transformer voltage V1. In this manner, the terminals P3 and P4 can be prevented from being short-circuited via the third switch S7.

According to the operation illustrated in FIG. 38, during a period in which the transformer voltage V1 is negative, when the first switch S5, the fourth switch S8, the seventh switch S11, and the eighth switch S12 are closed and if the second switch S6, the third switch S7, and the sixth switch S10 are open, the fifth switch S9 is closed. At this time, the transformer current i1 flows from the terminal P4 to the terminal P3 via the fourth switch S8, the eighth switch S12, the commercial power system 27, the first switch S5, and the fifth switch S9. Accordingly, the transformer current i1 flows in the path illustrated in FIG. 10.

Referring to FIG. 38, the control circuit 7 closes the seventh switch S11 and the eighth switch S12 over the entire cycle of the transformer voltage V1 at all times. Thus, when both the fifth switch S9 and the sixth switch S10 are open, a circulating current that flows from the terminal 15*a* to the terminal 15*b* via the seventh switch S11 and the eighth switch S12 can be generated.

According to the operation illustrated in FIG. 38, the seventh switch S11 and the eighth switch S12 are closed at all times. Thus, when both the fifth switch S9 and the sixth switch S10 are open, a circulating current that flows from the commercial power system 27 and returns to the commercial power system 27 via the diode D7, the seventh switch S11, the diode D8, and the eighth switch S12 is generated. When the third switch S7 is closed, the circulating current flows through the third switch S7 instead of through the diode D7. When the fourth switch S8 is closed, the circulating current flows through the fourth switch S8 instead of through the diode D8. In this manner, the loss is reduced more than in the case where the current flows through the diodes D7 or D8. Accordingly, the circulating current flows in the path illustrated in FIG. 9.

Referring to FIG. 38, the control circuit 7 closes at least one of the second switch S6 and the fourth switch S8 and closes at least one of the first switch S5 and the third switch S7 over the entire cycle of the transformer voltage V1. According to the above-described switching operation, the return current that flows from the terminal 15*b* to the secondary side converter circuit 11 can be processed as a regenerative current that flows to the terminal 15*a* via the secondary winding 21 or can be processed as a circulating current that flows to the terminal 15*a* without passing through the secondary winding 21.

According to the operation illustrated in FIG. 38, during the period in which the transformer voltage V1 is positive, when the second switch S6 and the third switch S7 are closed and if the first switch S5 and the fourth switch S8 are open, the return current flows as a regenerative current. That is, the return current flows from the terminal 15*b* to the terminal 15*a* via the diode D10, the second switch S6, the secondary winding 21, the diode D11, and the third switch S7. The return current is regenerated to the DC power source 17 via the transformer 9 and the primary side inverter circuit 5. The open/close operation of the fifth switch S9 and the eighth switch S12 has no impact on the return current. When the sixth switch S10 is closed, the return current flows through the sixth switch S10 instead of through the diode D10. When the seventh switch S11 is closed, the return current flows through the seventh switch S11 instead of through the diode D11. In this manner, the loss is reduced more than in the case where the current flows through the diodes D10 or D11. Accordingly, the return current flows in the path illustrated in FIG. 8.

According to the operation illustrated in FIG. 38, during the period in which the transformer voltage V1 is negative, when the first switch S5 and the fourth switch S8 are closed and the second switch S6 and the third switch S7 are open, the return current flows as a regenerative current. That is, the return current flows from the terminal 15*b* to the terminal 15*a* via the diode D12, the fourth switch S8, the secondary winding 21, the diode D9, and the first switch S5. The return current is regenerated to the DC power source 17 via the transformer 9 and the primary side inverter circuit 5. The open/close operation of the sixth switch S10 and the seventh switch S11 has no impact on the return current. When the fifth switch S9 is closed, the return current flows through the fifth switch S9 instead of through the diode D9. When the eighth switch S12 is closed, the return current flows through the eighth switch S12 instead of through the diode D12. In this manner, the loss is reduced more than in the case where the current flows through the diodes D9 or D12. Accordingly, the return current flows in the path illustrated in FIG. 7.

According to the operation illustrated in FIG. 38, when at least one of the first switch S5 and the second switch S6 is open and both the third switch S7 and the fourth switch S8 are closed, the return current flows as a circulating current. That is, the return current flows from the commercial power system 27 and returns to the commercial power system 27 via the diode D12, the fourth switch S8, the diode D11, and the third switch S7. When the seventh switch S11 is closed, the circulating current flows through the seventh switch S11 instead of through the diode D11. When the eighth switch S12 is closed, the circulating current flows through the eighth switch S12 instead of through the diode D12. In this manner, the loss is reduced more than in the case where the current flows through the diodes D11 or D12. Accordingly, the return current flows in the path illustrated in FIG. 6.

Figure 39:
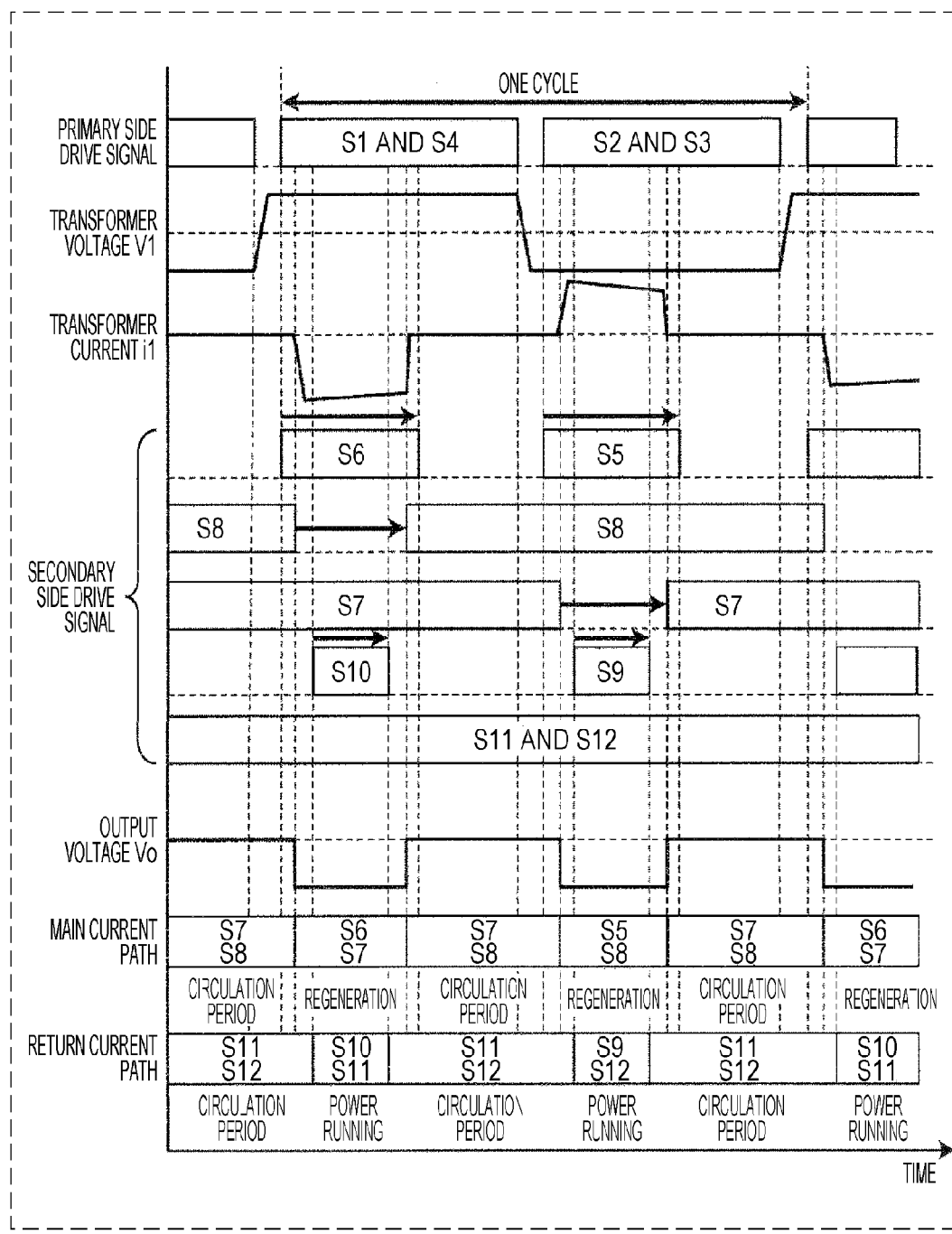
FIG. 39 is a timing diagram illustrating the operation performed by the power conversion device in the power regeneration mode (2) illustrated in FIG. 34.

FIG. 39 is a timing diagram illustrating the operation performed by the power conversion device 1 in the power regeneration mode (2) illustrated in FIG. 34. In FIG. 39, the output voltage Vout is negative, the output current io is positive, and the power conversion device 1 operates in the power regeneration mode.

In FIG. 39, the transformer current i1 is a current for regenerating power from the commercial power system 27 to the DC power source 17.

Referring to FIG. 39, during a first period in which the transformer voltage V1 is positive, the control circuit 7 opens the fourth switch S8 for a variable time and closes only one of the fourth switch S8 and the sixth switch S10. Thus, the control circuit 7 increases or decreases the period of time during which the sixth switch S10 is closed in accordance with the increase or decrease in the period of time during which the fourth switch S8 is open.

Referring to FIG. 39, during the period in which the transformer voltage V1 is positive, the control circuit 7 closes the second switch S6 for at least the period during which the fourth switch S8 is open and increases or decreases the period of time during which the second switch S6 is closed in accordance with the increase or decrease in the period of time during which the fourth switch S8 is open.

According to the operation illustrated in FIG. 39, during the period in which the transformer voltage V1 is positive, when the second switch S6, the third switch S7, the fourth switch S8, the seventh switch S11, and the eighth switch S12 are closed and if the first switch S5 and the fifth switch S9 are open, the fourth switch S8 is open. At this time, the transformer current i1 flows from the terminal 15*b* to the terminal 15*a* via the diode D10, the second switch S6, the secondary winding 21, the seventh switch S11, and the third switch S7. When the sixth switch S10 is closed, the current flows through the sixth switch S10 instead of through the diode D10. In this manner, the loss is reduced more than in the case where the current flows through the diode D10. Accordingly, the transformer current i1 flows in the path illustrated in FIG. 8.

Referring to FIG. 39, during a second period in which the transformer voltage V1 is negative, the control circuit 7 opens the third switch S7 for a variable time and closes only one of the third switch S7 and the fifth switch S9. Thus, the control circuit 7 increases or decreases the period of time during which the fifth switch S9 is closed in accordance with the increase or decrease in the period of time during which the third switch S7 is open.

Referring to FIG. 39, during the period in which the transformer voltage V1 is negative, the control circuit 7 closes the first switch S5 for at least the period during which the third switch S7 is open and increases or decreases the period of time during which the first switch S5 is closed in accordance with the period of time during which the third switch S7 is open.

According to the operation illustrated in FIG. 39, during the period in which the transformer voltage V1 is negative, when the first switch S5, the third switch S7, the fourth switch S8, the seventh switch S11, and the eighth switch S12 are closed and if the second switch S6 and the sixth switch S10 are open, the third switch S7 is open. At this time, the transformer current i1 flows from the terminal 15b to the terminal 15a via the eighth switch S12, the fourth switch S8, the secondary winding 21, the diode D9, and the first switch S5. When the fifth switch S9 is closed, the current flows through the fifth switch S9 instead of through the diode D9. In this manner, the loss is reduced more than in the case where the current flows through the diode D9. Accordingly, the transformer current i1 flows in the path illustrated in FIG. 7.

Referring to FIG. 39, the control circuit 7 closes the seventh switch S11 and the eighth switch S12 over the entire cycle of the transformer voltage V1 at all times.

According to the operation illustrated in FIG. 39, the seventh switch S11 and the eighth switch S12 are closed at all times. Accordingly, when both the third switch S7 and the fourth switch S8 are closed and at least one of the first switch S5 and the second switch S6 is open, a circulating current that flows form the commercial power system 27 and returns to the commercial power system 27 via the eighth switch S12, the fourth switch S8, the seventh switch S11, and the third switch S7 is generated. Since the seventh switch S11 is closed, the circulating current flows through the seventh switch S11 instead of through the diode D11. In addition, since the eighth switch S12 is closed, the circulating current flows through the eighth switch S12 instead of through the diode D12. In this manner, the loss is reduced more than in the case where the current flows through the diodes D11 or D12. Accordingly, the circulating current flows in the path illustrated in FIG. 6.

Referring to FIG. 39, the control circuit 7 closes at least one of the fifth switch S9 and the seventh switch S11 and closes at least one of the sixth switch S10 and the eighth switch S12 over the entire cycle of the transformer voltage V1.

According to the operation illustrated in FIG. 39, during the period in which the transformer voltage V1 is positive, when the sixth switch S10 and the seventh switch S11 are closed and if the first switch S5 and the fourth switch S8 are open, the return current flows as a power running current (a current for supplying power from the DC power source 17 to the commercial power system 27). That is, the return current flows from the terminal 15a to the terminal 15b via the diode D7, the seventh switch S11, the secondary winding 21, the diode D6, and the sixth switch S10. The return current is supplied to the commercial power system 27. The open/close operation of the fifth switch S9 and the eighth switch S12 has no impact on the return current. When the second switch S6 is closed, the return current flows through the second switch S6 instead of through the diode D6. When the third switch S7 is closed, the return current flows through the third switch S7 instead of through the diode D7. In this manner, the loss is reduced more than in the case where the current flows through the diodes D6 or D7. Accordingly, the return current flows in the path illustrated in FIG. 11.

According to the operation illustrated in FIG. 39, during the period in which the transformer voltage V1 is negative, when the fifth switch S9 and the eighth switch S12 are closed and if the second switch S6 and the third switch S7 are open, the return current flows as a power running current. That is, the return current flows from the terminal 15a to the terminal 15b via the diode D5, the fifth switch S9, the secondary winding 21, the diode D8, and the eighth switch S12. The return current is supplied to the commercial power system 27. The open/close operation of the sixth switch S10 and the seventh switch S11 has no impact on the return current. When the first switch S5 is closed, the return current flows through the first switch S5 instead of through the diode D5. When the fourth switch S8 is closed, the return current flows through the fourth switch S8 instead of through the diode D8. In this manner, the loss is reduced more than in the case where the current flows through the diodes D5 or D8. Accordingly, the regenerative current flows in the path illustrated in FIG. 10.

According to the operation illustrated in FIG. 39, when both the fifth switch S9 and the sixth switch S10 are open and if both the seventh switch S11 and the eighth switch S12 are closed, the return current flows as a circulating current. That is, the return current flows from the commercial power system 27 and returns to the commercial power system 27 via the diode D7, the seventh switch S11, the diode D8, and the eighth switch S12. When the third switch S7 is closed, the circulating current flows through the third switch S7 instead of through the diode D7. When the fourth switch S8 is closed, the circulating current flows through the fourth switch S8 instead of through the diode D8. In this manner, the loss is reduced more than in the case where the current flows through the diodes D7 or D8. Accordingly, the circulating current flows in the path illustrated in FIG. 9.

Figure 40:
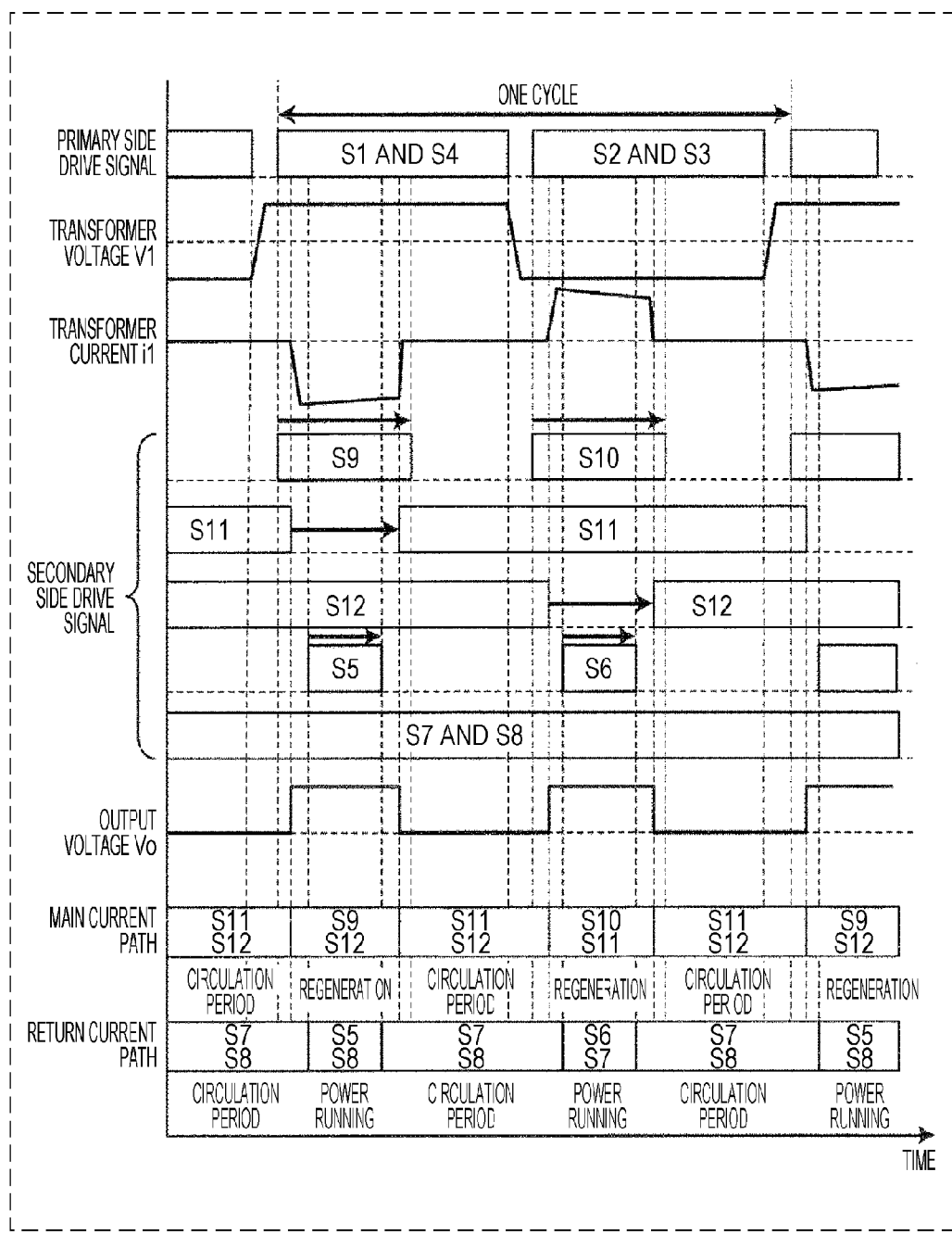
FIG. 40 is a timing diagram illustrating the operation performed by the power conversion device in the power regeneration mode (4) illustrated in FIG. 34.

FIG. 40 is a timing diagram illustrating the operation performed by the power conversion device 1 in the power regeneration mode (4) illustrated in FIG. 34. In FIG. 40, the output voltage Vout is positive, the output current io is negative, and the power conversion device 1 operates in the power regeneration mode.

In FIG. 40, the transformer current i1 is a current for regenerating power from the commercial power system 27 to the DC power source 17.

Referring to FIG. 40, during the first period in which the transformer voltage V1 is positive, the control circuit 7 opens the seventh switch S11 for a variable time and closes only one of the first switch S5 and the seventh switch S11. In addition, the control circuit 7 increases or decreases the period of time during which the first switch S5 is closed in accordance with the increase or decrease in the period of time during which the seventh switch S11 is open.

Referring to FIG. 40, during the period in which the transformer voltage V1 is positive, the control circuit 7 closes the fifth switch S9 for at least the period during which the seventh switch S11 is open and increases or decreases the period of time during which the fifth switch S9 is closed in accordance with an increase or a decrease in the period of time during which the seventh switch S11 is open.

According to the operation illustrated in FIG. 40, during the period in which the transformer voltage V1 is positive, when the third switch S7, the fourth switch S8, the fifth switch S9, the seventh switch S11, and the eighth switch S12 are closed and if the second switch S6 and the sixth switch S10 are open, the seventh switch S11 is open. At this time, the transformer current i1 flows from the terminal 15a to the terminal 15b via the diode D5, the fifth switch S9, the secondary winding 21, the fourth switch S8, and the eighth switch S12. When the first switch S5 is closed, the current flows through the first switch S5 instead of through the diode D5. In this manner, the loss is reduced more than in the case where the current flows through the diode D5. Accordingly, the transformer current i1 flows in the path illustrated in FIG. 10.

Referring to FIG. 40, during the second period in which the transformer voltage V1 is negative, the control circuit 7 opens the eighth switch S12 for a variable time, closes only one of the second switch S6 and the eighth switch S12, and increases or decreases the period of time during which the second switch S6 is closed in accordance with an increase or a decrease in the period of time during which the eighth switch S12 is open.

Referring to FIG. 40, during the period in which the transformer voltage V1 is negative, the control circuit 7 closes the sixth switch S10 for at least the period during which the eighth switch S12 is open and increases or decreases the period of time during which the sixth switch S10 is closed in accordance with an increase or a decrease in the period of time during which the eighth switch S12 is open.

According to the operation illustrated in FIG. 40, during the period in which the transformer voltage V1 is negative, when the third switch S7, the fourth switch S8, the sixth switch S10, the seventh switch S11, and the eighth switch S12 are closed and if the first switch S5 and the fifth switch S9 are open, the eighth switch S12 is open. At this time, the transformer current i1 flows from the terminal 15a to the terminal 15b via the third switch S7, the seventh switch S11, the secondary winding 21, the diode D6, and the sixth switch S10. When the second switch S6 is closed, the current flows through the second switch S6 instead of through the diode D6. In this manner, the loss is reduced more than in the case where the current flows through the diode D6. Accordingly, the transformer current i1 flows in the path illustrated in FIG. 11.

Referring to FIG. 40, the control circuit 7 closes the third switch S7 and the fourth switch S8 for the entire cycle of the transformer voltage V1 at all times.

According to the operation illustrated in FIG. 40, the third switch S7 and the fourth switch S8 are closed at all times. Accordingly, when both the seventh switch S11 and the eighth switch S12 are closed and at least one of the fifth switch S9 and the sixth switch S10 is open, a circulating current that flows from the commercial power system 27 and returns to the commercial power system 27 via the third switch S7, the seventh switch S11, the fourth switch S8, and the eighth switch S12 is generated. Since the third switch S7 is closed, the circulating current flows through the third switch S7 instead of through the diode D7. Since the fourth switch S8 is closed, the circulating current flows through the fourth switch S8 instead of through the diode D8. In this manner, the loss is reduced more than in the case where the current flows through the diodes D7 or D8. Accordingly, the circulating current flows in the path illustrated in FIG. 9.

Referring to FIG. 40, the control circuit 7 closes at least one of the first switch S5 and the third switch S7 and closes at least one of the second switch S6 and the fourth switch S8 over the entire cycle of the transformer voltage V1.

According to the operation illustrated in FIG. 40, during a period in which the transformer voltage V1 is positive, when the first switch S5 and the fourth switch S8 are closed and if the sixth switch S10 and the seventh switch S11 are open, the return current flows as a power running current (a current for supplying power from the DC power source 17 to the commercial power system 27). That is, the return current flows from the terminal 15b to the terminal 15a via the diode D12, the fourth switch S8, the secondary winding 21, the diode D9, and the first switch S5. The return current is supplied to the commercial power system 27. The open/close operation of the second switch S6 and the third switch S7 has no impact on the return current. When the fifth switch S9 is closed, the return current flows through the first switch S9 instead of through the diode D9. When the eighth switch S12 is closed, the return current flows through the eighth switch S12 instead of through the diode D12. In this manner, the loss is reduced more than in the case where the current flows through the diodes D9 or D12. Accordingly, the return current flows in the path illustrated in FIG. 7.

According to the operation illustrated in FIG. 40, during the period in which the transformer voltage V1 is negative, when the second switch S6 and the third switch S7 are closed and if the fifth switch S9 and the eighth switch S12 are open, the return current flows as a power running current. That is, the return current flows from the terminal 15b to the terminal 15a via the diode D10, the second switch S6, the secondary winding 21, the diode D11, and the third switch S7. The return current is supplied to the commercial power system 27. The open/close operation of the first switch S5 and the fourth switch S8 has no impact on the return current. When the sixth switch S10 is closed, the return current flows through the sixth switch S10 instead of through the diode D10. When the seventh switch S11 is closed, the return current flows through the seventh switch S11 instead of through the diode D11. In this manner, the loss is reduced more than in the case where the current flows through the diodes D10 or D11. Accordingly, the return current flows in the path illustrated in FIG. 8.

According to the operation illustrated in FIG. 40, when both the first switch S5 and the second switch S6 are open and both the third switch S7 and the fourth switch S8 are closed, the return current flows as a circulating current. That is, the return current flows from the commercial power system 27 and returns to the commercial power system 27 via the diode D12, the fourth switch S8, the diode D11, and the third switch S7. When the seventh switch S11 is closed, the circulating current flows through the seventh switch S11 instead of through the diode D11. When the eighth switch S12 is closed, the circulating current flows through the eighth switch S12 instead of through the diode D12. In this manner, the loss is reduced more than in the case where the current flows through the diodes D11 or D12. Accordingly, the circulating current flows in the path illustrated in FIG. 6.

The operations illustrated in FIG. 37 and the operation illustrated in FIG. 40 are substantially the same. As can be seen from FIG. 37 and FIG. 40, regardless of a direction in which the transformer current i1 flows, the secondary side converter circuit 11 generates a positive output voltage Vo in substantially the same manner. In addition, the operations illustrated in FIG. 38 and the operation illustrated in FIG. 39 are substantially the same. As can be seen from FIG. 38 and FIG. 39, regardless of a direction in which the transformer current i1 flows, the secondary side converter circuit 11 generates a negative output voltage Vo in substantially the same manner.

The amplitude of the output voltage Vout and the amplitude of the output current io of the power conversion device 1 increase and decrease in accordance with the increase and decrease in the period of time during which the first switch S5 and the second switch S6 are closed in the operation illustrated in FIG. 37. Similarly, the amplitude of the output voltage Vout and the amplitude of the output current io of the power conversion device 1 increase and decrease in accordance with the increase and decrease in the period of time during which the sixth switch S10 and the fifth switch S9 are closed in the operation illustrated in FIG. 38.

The amplitudes of the voltage and the current of the power regenerated from the commercial power system 27 to the DC power source 17 increase and decrease in accordance with the increase and decrease in the period of time during which the third switch S7 and the fourth switch S8 are open in the operation illustrated in FIG. 39. Similarly, the amplitudes of the voltage and the current of the power regenerated from the commercial power system 27 to the DC power source 17 increase or decrease in accordance with the increase and decrease in the period of time during which the seventh switch S11 and the eighth switch S12 are open in the operation illustrated in FIG. 40.

Since existing power conversion devices employ a diode rectification method for the secondary side inverter circuit, loss caused by a diode occurs.

According to the present exemplary embodiment, the power conversion device 1 is a power conversion device including a secondary side inverter circuit using a synchronous rectification method, and the power conversion device 1 is capable of operating the secondary side inverter circuit using a novel drive method with higher efficiency than ever. In particular, the secondary side converter circuit 11 includes the switching elements SW5 to SW12 formed from MOSFETs and performs synchronous rectification by using the switching elements SW5 to SW12. Thus, the power conversion efficiency can be improved.

According to the power conversion device 1 of the present exemplary embodiment, a phase jump that may occur in the power system interconnection can be handled. In addition, according to the power conversion device 1 of the present exemplary embodiment, a return current generated when the load is switched off can be processed.

According to the operations illustrated in FIGS. 37 to 40, electric power can be supplied to not only a resistive load having a power factor of 1 but also a nonlinear load, such as a motor or a rectifier.

According to the power-system interconnection inverter device described in Japanese Patent No. 4100125, electric power is not regenerated on the primary side. Accordingly, in the power-system interconnection inverter device, when the DC power source 17 is a storage battery, it is difficult to recharge the storage battery. In contrast, according to the power conversion device 1 of the present exemplary embodiment, electric power can be regenerated from the commercial power system 27 to the DC power source 17, so that the storage battery can be recharged when the DC power source 17 is a storage battery. According to the power conversion device 1 of the present exemplary embodiment, even when, for example, a low-power-factor load, a motor, or a rectification load is connected to the power conversion device 1, an autonomous operation of the power conversion device 1 is available. To provide an autonomous operation, it is necessary for the power conversion device 1 to perform voltage control. In general, when voltage control is applied to a low-power-factor load, a motor, or a rectification load, it is unclear whether the current flows in the power supply direction or in the regeneration direction. According to the power conversion device 1 of the present exemplary embodiment, as illustrated in FIGS. 37 to 40, power can be supplied and regenerated in substantially the same sequence, so that the voltage can be advantageously controlled without taking into account the direction in which the current flows.

In addition, according to the power conversion device 1 of the present exemplary embodiment, the high-frequency power generated by the primary side inverter circuit 5 is directly converted into alternating currents of different frequencies without converting the high-frequency power into the DC power by the secondary side converter circuit 11. Accordingly, the low-loss, compact, and lightweight power conversion device 1 can be provided.

Note that the configurations described as the first and second embodiments described above may be combined with each other as appropriate. In each of the first and second embodiments, the occurrence of ringing can be prevented by the snubber circuits 101 to 103 according to the first embodiment in the same manner.

The present disclosure is applicable to, for example, a power conditioner for a stationary storage battery or a V2H (Vehicle to Home) power conditioner for electric vehicles (EVs)/plug-in hybrid vehicles (PHVs).

What is claimed is:

1. A power conversion device comprising:
   first and second terminals connected to a DC power source;
   third and fourth terminals connected to a commercial power system or a load;
   a transformer including a primary winding having seventh and eighth terminals and a secondary winding having fifth and sixth terminals;
   an inverter circuit connected between the first and second terminals and the seventh and eighth terminals;
   a converter circuit connected between the fifth and sixth terminals and the third and fourth terminals;
   a diode bridge including first and second AC input terminals and first and second DC output terminals, the first AC input terminal being connected to the fifth terminal, the second AC input terminal being connected to the sixth terminal;
   a first capacitor connected between the first and second DC output terminals; and
   a first resistor connected in parallel with the first capacitor between the first and second DC output terminals.

2. The power conversion device according to claim 1, further comprising:
   a second capacitor connected between the fifth and sixth terminals; and
   a second resistor connected in series with the second capacitor between the fifth and sixth terminals.

3. The power conversion device according to claim 1, further comprising:
   a third capacitor connected between the seventh and eighth terminals.

4. The power conversion device according to claim 1, further comprising:
   a control circuit,
   wherein the converter circuit includes:
     a first switch circuit including a first switch and a first diode connected in parallel with the first switch, the first switch circuit being connected between the third and fifth terminals;
     a second switch circuit including a second switch and a second diode connected in parallel with the second switch, the second switch circuit being connected between the fourth and fifth terminals;
     a third switch circuit including a third switch and a third diode connected in parallel with the third switch, the third switch circuit being connected between the third and sixth terminals;
     a fourth switch circuit including a fourth switch and a fourth diode connected in parallel with the fourth switch, the fourth switch circuit being connected between the fourth and sixth terminals;

a fifth switch circuit including a fifth switch and a fifth diode connected in parallel with the fifth switch, the fifth switch circuit being connected to the first switch circuit in series between the third and fifth terminals, the fifth diode being reversely connected to the first diode;

a sixth switch circuit including a sixth switch and a sixth diode connected in parallel with the sixth switch, the sixth switch circuit being connected to the second switch circuit in series between the fourth and fifth terminals, the sixth diode being reversely connected to the second diode;

a seventh switch circuit including a seventh switch and a seventh diode connected in parallel with the seventh switch, the seventh switch circuit being connected to the third switch circuit in series between the third and sixth terminals, the seventh diode being reversely connected to the third diode; and an eighth switch circuit including an eighth switch and an eighth diode connected in parallel with the eighth switch, the eighth switch circuit being connected to the fourth switch circuit in series between the fourth and sixth terminals, the eighth diode being reversely connected to the fourth diode, and wherein the control circuit when a voltage between the fifth and sixth terminals has a first polarity, controls the first switch to be in ON state during a first ON period and controls the fifth switch to be in ON state during a second ON period longer than the first ON period, the second ON period completely including the first ON period, and when the voltage between the fifth and sixth terminals has a second polarity opposite to the first polarity, controls the second switch to be in ON state during a third ON period and controls the sixth switch to be in ON state during a fourth ON period longer than the third ON period, the fourth ON period completely including the third ON period.

5. The power conversion device according to claim 4, wherein
the control circuit further
lengthens the second ON period when lengthening the first ON period,
shortens the second ON period when shortening the first ON period,
lengthens the fourth ON period when lengthening the third ON period, and
shortens the fourth ON period when shortening the third ON period.

6. The power conversion device according to claim 4, wherein
the control circuit further
when the voltage between the fifth and sixth terminals has the first polarity, controls the seventh switch to be in OFF state during a first OFF period longer than the first ON period, the first OFF period completely including the first ON period, and
when the voltage between the fifth and sixth terminals has the second polarity, controls the eighth switch to be in OFF state during a second OFF period longer than the third ON period, the second OFF period completely including the third ON period.

7. The power conversion device according to claim 6, wherein
the control circuit further
lengthens the first OFF period when lengthening the first ON period,
shortens the first OFF period when shortening the first ON period,
lengthens the second OFF period when lengthening the third ON period, and
shortens the second OFF period when shortening the third ON period.

8. The power conversion device according to claim 4, wherein
the control circuit further
in either case when the voltage between the fifth and sixth terminals has the first or second polarity, controls the third and fourth switches to maintain in ON state.

9. The power conversion device according to claim 4, wherein
the second ON period is longer than the first OFF period, and completely includes the first OFF period, and
the fourth ON period is longer than the second OFF period, and completely includes the second OFF period.

10. The power conversion device according to claim 4, wherein each of the first to eighth switch circuits is a MOSFET including a body diode.

11. The power conversion device according to claim 4, wherein each of the first to eighth switch circuits is a combination of a MOSFET and an external diode.

12. The power conversion device according to claim 4, wherein
when a voltage drop occurs between the third and fourth terminals in a direction that is the same as a direction in which an electric current flows between the third and fourth terminals through the commercial power system or the load, the power conversion device operates in a power supply mode in which electric power is supplied from the DC power source to the commercial power system or the load, and
wherein when a voltage drop occurs between the third and fourth terminals in a direction that is opposite to a direction in which an electric current flows between the third and fourth terminals through the commercial power system or the load, the power conversion device operates in a power regeneration mode in which electric power is regenerated from the commercial power system or the load to the DC power source.

* * * * *